United States Patent
Namini

(10) Patent No.: US 8,996,475 B2
(45) Date of Patent: Mar. 31, 2015

(54) GLOBAL INFORMATION MANAGEMENT SYSTEM AND METHOD

(71) Applicant: Asibo Inc., Rockville, MD (US)

(72) Inventor: Borsu Asisi Namini, North Potomac, MD (US)

(73) Assignee: Asibo Inc., Rockville, MD (US)

( * ) Notice: Subject to any disclaimer, the term of this patent is extended or adjusted under 35 U.S.C. 154(b) by 0 days.

(21) Appl. No.: 13/944,145

(22) Filed: Jul. 17, 2013

(65) Prior Publication Data

US 2013/0304698 A1    Nov. 14, 2013

Related U.S. Application Data

(62) Division of application No. 13/158,129, filed on Jun. 10, 2011, now Pat. No. 8,504,530.

(60) Provisional application No. 61/358,902, filed on Jun. 26, 2010.

(51) Int. Cl.
G06F 17/30 (2006.01)

(52) U.S. Cl.
CPC .... *G06F 17/30289* (2013.01); *G06F 17/30327* (2013.01); *G06F 17/30575* (2013.01)
USPC ............................. 707/690; 707/692; 707/694

(58) Field of Classification Search
None
See application file for complete search history.

(56) References Cited

U.S. PATENT DOCUMENTS

| | | | |
|---|---|---|---|
| 5,924,094 A | 7/1999 | Sutter | |
| 6,236,996 B1 | 5/2001 | Bapat et al. | |
| 6,453,317 B1 * | 9/2002 | LaCost et al. | 709/217 |
| 7,483,396 B2 * | 1/2009 | Steindl | 370/254 |
| 2003/0195904 A1 | 10/2003 | Chestnut et al. | |
| 2004/0162838 A1 | 8/2004 | Murayama et al. | |
| 2004/0167922 A1 | 8/2004 | Yanase et al. | |
| 2005/0203924 A1 | 9/2005 | Rosenberg | |
| 2005/0262241 A1 | 11/2005 | Gubbi et al. | |
| 2007/0276833 A1 | 11/2007 | Sen et al. | |
| 2009/0076902 A1 * | 3/2009 | Grinsted et al. | 705/14 |
| 2009/0089292 A1 * | 4/2009 | Cheah | 707/9 |
| 2009/0157711 A1 * | 6/2009 | Baer et al. | 707/101 |
| 2010/0293143 A1 | 11/2010 | Jayaraman et al. | |
| 2011/0113068 A1 * | 5/2011 | Ouyang et al. | 707/784 |
| 2011/0173153 A1 | 7/2011 | Domashchenko et al. | |

OTHER PUBLICATIONS

Notification of Transmittal of International Search Report and Written Opinion, International Search Report and Written Opinion for application PCT/US11/40139 dated Oct. 3, 2011.

* cited by examiner

*Primary Examiner* — Son T Hoang
(74) *Attorney, Agent, or Firm* — Rothwell, Figg, Ernst & Manbeck, p.c.

(57) ABSTRACT

A global information management system (GIMS) includes a collection of standards and methods that allow information management on a global scale. A GIMS computer network includes a central registration database (CRD) and one or more GIMS computer systems connected over a network. Each GIMS computer system includes a relational database having a set of standardized tables. The CRD may provide a GIMS network-unique system ID to each GIMS computer system. Each GIMS computer system uses the GIMS network-unique system ID as part of a primary key for each record generated by and stored in the set of standardized tables of the GIMS database. The GIMS enables global database normalization through the globally unique identification of database records.

11 Claims, 18 Drawing Sheets

PRIOR ART

Interaction of operating system and application programs

PRIOR ART

GLOBAL INFORMATION MANAGEMENT SYSTEM AND METHOD

CROSS-REFERENCE TO RELATED APPLICATIONS

The present application is a divisional of U.S. patent application Ser. No. 13/158,129, filed on Jun. 10, 2011, which claims the benefit of priority to U.S. Provisional Application Ser. No. 61/358,902, filed on Jun. 26, 2010, the entire disclosures of which are incorporated herein by reference.

BACKGROUND

A. Field of Invention

This invention relates to a system and methods for global information management and, more particularly, to global database normalization through the unique identification of data records.

B. Discussion of the Background

Since the introduction of the personal computer and popular use of web browsers, the Internet has reached just about every important area of modern life. It has changed the way people communicate with each other, research, entertain themselves, shop, work, educate, bank and stay in touch. During this relatively short period of time many new technologies have emerged, triumphed and disappeared again to be replaced by new developments.

When the World Wide Web emerged around 1990, no-one, not even its creators, could envision the multifaceted functionality and global proliferation of the web today. The web was originally designed to serve limited goals. Therefore, the foundation of the web, represented by a set of basic standards like HyperText Markup Language (HTML) and the Internet Protocol Suite (TCP/IP), mirrored those limited goals. The original standards were related to data transmission and data presentation but lacked structure.

Considering the lack of structure of Internet technology, it is astonishing how far the Internet has evolved. What remains unchanged is the speed with which the amount of information on the Internet is growing. It succeeds all information accumulated by humankind in thousands of years and continues to grow every day. Information on the Internet is reaching the point where it's too large to be effectively searched, filed, indexed, briefed, organized or numbered.

Yet information overload on the Internet is just part of the problem. An even larger amount of information is stored all over the world in millions of private and corporate personal computers (PCs) and servers. Thus, information management is becoming the major challenge of the day.

However, to cope with this challenge, the vast majority (e.g., 95%) of all computer users still use file manager applications (e.g., Windows Explorer for Windows or File Manager for Mac OS) as the main tool for information management. In that respect, in the last 30 years not much has changed for the average computer user. For them information management is basically nothing more then manually creating directories, inventing file names and moving files or messages between those directories.

There have been some developments. The information technology (IT) industry has responded to the problem of information glut with a variety of information management applications. Today, software companies offer a number of conventional software solutions to help customers organize and navigate through the information flood. Yet, due to complexity, high maintenance requirements and high costs, these conventional software solutions are affordable only to larger corporate customers. Thus, only a tiny minority of computer users have the privilege of using conventional information management systems. The vast majority (e.g., over 1 billion users) is left behind.

In addition, conventional information management systems (IMS) have a number of decisive limitations. One limitation is that conventional IMS are limited to managing information within one single system (e.g., company or organization). FIG. 1 illustrates this limitation. There are three main sources of information that need to be organized by an information management system: (A) information generated within a system, (B) information received from other systems, and (C) general information from the Internet. All structuring performed by an information management system $101a$ of computer system $101$ is not transferable to other systems. Accordingly, the structuring performed by the information management system $101a$ is lost as soon as that information is sent to computer system $102$. IMS $102a$ of system $102$ has to start from the beginning and structure the incoming information.

A second limitation is that conventional information management systems do not operate automatically. Conventional IMS are just supporting tools to help computer users organize digital information. The presence and active participation of the end user is always required. Therefore, information management remains a labor-intensive task, and users must invest a considerable amount of time and efforts to perform information management tasks. Billions of dollars are wasted worldwide every day to structure/restructure information over and over again.

SUMMARY

A Global Information Management System according to the present invention is a complete set of technologies, algorithms and standards that may allow information management on a global scale. In some embodiments, the GIMS concept and practical implementation are aimed to overcome insurmountable shortcomings of conventional information management technologies used on the Internet and local networks.

A GIMS may include the automated implementation of one or more of the following functions: structuring and categorization of information, information Search, information distribution/publishing, access control, user authentication and/or security/protection.

Similar to the Internet, where the prerequisite to its use is the existence of browser software, some embodiments of the GIMS concept require the installation of GIMS software on every participating computer. Although technologically there is no resemblance between a conventional browser and the GIMS software, the GIMS software has the ability to replace conventional browsers to be the new browser.

Some embodiments of the GIMS software do not require any additional hardware. Instead, the GIMS software continues to use the existing IT infrastructure including operating systems, processors, communication lines, databases, storage, network protocols etc.

From the GIMS standpoint, today's Internet is a web of 'dumb' nodes, where the intelligent functions are mostly performed by users. In contrast, the new GIMS web may be a web of intelligent nodes eager to serve their masters (i.e., the end users). As a result, end users may be released from performing routine tasks, to which they are not suited, and able to concentrate on intelligent decisions.

The new global GIMS network may coexist and interact with the existing Internet. Due to the advantages of the GIMS model, the new network may grow at the expense of the existing Internet, gradually improving/replacing the existing Internet.

A GIMS network may be created as soon as the GIMS software is installed on two computer systems with Internet access. The GIMS network may automatically grow with each new installation. There are no limits to its growth.

Each node (i.e., system) is owned by an entity. An entity can be represented by an individual, family, enterprise of any size or government institution. In addition, an entity can own several nodes. In some embodiments, it is up to the discretion of the node owner what information to share with the rest of the world by using an access management system. The access management system may provide extremely fine-grained possibilities of global access control.

The GIMS software may include functionalities to automatically transfer legacy information stored in file and email servers, as well as browser bookmarks into the new system. Further, the GIMS software may allow indexing the existing web using a novel indexing paradigm.

Today's Internet technology distinguishes between three basic functionalities: (a) content creation (i.e., web design), (b) user functions (i.e., web browser), and (c) search engines (i.e., information gathering and distribution). In contrast, the GIMS software may not include such division. Instead, the GIMS software may include all three functionalities.

The use of GIMS software may not require special IT skills. This may apply regardless of the number of users in a GIMS system. Administration functions can be performed by any person with basic computer skills and common sense.

The GIMS software may include cloud functionality on a higher level. The GIMS methodology may integrate local networks, the cloud and the Internet into one integrated global information space.

Today, a variety of software is used to create different kinds of files (e.g., text, images, video, spread sheets). The output of these programs is not coordinated and depends only on the activities and reliability of the user. In some embodiments, the GIMS software may fulfill an additional role as a coordinator for third-party software to automatically structure, categorize and store those files.

Sophisticated information management is essential not only for professionals or companies, but for any individual on this planet. This is true, even if many computer users still are not aware of such necessity. Embodiments of the GIMS may put highly sophisticated information management solutions at the disposal of average computer users, regardless of their technical skills or financial clout.

By its very nature, GIMS solutions can be used in a variety of applications. In some embodiments, in addition to global information management, GIMS packages include the following functionality: (i) communication, such as email and/or fax capability, (ii) web design including static web design and/or dynamic web development, (iii) document management, (iv) project management, (v) content management, (vi) task management/workflow, and/or (v) e-commerce including e-commerce as buyer, e-commerce as seller through public sites and/or web store design. However, some GIMS embodiments, although able to interact with the functionality, do not include the following functionality: (i) system software including operating systems and/or databases (e.g., relational database management system (RDBMS)), (ii) computer programming tools including integrated development environments and/or compilers, (iii) application software such as office software including word processing, spreadsheet applications, presentation software and/or publication software, (iv) image/video processing and/or (v) audio processing. Thus, although document management functionality provided in a GIMS embodiment may manage documents created by a word processor, the word processor may be independent of functionality provided by the GIMS embodiment.

Accordingly, some embodiments of GIMS software are not operating systems or RDBMSs. Some embodiments of GIMS software do not create text, image, video or spreadsheet files. At the same time, the functionalities provided by embodiments of the GIMS software cannot be assigned to traditional software categories. Instead, embodiments of the GIMS software represent a new software category.

The functions of GIMS software may span over several software categories. Some of the functions of the GIMS software may be unique. None of the existing software categories is designed to automatically manage and structure information on a global scale. None of the existing software categories is designed to integrate and coordinate the actions of various application software components on local level, within a computer system.

In one aspect, the present invention provides a networked computer system having: a registration computer system, a first computer system and a second computer system. The registration computer system has a registration processor and registration memory having a registration database stored therein. The registration computer system is configured to generate unique system identifications. The first computer system has a first processor and a first memory having a first database stored therein. The first computer system receives a first network-unique system identification generated by and received from the registration computer system. The second computer system has a second processor and a second memory having a second database stored therein. The second computer system receives a second network-unique system identification generated by and received from the registration computer system. The first and second databases each have installed therein a set of standard tables that are common to both the first and second database. The set of standard tables is configured to store one or more database records. Each database record generated by the first database and stored in the set of standard tables of the first database is uniquely identified by a primary key. The primary key includes: the first network-unique system identification received from the registration computer system, a system-unique identification of one table of the set of standard tables in the first database, and a table-unique identification of a row of the one table of the set of standard tables in the first database. Each database record generated by the second database and stored in the set of standard tables of the second database is uniquely identified by a primary key including: the second network-unique system identification received from the registration computer system, a system-unique identification of one table of the set of standard tables in the second database, and a table-unique identification of a row of the one table of the set of standard tables in the second database.

The registration computer system may be configured to store the set of standard tables, and the first and second computer systems may be configured to receive set of standard tables from the registration computer system and install the received set of standard tables. The set of standard tables installed in the first and second databases may be defined by the registration computer system.

The first database may be configured to store one or more database records generated by the second database. Each database record generated by the second database and stored in the first database may be uniquely identified by a primary key including: the second network-unique system identification, a system-unique identification of one table of the set of standard tables in the first database, and a table-unique identification of a row of the one table of the set of standard tables in the first database. The second database may be configured to store one or more database records generated by the first database. Each database record generated by the first database and stored in the second database may be uniquely identified by a primary key including: the first network-unique system identification, a system-unique identification of one table of the set of standard tables in the second database, and a table-unique identification of a row of the one table of the set of standard tables in the second database.

The database records stored in the set of standard tables may include: (i) one or more first database records, and (ii) one or more database records that are attributes describing one or more of the one or more first database records. The set of standard tables may be configured such that one or more of the one or more first database records may be identified by searching for one or more of the one or more database records that are attributes describing the one or more first database records. A first database record may be stored in the set of standard tables of the first database, and the second database may be configured to (i) receive the first database record from the first database and (ii) store the received first database record in the set of standard tables of the second database. The second database may be configured to receive, along with the first database record, one or more attributes describing the received first database record. The one or more attributes of the received first database record may be stored as database records in one or more tables of the set of standard tables of the first database. The second database may be configured to store the received one or more attributes of the received first database record as database records in one or more tables of the set of standard tables of the second database corresponding to the one or more tables of the set of standard tables of the first database.

In one embodiment of the invention, a system-unique identification of each table of the set of standard tables in the first database may be the same as a system-unique identification of a corresponding table of the set of standard tables in the second database. The set of standard tables in the first database may include standard system tables, and the set of standard tables in the second database may include the standard system tables. Each of the standard system tables included in the set of standard tables in the first database may be identified by the same system-unique identification as a corresponding one of the standard system tables included in the set of standard tables in the second database. Each of the standard tables may have standard columns.

In another aspect, the present invention provides a method for normalizing records in a database of a first computer system comprising a processor and a memory. The method includes using the first computer system to receive a network-unique system identification via a network from a central registration database. The method includes using the first computer system to implement a first database having a set of standard tables in the memory of the first computer system, the set of standard tables being configured to store one or more database records. Also, the method includes using the first computer system to uniquely identify each record generated by the database and stored in the first database with a primary key. The primary key includes: the network-unique system identification from the central registration database, a system-unique identification of one table of the set of standard tables in the first database, and a table-unique identification of a row of the one table of the set of standard tables in the first database.

The method may further comprise using the first computer system to receive the set of standard tables from the central registration database. The set of standard tables installed in the first database may be defined by the central registration database. The method may further comprise using the first computer system to store one or more database records generated by a second database of a second computer system. The second database may have the set of standard tables installed therein. Each database record generated by the second database and stored in the first database may be uniquely identified by a primary key including: a second network-unique system identification received from the central registration database by the second computer system, a system-unique identification of one table of the set of standard tables in the first database, and a table-unique identification of a row of the one table of the set of standard tables in the first database.

In one embodiment, the method may further comprise using the first computer system to receive a first database record from a second computer system including a second database having the set of standard tables installed therein. The first database record may be stored in the set of standard tables of the second database. The method may further comprise using the first computer system to store the received first database record in the set of standard tables of the first database. The method may further comprise using the first computer system to receive, along with the first database record, one or more attributes describing the received first database record from the second computer system. The one or more attributes of the received first database record may be stored as one or more database records in one or more tables of the set of standard tables of the second database of the second system. The method may further comprise using the first computer system to store the received one or more attributes of the received first database record as one or more database records in one or more tables of the set of standard tables of the first database corresponding to the one or more tables of the set of standard tables of the second database.

In another embodiment, the database records stored in the set of standard tables may include: (i) one or more first database records, and (ii) one or more database records that are attributes describing one or more of the one or more first database records. The method may further comprise using the first computer system to identify one or more of the one or more database records by searching for one or more of the one or more database records that are attributes describing the one or more first database records. The attributes may include hierarchical relationships between first database records, and the set of standard tables may include one or more tables configured to represent the hierarchical relationships. The one or more tables configured to represent the hierarchical relationships may include a hierarchy table and a hierarchy details table. The hierarchy table may be configured to store a unique identification of each of one or more hierarchies, and the hierarchy details table may be configured to store the details of the one or more hierarchies uniquely identified by the hierarchy table. The hierarchies may be uniquely identified with a primary key including: the network-unique system identification from the central registration database, a system-unique identification of the hierarchy table in the first database, and a table-unique identification of a row of the hierarchy table in the first database. Each row of the hierarchy details table may include the unique identification of one of the hierarchies, a hierarchy code identifying a position in the one of the hierarchies, and the unique identification of a database record whose position in the one of the hierarchies is defined by the hierarchy code. The method may further comprise using the first computer system to retrieve hierarchical relationships between any database records throughout a network of computer systems of which the first computer system is a part by querying hierarchy and hierarchy details tables with a common SQL statement. The SQL statement represents a JOIN between the unique primary key of the database record and the foreign key representation of the primary key in the hierarchy and hierarchy details tables.

An identification of each table of the set of standard tables in the first database may be the same as an identification of a corresponding table of the set of standard tables installed in a second database included in a second computer system. Each of the set of standard tables has standard columns. The first computer system may comprise one or more subsystems, and the primary key may additionally comprise a subsystem identification capable of identifying one of the subsystems or the system. Each of the one or more subsystems may have a database having the set of standard tables in a memory of the subsystem.

The first computer system may comprise a plurality of computers, and the primary key of each database record may additionally comprise an identification of one of the computers. The set of standard tables may include system tables and application tables. The unique identification from the central registration database may be stored in the system tables. The method may further comprise using the first computer system to add one or more non-standard tables to the set of standard tables of the first database. The method may include using the first computer system to register the added one or more non-standard tables in the system tables of the first database. The method may include using the first computer system to assign a system-unique identification to the added one or more non-standard tables in the system tables of the first database. The method may include using the one or more non-standard tables exclusively within the first computer or using the first computer system to share the one or more non-standard tables and the assigned table identification with one or more computer systems connected to the first computer system via the network. The method may include using the first computer system to add one or more non-standard columns to a standard table of the set of standard tables of the first database. The method may include using the first computer to register the added one or more non-standard columns in the system tables. The method may include using the first computer system to assign a system-unique identification to the added one or more non-standard column in the system tables of the first database.

The identification of each table of the set of standard tables in the database may be standardized. The method may further include using the first computer system to receive a set of standard system information, and the first database having the set of standard tables may be installed based on the received set of standard system information.

In some embodiments, the method may include comprising using the first computer system to install standard applications. The standard applications include a system application. The system application may include a data structure module having: (1) a data structure table group containing data about the database structure of all the standard applications and (2) a database creation module configured to build database tables in accordance with the content of the data structure table group. The system application may include an authentication module configured to regulate the system and user authentication during data exchange with other systems using standard authentication files containing authentication information. The system application may include a record management module configured to regulate the creation of the primary keys to uniquely identify each record stored in the database. The system application may regulate maintenance of a user activity log and a record log.

The system application may include an access management module configured to regulate access management for system users and users of other systems. The set of standard tables may include one or more access management tables, and the access management module may be configured to use the one or more access management tables to regulate access management. The access management may include permissions to view, add, update, delete and send records of the database. The access management may additionally include permissions to administer records of the database. The method may include using the first computer system to determine the access rights of any database record stored in the databases of a networked computer system of which the first computer system is a part by querying the access management tables with a single standard SQL statement. The standard SQL statement may represent a JOIN between the unique primary key of the database record and a foreign key representation of the primary key in tables of an access management table group of the set of standard tables.

The system application may include a data exchange module configured to regulate rules for data exchange of standard send, delete, replication, query, query response and authorization files with other systems. The system application may include a search module having a query table group, a query generating module and a query processing module. The search module may be configured to regulate rules to (i) query the database of another system and (ii) regulate rules to respond to queries from another system. The method may include using the query generating module generate a standard query file containing the search criteria and attributes of the requesting system. The method may include using the query processing module: (1) to check the database access privileges of a requesting computer system, (2) if step (1) positive, to transform the standard query file into a native database query language statement corresponding with the database of the query processing module, (4) to query own databases using results of step (3), (5) to transform query results into a standard query result file, and (6) to send standard query result file to the requesting computer system.

In some embodiments of the invention, the system application may include an encryption module configured to ensure data integrity and security during data exchange between systems. The system application may include a redundancy control module configured to prevent data redundancy. The standard applications may include a contact management application.

The standard applications may include a document management application configured to represent unstructured files as structured database records. The standard tables may include a document table. Each of the unstructured files may have a corresponding database record in the document table, the corresponding database record may be uniquely identified by a primary key including: the unique system identification from the central registration database, a system-unique identification of the document table, and a table-unique identification of a row of the document table. Each of the unstructured files may have a file name with syntax comprising (1) the primary key uniquely representing the corresponding record of the unstructured file in the document table and (2) a file extension. The document table may include a plurality columns configured to describe properties of the unstructured files. The document table may include a plurality of tables.

The method may include, when exchanging one or more of the unstructured files with a second computer system including a second database having the set of standard tables installed therein, using the first computer system to accompany the corresponding database records in the document table with the one or more of the unstructured files. A user of the first computer system may not have direct access to one or more of the unstructured files. The method may include using the first computer system to automatically handle access on behalf of the user to one or more of the unstructured files in accordance with the one or more database records describing attributes of the corresponding database record. One or more of the unstructured files may not be stored within the first computer system. The unstructured files may include Internet web pages. The unstructured files may include text, image, video or audio files formats. The unstructured files may be located in local networks.

The standard applications may include a communication application. The method may include using the first computer system to send registration information to the central registration database. The unique system identification may be received from the central registration database in response to the sending of the registration information.

The set of standard tables may include a universal reference table configured to define many-to-many relationships between database records stored in the first database. The universal reference tables may include first and second columns. The method may include using the first computer system to define a relationship between first and second records stored in the first database by storing the primary key of the first record in a row of the first column of the universal reference table and storing the primary key of the second record in row of the second column of the universal reference table.

In one embodiment, the first database may be configured such that a user may declare objects at will. The method may include using the first computer system to replicate data between the first database and a second database of a second computer system using the primary keys of the records stored in the first and second databases to uniquely identify the records stored in the first and second databases. The method may include using the first computer system to exchange data between the first database and a second database of a second computer system. All communication between the first computer system and the second computer system may be indirect communication.

The set of standard tables may include one or more tables configured to represent one or more public classification systems. The one or more tables configured to represent the one or more public classification systems may include a classification system table and a classification system details table. The classification system table may be configured to store a unique identification of each of one or more public classification systems and the classification system details table being configured to store the details of the one or more public classification systems uniquely identified by the hierarchy table. The hierarchies may be uniquely identified with a primary key including: the network-unique system identification from the central registration database, a system-unique identification of the classification system table in the first database, and a table-unique identification of a row of the classification system table in the first database. Each row of the classification system details table may include the unique identification of one of the public classification systems, a classification code of the one of the public classification systems, and a description of the classification identified by the classification code of the one of the public classification systems.

The method may include using the computer system to distribute import and export transaction between client computers of the first computer system. The method may include using the first computer system to control a network security switch such that the first computer system is disconnected from a network when not using the network. The set of standard tables may include a keyword table configured to store one or more keywords related to one or more of the records stored in the standard tables of the first database. The keywords table may include first and second columns. Each of the one or more keywords may be stored in a row of the first column of the keywords table. The primary key uniquely identifying the record to which the keyword is related may be stored in the row of the second column of the keywords table.

The set of standard tables may include a notes table configured to store one or more notes or comments related to one or more of the database records stored in the one or more tables of the set of standard tables of the first database. The notes table may include first and second columns. Each of the one or more notes may be stored in a row of the first column of the notes table. The primary key uniquely identifying the record to which the note is related may be stored in the row of the second column of the notes table.

In yet another aspect, the present invention provides a computer system having normalized database records. The computer system has a processor and memory. The memory has installed therein a database having a set of standard tables. Each database record stored in the database is uniquely identified with a primary key including: a network-unique system identification received from a central registration database, a system-unique identification of one table of the set of standard tables in the database, and a table-unique identification of a row of the one table of the set of standard tables in the database.

In still another aspect, the present invention provides a method for normalization of multiple standard contact information databases in a networked computer system. The method includes using a registration computer including a processor and a memory to access a plurality of information sources. Each information source may contain contact information for one or more objects. The method includes using the registration computer to add the contact information for the objects contained in the plurality of information sources to a contact information database. The method includes using the registration computer to assign a unique contact identification to the contact information for each of the objects added to the contact information database. The method includes using the registration computer to receive a registration request via a computer network from a requesting computer system on the network, the registration request including contact information of the requesting computer system. The method includes using the registration computer to assign a network-unique system identification to the requesting computer system. The method includes using the registration computer to transmit the assigned network-unique system identification to the requesting computer system. The method includes using the registration computer to determine whether the contact information included in the received registration request has already been added to the contact information database and assigned a network-unique contact identification. The method includes, if the registration computer determines that the contact information included in the received registration request has already been added to the contact information database and assigned a network-unique contact identification, using the registration computer to transmit the network-unique contact identification assigned to the contact information included in the received registration request to the requesting computer system. The method includes, if the registration computer determines that the contact information included in the received registration request has not already been added to the contact information database and assigned a network-unique contact identification, using the registration computer to (1) add the contact information included in the received registration request to the contact information database, (2) assign a network-unique contact identification to the contact information included in the received registration request, and (3) transmit the network-unique contact identification assigned to the contact information included in the received registration request to the requesting computer system.

The contact information in the registration computer may comprise: (1) contact information of entities gathered from public sources that are not members of the networked computer system and (2) contact information of entities that are members of the networked computer system. The contact information stored in the plurality of information sources may include contact information in various formats, and the method may include using the registration computer to transform contact information in the various formats into a standard format. The method may include using the registration computer to prevent duplication of contact information records of the same object, and using the registration computer to mark the added information database records from a plurality of information sources as not-members of the networked computer system.

In some embodiments of the invention, the contact information included in the received registration request may comprise information about an owner of the requesting computer system. The contact information included in the received registration request may comprise the name of the owner of the requesting computer system. The contact information included in the received registration request may additionally comprise an address, a phone number, an email address and/or a company profile for the owner of the requesting computer system.

The network-unique system identification is different from each network-unique contact identification. The unique system identification and the unique contact identification assigned to the contact information in the received registration request may be transmitted to the requesting computer system as part of a registration confirmation package. The registration confirmation package may additionally comprise a set of standard system information. The registration confirmation package additionally comprises encryption keys. The method may include: using the registration computer to receive updated contact information from the system and using the registration computer to replace contact information added to the contact information database with the received updated contact information.

In a further aspect, the present invention provides a non-transitory computer readable medium having computer-executable instructions recorded thereon that, when executed by a computer of a system, cause the computer of the system to receive a network-unique system identification via the network from a central registration database, install a database having a set of standard tables in a memory of the system, and uniquely identify each record stored in the database with a primary key. The primary key includes: the network-unique system identification from the central registration database, a system-unique identification of one table of the set of standard tables in the database, and a table-unique identification of a row of the one table of the set of standard tables in the database.

In another aspect, the present invention provides a registration computer system connected to a network of computer systems. The registration computer has a processor and a memory. The memory has installed therein a database configured to receive a registration request via the network from a requesting computer system of the network of computer systems. The database is configured to assign a network-unique system identification to the requesting computer system. The database is configured to store: (a) the assigned network-unique system identification, a set of standard tables and (c) a unique identification for each table of the set of standard table. The database is configured to transmit to the requesting computer system: (a) the assigned network-unique system identification, the set of standard tables and the unique identification for each table of the set of standard table. The database may be further configured to (1) store public encryption keys for each computer system of the network and (2) distribute the public encryption keys to computer systems of the network upon request.

Further variations encompassed within the systems and methods are described in the detailed description of the invention below.

BRIEF DESCRIPTION OF THE DRAWINGS

The accompanying drawings, which are incorporated herein and form part of the specification, illustrate a preferred embodiment of the present invention and, together with the detailed description, further serve to explain the principles of the invention and to enable a person skilled in the art to make and use the invention. In the drawings, like reference numbers are used to indicate identical or functionally similar elements. Additionally, the left-most digit(s) of the reference number identifies the drawing in which the reference number first appears.

DETAILED DESCRIPTION OF PREFERRED EMBODIMENTS

Figure 1:
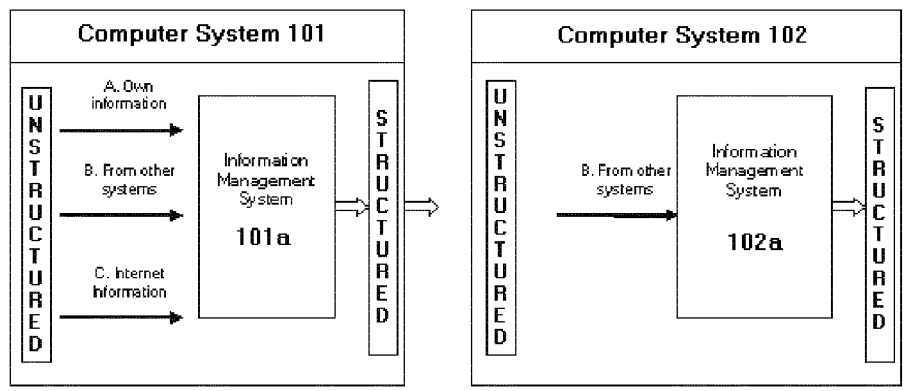
FIG. 1 depicts a schematic diagram illustrating a conventional network of computer systems.

In order to understand the Global Information Management System of the present invention, it would be helpful to describe several aspects of conventional information technology. The aspects include (1) the partition of information, (2) the divide between public and private information, (3) lack of automation, (4) relational versus hierarchical, (5) Internet search engines and (6) cloud computing.

1. Partition of Information

Information in real life does not know boundaries. Pieces of information are related to each other in a complex system of relational and hierarchical interdependencies. Stored information will fully reflect reality only if the existing interdependencies are also stored. Otherwise, the informational value of a particular piece of information will be significantly decreased.

Today, we process computer information like text documents, spreadsheets or database records by using a variety of application programs. These programs work totally independent of each other. They are not "aware" of the existence of other programs, and, consequently, they do not create links between documents they create. In other words, these programs do not connect the dots.

As a result, despite the fact that emails, text documents, web sites or any other form of digital information might be related to each other, the information is stored in different locations by different applications. This kind of information partition distorts the reality of the interdependent nature of the information, and the distortion can be overcome only by investing significant amount of time to manually recreate the links. Finding a method to overcome such partition of information would be beneficial.

2. Divide Between Public and Private Information

The Internet is the main depository of public information. Private (or local) information is stored in millions of local computer networks or stand-alone PCs owned by individuals, small businesses, large corporations and government or public institutions. Private information is usually stored in a format not compatible with the Internet.

Conventionally, establishing compatibility between public and private information requires establishment of an Intranet. Yet this option is too technically complex and demanding to the majority of private users or small businesses. Thus, there is a divide between public and private Information. The data exchange between these two areas requires the overcoming of significant technological hurdles. It would be beneficial to find a method to bridge the divide between public and private information.

3. Lack of Automation

The term "computer automation" is often used in the software industry, suggesting that existing software does automate our work. But this is misleading. In fact, there exists almost no software that really automates the process of managing (i.e., structuring) information.

The term "automation" describes a process or situation where humans are replaced by some automatic device or tool so that human presence or intervention is not necessary. Unfortunately, conventional computer information management systems are manual systems, as they require the full-time presence of the end user. Similarly, the Internet, while being a useful tool for sharing information on a global scale, is not an automatic system. Browsing the Internet is a manual activity. "Net surfing" is unthinkable without the "surfer" (i.e., the human behind the computer monitor). The same is true for most non-Internet applications.

The human factor is the performance bottleneck in conventional IMS due to the fact that human beings are subject to mood swings, forgetfulness, uncertain qualifications, unreliability and indolence. Human productivity as computer users is low.

Fulfilling the promise of automation and finding a way to replace the existing manual on-line method with a global, fully automated, software controlled solution that releases users from performing routine tasks and lets them concentrate on creative tasks that computer software is not able to perform will considerably increase efficiency and productivity of an information management system. Accordingly, it would be beneficial to find a method to automate the entire process of information management.

4. Relational versus Hierarchical.

Mirroring reality requires the inclusion of all relationships between various parts of information. These relationships can be roughly divided in two major categories: relational and hierarchical. Conventional information management tools usually do not provide the option to fully reflect such relationships.

For example, conventional file management applications like Windows Explorer organize information (directories and files) only according to hierarchical criteria. They do not provide the option to store information about existing relationships between those files. On the other hand, the Internet uses hyperlinks to indicate relationships between web sites, yet it is impossible to query a search engine by entering hierarchical search criteria. In addition, in both conventional file management applications and Internet mentioned above, the relational and hierarchical links are entirely subjective and only represent the view of the user or web designer, which is not necessary shared by other users. It would be beneficial to find a method to present relational and hierarchical dependencies in all their complexity.

5. Internet Search Engines

The following attributes of conventional Internet Search Engines will be discussed below: (a) too many results, (b) indexing as main search tool, (c) unstructured search results, (d) full search cycle, and (e) search results cannot be used for statistical analysis.

5a. Too Many Results

Search engines are the main tool to navigate and find information on the Internet. An average search at Google, which is one search engine, yields between 1 million to 1 billion resulting links.

Although search engine technology has significantly improved over the years, the vast majority of results (e.g., 99.9999%) are virtually useless. They either do not contain what the user is looking for or are listed not on the first result page, thus requiring too much time to browse through all the links preceding that particular link. Accordingly, it would be beneficial to increase the efficiency with which relevant search results are found.

5b. Indexing as Main Search Tool

The basic search technology behind search engines is the reason for such a low efficiency grade. Although competing search engines have each developed their own proprietary search algorithms, conventional search engines are based solely on full text indexing.

Search engines based solely on full text indexing provide any information that contains the keyword(s) entered by a user. This includes both information that is relevant to what the user is looking for and information that is irrelevant. Improvements in conventional search technology only increase the probability that the needed information will be on top of the result list. As long as search technology is solely based on indexing, efficiency cannot be improved significantly.

Indexing has its merits, yet, in an improved search engine, full text indexing would be just a part of a greater approach to the problem of finding information. What users expect from a search engine is concentrated knowledge, matching their search criteria. However, conventional search engines dilute knowledge by inundating search results by including millions of meaningless keywords, taken out of context.

5c. Unstructured Search Results

Conventional Internet search technology delivers search results to the end user in an unstructured format. This is so even if the conventional search engines structure and categorize web pages internally. If a user wants to store a useful link to a web page for future reference, the user has to add the web page to a web browser's list of favorite web pages and manually organize them in a hierarchical directory tree. Besides structuring information not being a popular activity for most users, even perfect bookmarking has the disadvantage that the fruits of such efforts cannot be shared with other users. Every user has to create a new list of favorites and organize it individually.

5d. Full Search Cycle

Conventional search engines boast response times of fractions of a second. For example, if a keyword were entered into a conventional search engine, in addition to the search results, the search engine may provide that proud statement that the search was completed in 0.28 seconds and resulted in 226,000,000. A response time of 0.28 seconds for 226,000,000 links seems fast, but such numbers should not lull us into the false sense that search on the Internet is a fast process.

Search engines provide only a tiny portion of a chain of transactions that constitute a full search cycle. A full search cycle includes the following phases: (i) formulating the search criteria, (ii) sending requests, (iii) processing requests, (iv) sending search results, (v) evaluating search results, (vi) selecting results worth saving for future reference, (vii) categorizing selected information, (viii) storing selected information, (ix) sharing selected information with other users (optional), and (x) managing access right to that information (optional).

Accordingly, conventional search engines are responsible only for phase (iii) and (iv) of the full search cycle. The rest of the full search cycle, which is the most time-consuming part of the cycle, is managed manually by the user. Thus, search engines provide only the raw material for search, the real search starts after one gets the results from a search engine.

5e. Search results are statistically not evaluable

Statistical analysis of existing information resources is an important tool for most businesses. However, statistical analysis requires that those resources possess at least a certain degree of structure. Due to lack of structure most information on the Internet and in local networks, the information cannot be used for statistical analysis per se.

Although today the source of most web pages is generated based on information stored in structured databases, the transfer to common HTML format strips off any structure. It is the recipient's task to categorize the received information again. Due to immense complexity and costs of such a task, this happens seldom.

6. Cloud Computing

Cloud computing is providing the means through which everything, from computing power to computing infrastructure, applications, business processes to personal collaboration, can be delivered to the user as a service wherever and whenever needed. The main advantage of cloud computing is that the user can outsource the entire IT infrastructure including server hardware, storage, databases and applications and scale these services up and down in accordance with changing needs.

Cloud computing does not improve the attributes of conventional information technology discussed above. It just moves the existing manual, human-driven, mouse-controlled IT model into the cloud. Today's cloud solutions are simple copies of local solutions transferred into the cloud. It would be beneficial to find a method to automate cloud computing and integrate single, isolated cloud solutions into one single integrated solution.

Additionally, attributes of conventional information technology include spam, security breaches, virus threats, identity theft, redundancy of information. An alternative capable to overcoming the shortcomings of conventional information technology is desirable.

Figure 2:
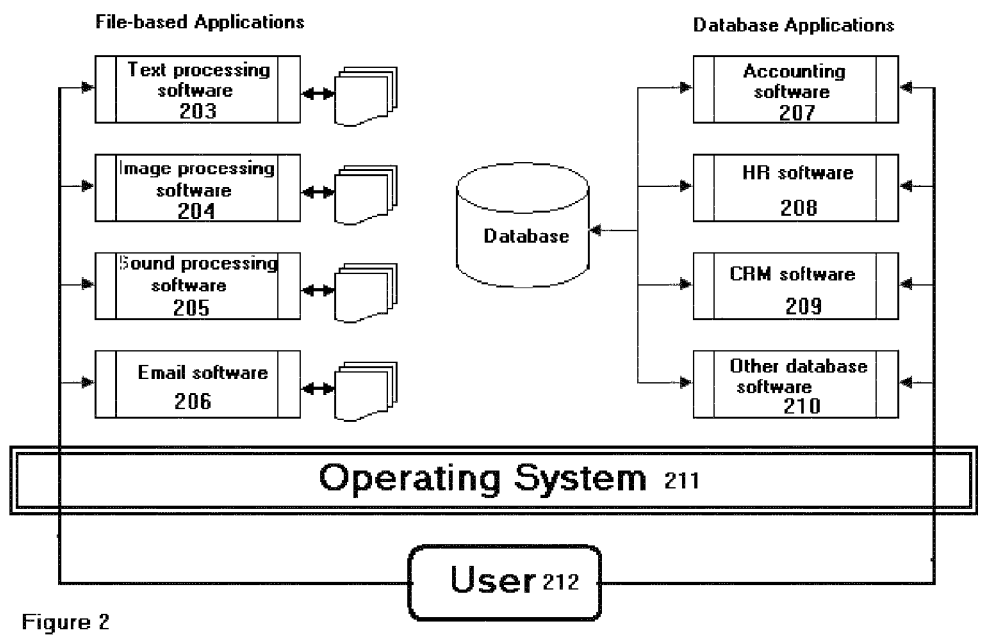
FIG. 2 depicts a schematic diagram illustrating the way conventional software applications work.

FIG. 2 depicts a schematic diagram illustrating the way conventional software applications work. On the left in FIG. 2 are examples of file based applications including text processing software 203, image processing software 204, sound processing software 205 and email software 206. On the right in FIG. 2 are examples database applications including accounting software 207, human resources (HR) software 208 and customer relationship management (CRM) software 209 and other database software 210. These applications require the presence of an operating system 211. Otherwise, they are totally isolated from each other; there is no interaction between them. The only connecting force is the user 212, who stores the separate application files into a directory structure of the user's choice.

Figure 3:
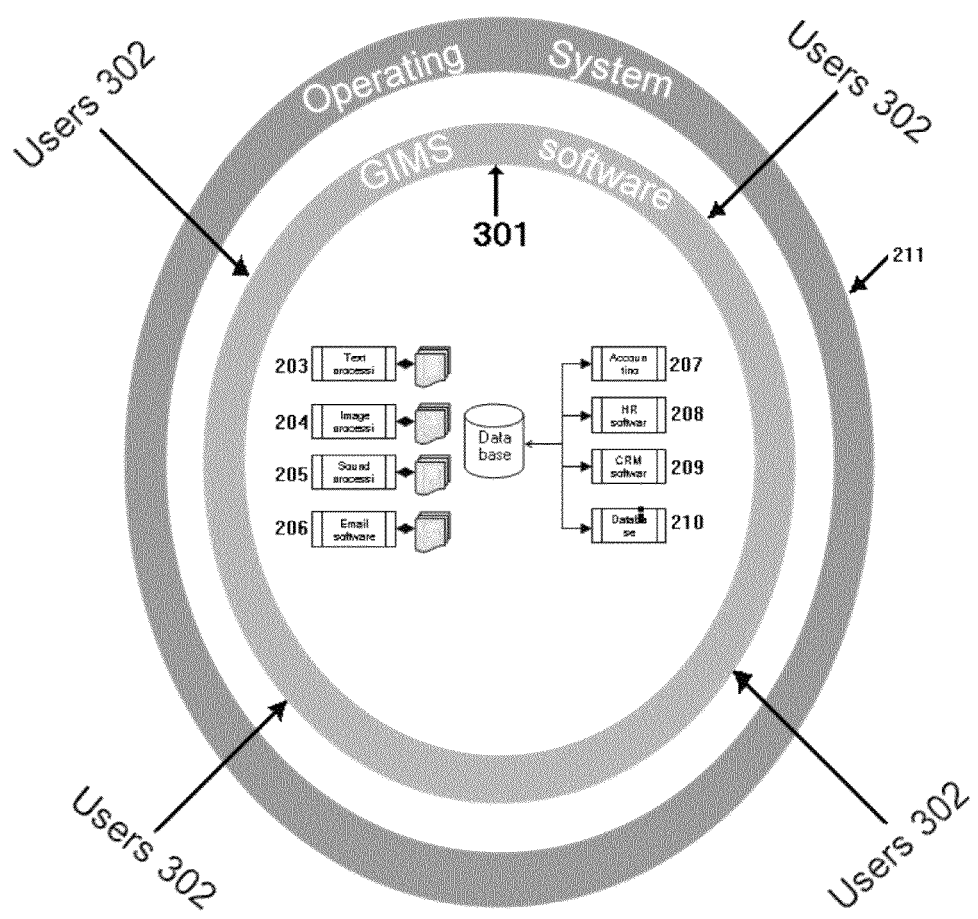
FIG. 3 depicts a schematic diagram illustrating GIMS software as a layer between applications and users according to one embodiment.

Here is where the integrating and managing function of embodiments of the GIMS software according to the present invention comes in. In some embodiments, the GIMS software is installed on a plurality of computer systems that are interconnected via a communications network. The network is preferably global, i.e., a wide area network like the Internet but, in some embodiments, the network may be a local area network, an intranet, a cellular network or any other type of communications network. In preferred embodiments, the computer systems each include one or more processors and a data storage device capable of storing the GIMS software as a set of machine readable instructions executable by the processor to perform the functionality described herein. Examples of suitable computer systems include, but are not limited to, personal computers, mainframe computers, networks of computers, and mobile devices such as personal digital assistants, smart phones, etc. As shown in FIG. 3, in some embodiments, GIMS software 301 represents an additional layer between applications 203-210 and users 302. The purpose of this layer is to take full control of existing applications and add all the properties of the GIMS concept (e.g., access control, categorization, cloud functions and/or others) to information, created by those applications. Thus, GIMS software 301 may prepare local information, which is created by a variety of software applications (e.g., applications 203-210), to be part of a Global Information Management System according to the present invention.

In preferred embodiments of the invention, each computer system has access to a relational database management software application or system (RDBMS). Conventional relational database management systems (RDBMS), such as Oracle, SQL Server, MySQL, Access and others, may be used for this purpose. While RDBMS have existed for many years, the use of these powerful tools is not widespread among the general public. The implementation of database solutions usually occurs in the corporate world, in large web sites or among software developers. The average consumer rarely uses a RDBMS of any kind.

In some embodiments of the present invention, mandatory use of a RDBMS is required. In these embodiments, unlike the present-day Internet, where browsers do not require the use of RDBMS, a computer system cannot be part of the GIMS network without using a RDBMS. However, the GIMS of the present invention may be platform-independent. As a result, even when use of an RDMBS is required, any RDBMS may be used with global information management systems according to embodiments of the present invention.

Embodiments of the present invention enable standardization of business logic. For particular needs (e.g., contact management or accounting), countless conventional proprietary software packages have been developed. Each of the software packages has their own set of requirements. Such variety of existing approaches hampers any attempt to establish an automatic data exchange mechanism between different software packages.

However, a closer look will demonstrate that each of those solutions contains a great number of common requirements, thus creating a common base for standardization. So, despite the fact that requirements for an accounting system for an individual, small company or large enterprise can differ significantly, they are all based on common accounting rules and regulations. Even if we add the fact that accounting and tax laws differ in different states or countries, there are still more commonalities then dissimilarities.

The sum of requirements and procedures of a particular application is called its business logic. The generally relevant parts of the business logic are the foundation for standardization in a particular field of knowledge or human activity. A GIMS network according to an embodiment may take advantage of and/or bring about the standardization of business logic.

The GIMS is a database-centered solution. Consequently, the database is the most appropriate place to store the common business logic. Some embodiments of the present invention express the common business logic by setting a common database structure, i.e. database tables and columns. In some embodiments, all databases in a GIMS environment have the same structure (e.g., same table names, column names, column properties).

This point is explained further by creating an example of a contact management application. The goal in the example is to create a standardized application that is useful in any country of the world. In developing the requirements for such an application, different formats for postal addresses in different countries will have to be addressed. Below are two address examples for the USA and Germany.

| Address in USA | Address in Germany |
|---|---|
| John Smith | Hans Mueller |
| 1001 Main Street | Skalitzer Strasse 140 |
| Gaithersburg, MD 20878 | 10999 Berlin |
| USA | Germany |

Let's look at the various elements of an address:

| Element | USA | Germany | Comment |
|---|---|---|---|
| Name | John Smith | Hans Mueller | |
| Country | USA | Germany | |
| State | MD | — | Although Germany consists of 16 federal states, the state name is not used in the postal address. In the US, the state name is a mandatory part of the postal address. |

-continued

| Element | USA | Germany | Comment |
|---|---|---|---|
| City | Gaithersburg | Berlin | |
| Zip code | 20878 | 10999 | |
| Address | Main Street | Skalitzer Strasse | |
| Number | 1001 | 140 | In US the street number is placed before the street name, in Germany after the street name |

As we can see from this example, the formats are, though not identical, quite similar. The elements of a postal address like country, city, zip code etc. are common for most countries, although used slightly different. This example demonstrates that for a particular application, in this case address management, there is no need to create a database design again and again.

To the contrary, by thoroughly analyzing a subject, it is possible to set a unique standard, which can be used by any user worldwide. Embodiments of the present invention take advantage of such standardization to create a GIMS and ensure automatic and structured data exchange between computer systems.

The standardization of address formats is not new. So, for example, OASIS, The Organization for the Advancement of Structured Information Standards, has issued the xAL standard (Extensible Address Language (xAL) Standard Description Document for W3C DTD/Schema Version 2.0). The main purpose of this standard is the ability to represent addresses of any country irrespective of culture, religion, language and geographic location. Some embodiments of the present invention may use extensible markup language (XML) as the chosen format to present the xAL standard.

Similar to xAL there exist a variety of standards, developed by international standard organizations, which describe the business logic components of many applications. However, despite these important efforts, most conventional applications do not follow those standards. Instead, they develop their own, proprietary solutions.

These standards have one thing in common: they are limited in scope and are not mandatory. It is up to the developer to decide whether to apply the standard fully or in part, to use databases or other means to store information, etc. In contrast, some embodiments the present invention, while adhering to the idea of global standardization, go several steps further. In some embodiments, the goal is the creation of a unified and fully functioning Global Information Management System that integrates standards with practical functionalities like structured data exchange, authentication, security, redundancy prevention and/or the other characteristics discussed above. In some of the embodiments demanding the mandatory use of relational database systems, standards are not presented in a loose form of an XML file but as strict requirement to the structure of application databases (e.g., table and column specifications). Below, unless otherwise specified, "standard" or "standardized" refers to the standards established as part of the GIMS network. In these embodiments, all systems (i.e., nodes) in the GIMS network may have exactly the same database structure. However, as an alternative, in some embodiments, one or more systems in a GIMS network may have the standard GIMS database structure but with one or more non-standard elements.

In summary, meaningful standardization of any field of knowledge is possible. There is no need for proprietary solutions (although proprietary solutions can also be accommodated in some embodiments of the present invention). There are no objective obstacles, which could prevent the development of a common global standard to manage electronic documents, accounting information, news, cultural events, flight schedules, calendar applications or any other type of information. These common standards can be flexible enough to satisfy the specific needs of any entity, at the same time providing structure and clear orientation to achieve an intelligent Internet.

In some embodiments, application standardization means that across all nodes of the GIMS network the database structure is identical. Identical database structure means that all table names, column names and their parameters (e.g., data type, length, primary and foreign keys, indexing etc.) are strictly defined and identical in all databases. However, each system may have the choice to use the full standard or a subset according to its needs. In other words, each node in the GIMS network must include at least a subset of the standardized database tables to take advantage of the benefits of the present invention.

In embodiments of the present invention, computer systems in a GIMS network may be uniquely identified. A computer system (node) in the GIMS network may be presented through the following hardware configurations: stand-alone personal computer (PC) or laptop, mobile device, local area network consisting of multiple PCs, and/or mainframe. At least one instance of a database may be installed or otherwise accessible in any configuration. In some embodiments, installation of at least one instance of a database is required.

According to some embodiments of the present invention, a system (i.e., node) in the GIMS network is the combination of database and GIMS software package, installed on one of the hardware configurations above. To fulfill its functions, each system may have a network-unique identification (ID). These unique IDs may be used for authentication purposes in all automated transactions within the GIMS network. In some embodiments, the unique system ID is an integer number starting with the number 1. The GIMS method may contain a set of standard procedures to assign and distribute network-unique system IDs as well as to ensure proper protection of the system ID of each system.

Similar to the centralized domain registry procedure in today's World Wide Web (WWW), the GIMS network may require a centralized mechanism for registering systems and assigning system IDs. According to some embodiments, the GIMS network includes a central registration database (CRD) (See, e.g., FIG. 8 at 802). The CRD is a modified GIMS system (i.e., node) that is similar to other nodes but differs by a number of unique functions, including the assignment of system IDs. Other functions of the CRD are similar to other GIMS nodes/systems. The CRD may be a public database and may be accessed by any GIMS system without restrictions. The CRD may operated by a Registration Authority.

Each registered system in a GIMS network may receive a network-unique system ID from the CRD, and, after receiving the network-unique system ID, each registered computer system may add the following information about itself to the CRD database: (a) system information and/or (b) user(s) information.

In regard to system information, a GIMS computer system can provide general information like which entity owns the system, type of entity (e.g., private, family, company, non-profit, educational institution, government office etc.), contact information, activity profile and more. Functionally, this may be comparable with the home page of a web site.

In regard to the user information, after receiving the user information from a particular computer system, the CRD may assign a globally (i.e., network) unique ID to each user of the particular system. This user ID may be used for a number of functions including global assignment of access right to information, as address information for messaging services (replacing the email address), to identify the buyer or user in e-commerce transactions and/or many other purposes.

In some embodiments of the present invention, to fully automate the entire scope of functions within a global information management system, a method is used to uniquely identify any piece of information.

The entirety of computer information can be divided into two main categories: (i) unstructured file information and (ii) structured database information.

In regard to unstructured file information, this category of information is used to store text, image, video or any other file formats. In conventional information management systems, the file name is the main identification parameter of a file. A file name ID is not unique because it is possible to assign the same file name to files with different contents, as long as they are stored in different directories.

In regard to structured database information, database information is also stored as a file, yet this is a separate category, since, unlike common files, the information in database files is precisely structured. The basic information unit of a database is a record within a database table. A record consists of one or more columns. The unique ID of a record within a table is determined by the primary key.

However, in conventional information management systems, the uniqueness of a primary key is usually limited within a table. In other words, in a conventional IMS, the values of primary keys in one database can be repeated in the primary keys of other tables within the same or other databases. Therefore the conventional way to identify information cannot be used to globally and uniquely identify information. Although there is a standard for creating globally unique identifiers, like GUID, this conventional standard alone is not suitable to uniquely identify records within database tables of GIMS systems across the GIMS network.

The main reason why GUID cannot be used for the purpose of uniquely identifying information in a GIMS network is the fact that uniqueness is its only useful property. For example, a string like 21EC2020-3AEA-1069-A2DD-08002B30309D is unique, yet other than that it does not contain any other useful information. It is meaningless.

According to some embodiments of the present invention, the network-unique identifier may meet the following requirements: global (i.e., GIMS network) uniqueness, contain data about creator of information, contain information about the record content and/or contain information about record location. According to some embodiments of the present invention, a method to generate global (i.e., network) unique identifiers, which fulfill the requirements above, is provided. Such IDs may be referred to as GIMS IDs below.

Using the GIMS ID, embodiments of the present invention may assign network-unique IDs to all components of the GIMS network including, yet not limited to systems, users, database records, file names, access settings, automated transactions and/or many others. In combination with automated software modules, this may ensure full automation of all processes, high security, elimination of redundancy, tracing of user activities and/or many other useful functions of the GMIS method.

Normalization is a standard technique used in database design. One of the results of normalization is that certain information is entered in a database only once and assigned with a unique key. This key is used for all further references to that information, thus eliminating the necessity of redundant data entries.

A classical example of this kind of normalization is the way company information is entered in a database. Let's assume that vendor "Bagel Inc." in New York has been entered in a contact management application. The database may store this information in table "Vendor" and automatically assign a unique record ID "123." When referring to the same vendor while entering order information in table "Order," it suffices to enter ID "123" in column "VendorID."

The shortcoming of such approach is not only that "123" is not a unique value and table "Order" may also contain an order record with OrderID="123." In addition, such normalization is limited to the current database only. For instance, if the same vendor "Bagel Inc." in New York has been entered into the same application of another company, then the ID of that record will most likely differ from "123." Thus, normalization is achieved only on local level, within a single database.

Embodiments of the present invention may use a GIMS ID method to achieve global normalization of databases in the GIMS network.

Further, in some embodiments, the goal of the GIMS is the global normalization of all databases. Although initially each GIMS user system will create unique, but non-normalized records in its own database, there may be a special mechanism in place that will gradually and automatically normalize these records across multiple databases worldwide.

This kind of normalization is not a goal in itself. After completion, it may provide any computer user a unique reference to any kind of information. For example, all entities, starting with individuals, over small businesses to large enterprises and governmental institutions may have a unique ID, which may be used as reference in any kind of software application. Global normalization is not limited to living individuals or active companies. It may include also all historical personalities in an unambiguous way.

For example, the word "Shakespeare" can refer to the great English writer and poet as well as to the name of a restaurant in Ellwood City, Pa. If a GIMS method in accordance with an embodiment of the present invention were to assign globally unique and meaningful IDs to each of these entities, the GIMS method would provide a commonly used reference to any object in the past and present and enable users to differentiate between information/objects of different nature, yet similar names.

Some embodiments of the present invention also relate to the standardization of applications. Unlike the World Wide Web, where different types of unstructured information can be found in a particular web site or even single web page, different types of information in the GIMS network may be stored in separate databases. For example, address information may be stored in a "contact" database whereas currency rates may be stored in a "currency" database.

As discussed above, it is reasonable and possible to create a common database structure that has the capacity to meet the requirements of the vast majority of computer users worldwide. Based on that assumption, the nodes of embodiments of the GIMS network may be databases with identical table structure.

For each application, a universal database structure may be defined. The term database here is used as an abstraction. A database may be a logical group of database tables, which together represent all parts of an application. Physically these tables might be located on distributed computer hardware.

According to some embodiments, the GIMS method may include one or more of the following databases/applications:

| Application/Database | Description |
| --- | --- |
| System Database | May contain tables to cover one or more of the following functionalities:<br>Database structure<br>System and user authentication<br>Local and global information access management<br>Security, information protection<br>Record management<br>Redundancy prevention<br>Data exchange<br>User performance management system<br>Other |
| Contact Management (Entity) | May manage information about all entities (individuals, companies, organizations, historical personalities) as well as addresses, contact information and/or entity profile. |
| Document Management | Global document management system. May manage unstructured files like text, image, audio, video, web sites and/or other file formats on local networks and the Internet (cloud). |
| Communication | May manage all kind of communication. May include a new format of electronic communication, called DB-mail. This application may integrate traditional communication channels like email, fax, letters and/or others. |
| Project | This application may include one or more of:<br>Project management<br>Task management<br>Work flow management<br>Calendar |
| E-commerce | May be a complete e-commerce solution enabling systems to be seller and buyer at the same time without building an additional e-commerce infrastructure. |
| Other applications | The GIMS method may be well-suited to be used for any kind of database application like Weather, News, Sports events, Medical, Events etc. |

The System Database may be the foundation for all other applications. Its functions may be standardized and application-independent. In some embodiments, any application listed above as well as any new application, developed based on the GIMS method, can use functions of the System Database without the need to build them separately. Further, the properties of the System Database may be designed to meet the security and manageability requirements of any entity, from average private user to highly classified applications.

Embodiments of the present invention may include the standardization of information exchange between computer systems. As noted above, each computer system (i.e., node) of the GIMS network may be a database application. For that reason, data exchange between computer systems of a GIMS computer network may always a data exchange between databases.

Similar to other database applications, in embodiments of the present invention, there may be four basic transaction types between systems: insert new record, update existing record, delete existing record and query database. As noted above, all systems in the GIMS network may use applications with identical database structures. The standardization of database structures facilitates the task of data exchange between these systems.

Figure 4:
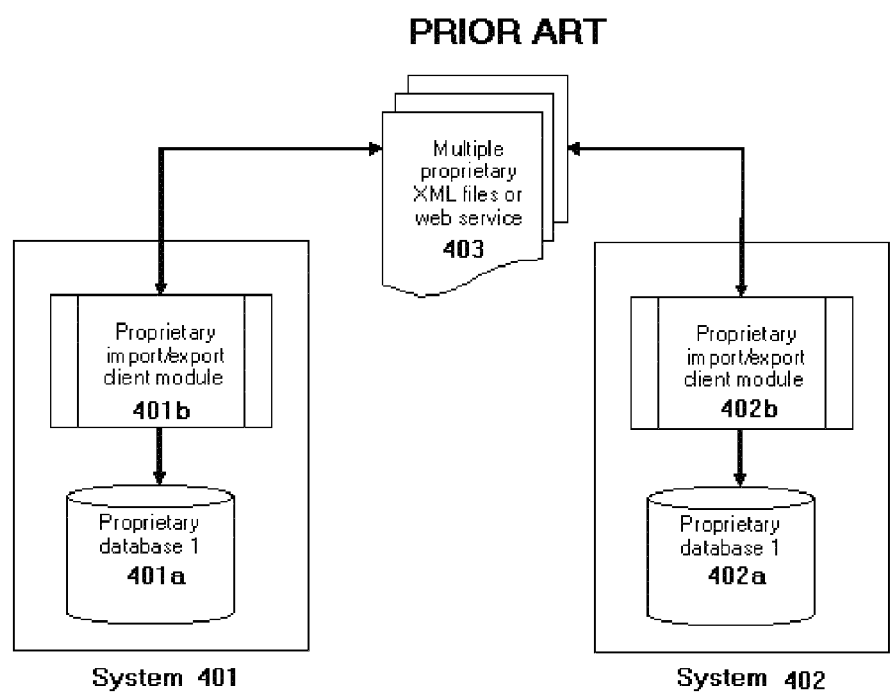
FIG. 4 depicts a schematic diagram illustrating conventional structured data exchange.

For data exchange purposes, standardized file formats like XML, CVS or any other structured file format can be used. This approach differs significantly from the way structured information is exchanged conventionally using methods and protocols like web services, SOAP and XML. FIG. 4 illustrates this kind of conventional structured data exchange.

The traditional approach uses of proprietary database structures 401a and 401b in system 401 and system 402, respectively. As a result, a custom interface 401b or 402b is required for every service 403. That translates in the necessity to create millions of such proprietary software modules.

This number is still relatively low, since the majority of average computer users does not use databases at all and lack the technical expertise to enjoy the benefits of structured data exchange. The number of proprietary software modules would be an order of magnitude bigger if billions of computer systems would join the world of structured data exchange.

Figure 5:
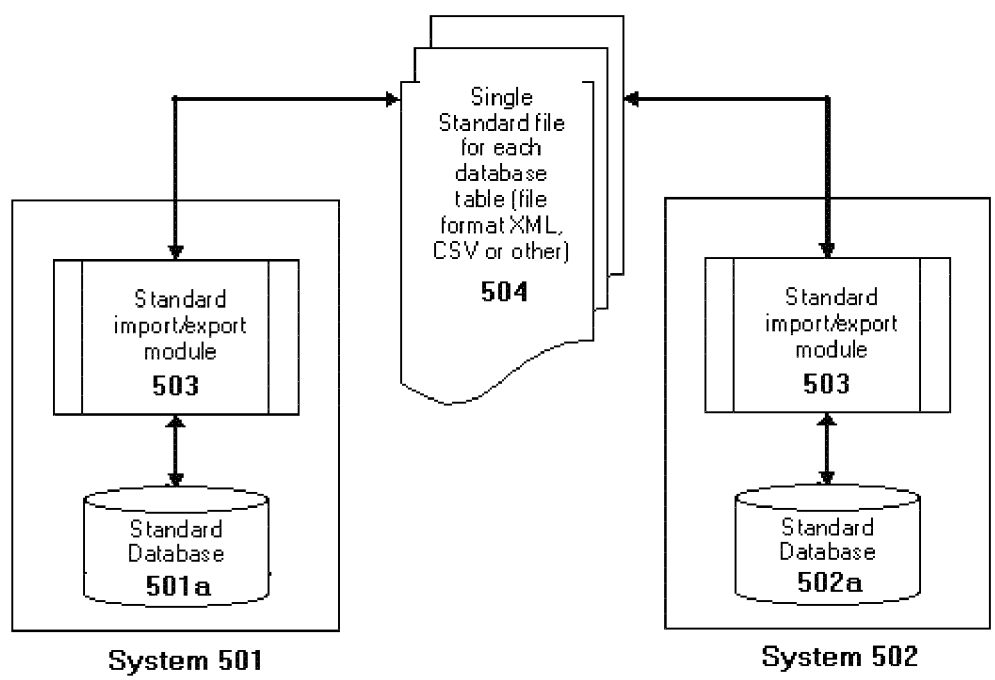
FIG. 5 depicts a schematic diagram illustrating a standardized import/export module facilitating structured data exchange between computer systems of the GIMS network according to one embodiment.

In contrast, as illustrated in FIG. 5, data exchange between computer systems 501 and 502 in an embodiment of the GIMS network may require the development of only one standardized import/export module 503. The standardized import/export module 503 may handle one standardized file format for each database table of standard database 501a or 502b of computer systems 501 and 502, respectively. Accordingly, a single standard file 504 may be used for a database table in both the standard databases 501 and 502. It may allow automated, structured data exchange between unlimited numbers of systems and does not require any additional technical expertise from the end users.

The use of XML files for data exchange is not mandatory, since the common standard is already defined by the commonalities of the database structure. Any type of structured, platform-independent file format (e.g., comma-separated values (CSV, XML or others) can be used to transport data between databases of computer systems of a GIMS network.

Embodiments of the present invention may include non-standard elements in GIMS databases. Although embodiments of the present invention emphasizes the idea that proprietary database structures are not necessary and can be replaced by a global standard, it is likely that a global (i.e., GIMS network) standard does not fully satisfy a relatively small number of users or systems. There might be a need to customize the standard to meet very specific requirement of a single system or a small group of systems.

Some embodiments of the present invention provide a method to extend the standard to allow customization for specific needs. Nonetheless, embodiments of the present invention ensure automated and flawless structured data exchange between databases with standard or modified data structures.

Figure 6:
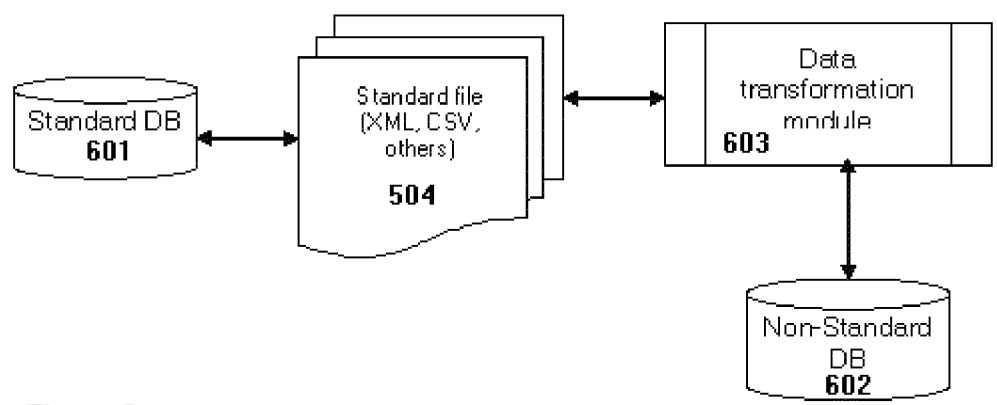
FIG. 6 is a schematic diagram illustrating data exchange between a standard GIMS database and a database having a different database structure according to an embodiment of the invention.

Embodiments of the present invention may include transferring data from a proprietary database into GIMS format. In principle, as shown in FIG. 6, data exchange is possible also between a standardized database 601 of a GIMS computer system and databases, such as database 602, having a different database structure. This would require an additional, proprietary data transformation module 603. However, such an approach is not preferred because it comes with higher maintenance costs.

Embodiments of the present invention may include standardization of authentication and/or security procedures. For instance, an embodiment of the GIMS method may require a single, global authentication procedure for systems and users. Since system IDs and user IDs are worldwide (e.g., GMIS network) unique, the authentication is capable to unambiguously authenticate systems and users on a global (e.g., GMIS network) scale.

The database is the centerpiece of embodiments of the GIMS method. The database is not only the depository of useful application information; it is also the depository of system-relevant data necessary to automate all background processes. Consequently, all information related to system and user authentication may be stored in a group of standardized database tables. Authentication may be verified by a standardized database application.

Figure 7:
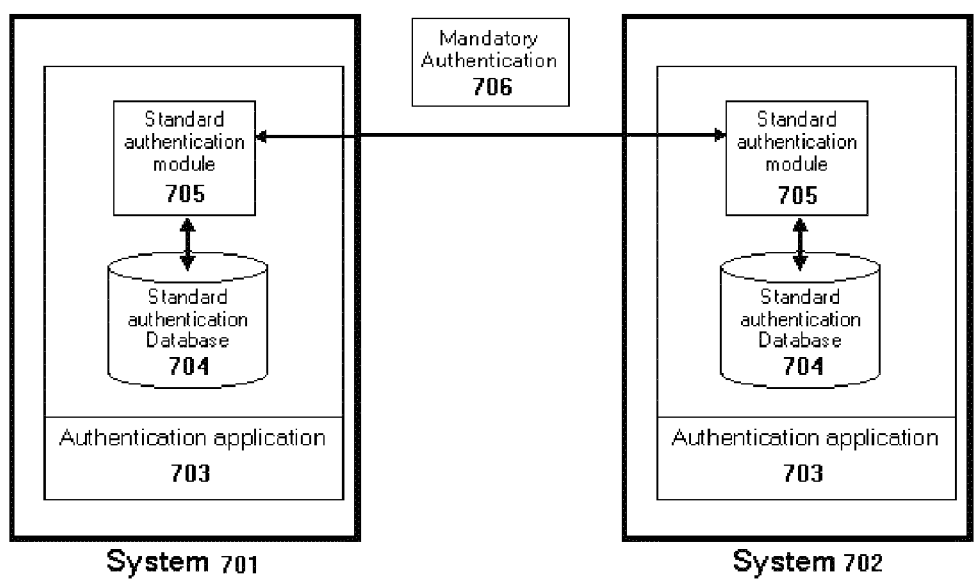
FIG. 7 illustrates a simplified schematic diagram of an authentication procedure between two GIMS computer systems 701 and 702 according to an embodiment of the invention.

FIG. 7 illustrates a simplified schematic diagram of an authentication procedure between two GIMS computer systems 701 and 702 according to an embodiment of the invention. Systems 701 and 702 each have a standardized database application 703 that may include a standard authentication module 704 stored in a standard authentication tables 705. The standardized database application 703 may perform a mandatory verification 706 of authentication when data is exchanged between computer systems 701 and 702. Authentication may be an automatic background procedure and mandatory in any interaction of two systems on the GIMS network.

Embodiments of the present invention may include a standardized method of access right management (ARM). Embodiments of the GIMS method may require standardization of procedures regulating access right management on a global (i.e., network) scale. Such a standard may be based on the unique system and user IDs mentioned above. It may allow managing information access rights in an extreme fine-grained fashion down to database record and even column level on a global scale. Access right information is stored in a standardized database table group.

Embodiments of the present invention may include a standardized method to control information redundancy. The redundancy control method may be based on the globally unique method of GIMS IDs. Special standardized software modules may automatically monitor incoming information and ensure prevention of information redundancy.

Embodiments of the present invention may include an offline method as the prevailing connection method. Generally, there are two methods to interact with a remote computer system: online method and offline method. The online method presumes the presence and active participation of a user at least at one of the interacting computer systems. The offline method presumes that all transactions are performed automatically and therefore no user involvement is required.

Today's IT technology is dominated by the online method. Web surfing, working with search engines and even cloud computing are online operations. Offline, i.e. automated solutions, are rather an exception.

Embodiments of the present invention may be predominantly based on offline procedures, which do not require the presence of the end user. Online transactions may be invoked only when the presence of end users on both sides is absolutely required (for example, for a phone conversation or video conference).

Embodiments of the present invention may have no direct interaction between systems of a GIMS network. In order to (a) simplify the process of data exchange and (b) raise the security level, in some embodiments, two systems within the GIMS network never interact directly with each other. Similar to email systems, each GIMS system may have an Inbox/mailbox in the Internet/cloud. The sender system may always send its messages not directly to a receiver system but to its mailbox. The receiver system will regularly and automatically check its mail box and retrieve the content for further processing.

Thus, a system on the GIMS network, although connected to the Internet, may always work in disconnected mode. Consequently the user, in contrast to net surfing, always works locally. This does not mean that the user is confronted with delays and long response times. To the contrary, the response time may be mostly shorter. In addition, the disconnected mode will dramatically improve the overall security situation.

The Internet as a global Information environment would not be possible without a set of widely-accepted open standards and formats. These standards were focused mainly on presentation and transport of data, less on data structure. In contrast, embodiments of the present invention may be based on the assumption that data structures of a certain application can be standardized in a way that such standard would be powerful and flexible enough to satisfy the requirements of any user or entity worldwide. Accordingly, embodiments of the present invention may be based on a set of standards. This set may include existing standards as well as a number of new standards.

The emphasis of embodiments of the present invention may be based on common data structure, which may be efficiently achieved by a global requirement of identical database structures across the entire GIMS network. Embodiments of the present invention may include the creation of a Global Information Management System, which is based on such common application database structures.

Embodiments and methods and system for global information management will be explained further based on simplified examples. Since the database structure of globally valid applications may be complex and include a large number of tables, for the sake of simplicity, the examples used in this disclosure may not use a full-fledged database design but a simple subset with limited number of tables and columns. Further, all names and acronyms used in those examples are for description purposes only. The practical implementation of this invention may be based on already existing application data structure standards and/or on those still to be developed in the future.

Applications based on this invention may be written using the client-server and/or the web application model. All examples used in this paper are based on the web application model.

Provided below are examples of: (1) participants of a GIMS network, (2) standard GIMS application IDs, (3) standard database tables and columns, (4) unique computer IDs within a computer system, (5) the unique GIMS ID as universal data type of primary keys in database tables, (6) data exchange between GIMS systems, (7) the system application, (8) categorization and classification, (9) document management, (10) prevention of the disappearance of public Internet information, (11) multitasking and (12) network off-switch as an additional security measure.

1. Participants of a GIMS Network

Participants of a GIMS Network according to embodiments of the present invention are discussed below in regard to (a) system types, (b) the system ID, and (c) the central registration database (CRD).

1a. System Types

The GIMS network according to an embodiment of the invention consists of three distinguished system types: (i) the central registration database (CRD), (ii) regular systems and (iii) satellite systems.

In embodiments of the present invention, there may be only one central registration database in the entire network. The CRD may be operated by a Registration authority. The main purpose of the CRD system may be the registration of all other systems. Although the registration technique is different, it may play a role similar to web site domain registration. However, the CRD may perform additional functions, which will be described below.

In embodiments of the present invention, computer systems other than the CRD are regular or main systems. Regular systems in the GIMS network may be functionally equal. Regular systems may have common properties. One common property may be the mandatory installation of at least of one instance of a RDBMS. Another common property may be the mandatory installation of the following GIMS software modules and databases: (i) system application, (ii) contact management application, (iii) document management application and/or (iv) communication application. Each computer system may be able to install additional GIMS applications like project management, e-commerce, accounting and/or many others. The installation of identical applications on both regular computer systems may be a prerequisite for data exchange between the two systems. With exception of contact management, two systems may be able to exchange data between all applications. A regular computer system may be able to exchange contact management data only with the central registration database.

A satellite system is a subsystem of a regular computer system. In that sense, the regular system may also be referred to as a mother system. One mother system can maintain several satellite systems (i.e., subsystems). The main purpose of a satellite system may be to add mobility for the end user of a mother system. Although a regular (i.e., main or mother) computer system may be installed on a mobile device, most GIMS applications are installed on stationary hardware like stand-alone PCs or local networks. A mother computer system can create for each system user an instance of itself, which allows user to work in stationary or mobile mode.

A satellite computer system is technically identical with the main (i.e., regular or mother) computer system except that all interactions with other systems may occur through the mother system. The data in the database of a satellite system may be a subset of the data in the database of the mother system. Theoretically, the data in the database of a satellite system can be equal to the data in the mother system, yet never greater. The technique of data exchange and synchronization between mother and satellite system may be identical to data exchanges between regular systems. This exchange may be based on a method called "smart replication," which will be explained in greater detail below. Data additions and updates, performed in the satellite system may be automatically replicated (full replication) to the mother system. The mother system may automatically replicate information to the satellite system that is assigned to the satellite system (partial replication).

1b. The System ID

A GIMS network-unique (i.e., globally unique) system ID may include two parts: a main system ID and a satellite system ID. The main system ID and the satellite system ID may be separated by an underscore ("_").

For example, if 19456_0 is the system ID of a main (i.e., regular or parent) computer system, the satellite system ID "0" indicates that this is the system ID of a main system (i.e., regular or mother system). If 19456_23 is the system ID of satellite system 23 in main system 19456_0, the sub-system serves only a single user of the mother system 19456_0.

The main computer system ID may be assigned by the central registration database during the software installation process. The satellite system ID may be created by the main system. The installation of GIMS software on a satellite system may be initiated by the system administrator of the main system. The installation procedure for satellite systems may occur automatically and may be part of the GIMS software package.

1c. The Central Registration Database (CRD)

The System ID of the CRD may be "1_0". The main functions of the CRD may be: (i) global yellow pages, (ii) system registration and (iii) worldwide normalization of contact information.

In regard to global yellow pages function, one of the main purpose of the CRD may be the creation of a centralized, global "yellow pages" database, which may contain information about all individuals, alive or past, companies and organizations, their business profile, geographic locations, postal address and/or more. The central registration database may distinguish itself from other similar databases by assigning a network-unique ID to every such object using the GIMS ID. Having a unique and meaningful ID may lay the foundation for a global normalization of contact management information, which can be used as global reference in many other applications (e.g., e-commerce, communication, document management and/or others).

Prior to the launch of the GIMS network, the registration authority may compile a huge contact information database by mapping publicly available information sources. It may assign a unique GIMS ID to every object of that database. This initial database may grow with each new registration as well by continued efforts of the registration authority.

In regard to the system registration function, the CRD may be the single and central instance to register all participants of the GIMS network. This function, although technically different, may be comparable with the centralized system of domain registration in the Internet.

The GIMS software installation may start with a registration procedure. The system administrator of a particular system may have to fill out an on-screen registration form and provide basic information about the owner of the system, which can be an individual, a family, a company or any kind of organization. Using the registration form, the system may also provide additional information including address, phone number, email and/or company profile etc.

After completing the registration form, the system administrator may click on a button to send the registration request to the CRD. Before sending the registration, software on the computer system may generate a number of private and public encryption keys. The private keys may be encrypted and stored in tables of the system application. The public keys may be added to the registration message and sent to the CRD.

After receiving the application the CRD will prepare a registration confirmation package which may include: (i) a unique System ID, (ii) a set of IDs that uniquely identify the system owners contact information, (iii) a set of public encryption keys owned by the CRD and (iv) a set of standardized system information.

In regard to the set of IDS that uniquely identify the system owners contact information, the CRD may check the owner information against its own database. If the names, addresses etc. of the applicant already exist, then the appropriate GIMS IDs may be added to the confirmation package. Otherwise, the CRD may create new records in its own database and add those new IDs to the package. This procedure may ensure that not only the system IDs of GIMS participants are unique but also that the contact information of their owners is unique.

In regard to the set of public encryption keys owned by the CRD, these public keys may be required for the system authentication procedures discussed above.

The GIMS concept may be based on a set of global standards. The CRD may be the depository of those standards and may be responsible for worldwide distribution of the standards to all GIMS computer systems in the GIMS network.

After getting the registration package, the new system may import the data into the system tables. This will complete the registration process and the system is operational.

From this point on, each system may be responsible for updating its own information (e.g., contact information, users, profile, etc.). Every addition or update of contact information for this system may be automatically transferred to the CRD and may be available for all other systems. It is up to the discretion of the system what information and in what detail to provide.

In regard to worldwide normalization of contact information, as noted above, the exchange of contact management information between regular systems may not be permitted in embodiments of the invention. This kind of data exchange may be limited to data exchange between a regular system and the CRD. The reason for such limitation may be the goal to achieve global normalization of contact information.

An example of a process of gradual normalization according to an embodiment of the invention is provided below. In the example, companies A and B respectively own and operate GIMS computer systems with system IDs 100_0 and 200_0. During registration, each of companies A and B is assumed to have received a unique company ID, which uniquely identifies that company. These IDs are "C100" for company A and "C200" for company B. Further, both companies have business relationships with a third company C, located in 100 Main Street, Gaithersburg, Md. 20878. Company C is not a member of the GIMS network.

Both companies A and B will enter into their databases information about company C. Each system will assign a different ID to company C. Thus the records, representing company C in both databases, are not normalized.

However, the GIMS software package may have a built-in "normalization" function. This feature may work fully automatically as a background process. By activating this function, the system would query the CRD about company C. Although, in this example, company C is not a GIMS member, there is still the chance that the CRD contains information about company C. In that case, the requesting system would receive a full set of information regarding company C as well the appropriate unique company ID. The "normalization" module would then use this normalized ID to replace not only the record in table "Company" but also all records, where the Company ID was used as foreign key in other applications and tables (e.g., in table invoice, order, shipment etc.).

With each new system, the degree of normalization across all GIMS databases will grow. At a certain point, when hundred millions of individuals and organizations have become part of the GIMS network, the need for each system to maintain individual contact lists will recede. Systems will just query the CRD and get 'official' contact information according to their search criteria. At the same time the CRD will more and more become a self-sustaining system, since every system will actively contribute to its maintenance by updating own records.

Figure 8:
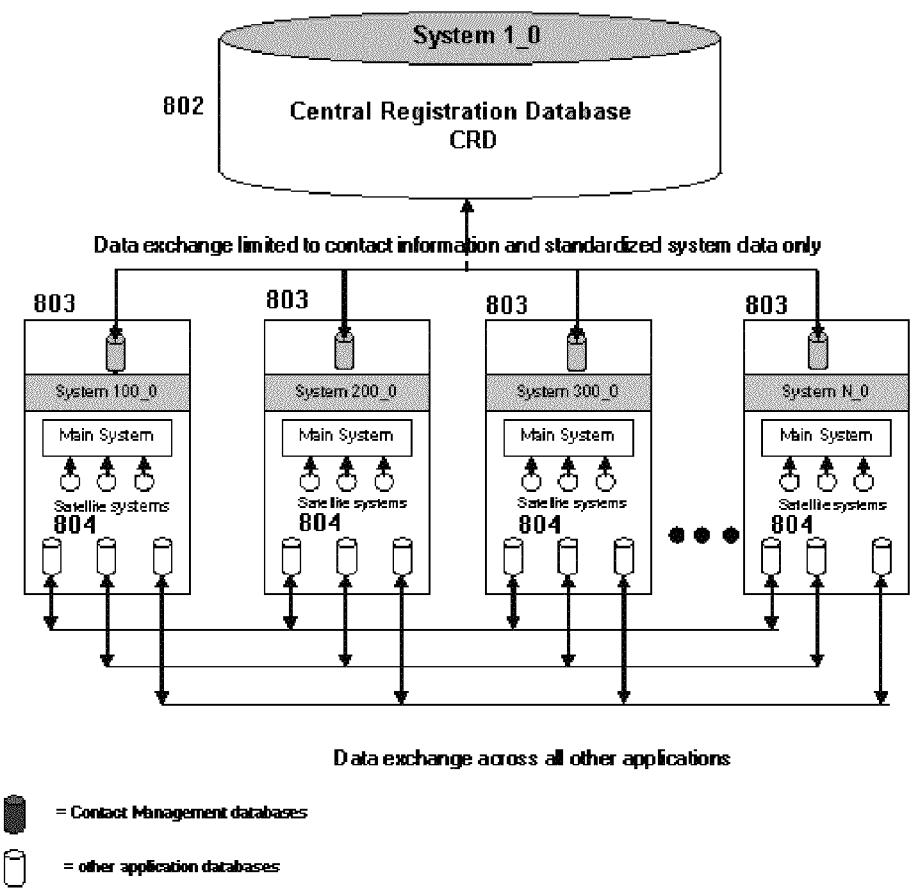
FIG. 8 depicts a schematic diagram illustrating the structure and general scheme of system types in a GIMS network and their relationship to each other according to an embodiment of the invention.

FIG. 8 depicts a schematic diagram illustrating the structure and general scheme of system types in a GIMS network 801 and their relationship to each other according to an embodiment of the invention. The GIMS network 801 includes a central registration database 802 and regular computer systems 803. Each of the regular computer systems 803 may include a processor and memory configured to carry out the function the regular computer systems 803. Further, in this embodiment, the computer systems 803 each have satellite systems 804.

2. Standard GIMS Application IDs

Each GIMS system of a GIMS network may implement a database having a set of standard applications. In addition, each database may have a set of standard tables. The set of standard tables may include system tables and application tables. Each of the database applications may include one or more of the standard tables. Each application of a GIMS system may have a unique ID, which is assigned by the Registration Authority. These IDs may be part of the global standards administered by the Registration Authority. The IDs may be stored in the system table "tblDB," which is part of the System Application. The table below shows an example of applications that may be included in the database of a GIMS system and the IDs of the applications.

| Application ID | Application Name | Comments |
| --- | --- | --- |
| D1 | System | May includes standard system tables and functions to set database structure and to provide system authentication, encryption, data security, access management, redundancy prevention and so forth. The tables within this application are called system tables. The tables in all other databases are called application tables. |
| D2 | Contact Management | Contact management |
| D3 | Document Management | Document Management |
| D4 | Communication | Communication module, including email, fax, DB-mail |
| D5 | Project | Project, time and task management |
| D6 | Support | Support tables: Using normalized IDs makes sense not only for contact information but also for many types of information that are already standardizes in daily use. Examples: International measures for weight, temperature, distance, volume etc. Country codes Languages Classification codes for goods, industries, libraries etc. |
| D7 | E-commerce | E-Commercial application |

In the example, "D3" would be a global, common reference to a document management application and its data. In other words, "D3" would be used to identify the document management application in all GIMS computer systems in the GIMS network.

3. Standard Database Tables and Columns

Each GIMS application may include a number of standard database tables. Similar to the GIMS applications, each table may have a unique ID, which may be assigned by the Registration Authority. These IDs may be part of the global standards administered by the Registration Authority. They may be stored in the system table "tblDBTable", which is part of the System Application. The table below shows sample records of table "tblDBTable".

| Table ID | Table Name | Application ID |
| --- | --- | --- |
| T220 | tblAddress | D2 |
| T221 | tblAddressReference | D2 |
| T223 | tblCompanyType | D2 |
| T200 | tblContact | D2 |
| T201 | tblContactType | D2 |
| T224 | tblDepartment | D2 |
| T225 | tblEmployee | D2 |
| T226 | tblEntity | D2 |
| T228 | tblEntityActivity | D2 |
| T227 | tblEntityType | D2 |

The standard database tables in the example shown in the table above all belong to contact management application (D2). In this example, "T220" would be a global, common reference to table "tblAddress", designed to store address information. In other words, "T220" would be used to identify table "tblAddress" in all GIMS computer systems of the GIMS network. This common reference will be part of the unique GIMS ID, which will be discussed below.

The table below shows an example of records that could be stored in table "tblDBColumn", which belongs to table "tblAddress" (T220).

| ColumnID | TableID | ColumnName | Data Type | Size | PrimaryKey |
|---|---|---|---|---|---|
| 1_0_0_D1_T3_5627 | T220 | AddressID | nvarchar | 50 | TRUE |
| 1_0_0_D1_T3_5628 | T220 | Street | nvarchar | 20 | FALSE |
| 1_0_0_D1_T3_5629 | T220 | StreetNo | nvarchar | 20 | FALSE |
| 1_0_0_D1_T3_5630 | T220 | ApartmentNo | nvarchar | 50 | FALSE |
| 1_0_0_D1_T3_5631 | T220 | City | nvarchar | 50 | FALSE |
| 1_0_0_D1_T3_5632 | T220 | State | nvarchar | 50 | FALSE |
| 1_0_0_D1_T3_5633 | T220 | CountryName | nvarchar | 50 | FALSE |
| 1_0_0_D1_T3_5634 | T220 | CountryID | integer | 4 | FALSE |
| 1_0_0_D1_T3_5635 | T220 | PostalCode | nvarchar | 50 | FALSE |

In embodiments of the present invention, each column in any standardized table may have a unique ID, expressed through the GIMS ID data type, which is discussed in more detail below.

The standardized database structure, represented by the "Data structure" table group, may be configured to be sufficient to meet the needs of most computer systems. However, if a computer system is not satisfied with the common database structure, in some embodiments, the system can extend it by adding new tables and/or columns to the database. It may also be possible to add new columns to standardized tables. In both cases, the new database objects are registered in the standardized system tables "tblDBTable" and "tblDBColumn". Such a proprietary table may also have a unique ID. The syntax of such ID may differ from standard tables. For instance, instead of "T," the unique ID of a non-standard table may start with "S" (for 'Special'), followed by the System ID of that particular system and a unique sequential number. For example, IDs like "S-589-1", "S-589-2", "S-589-3" and so forth could be non-standardized tables created by System 589.

However, in embodiments of the present invention, such proprietary tables may only be used within the system that created them. If there is the need to share such proprietary tables with other computer systems, then an exchange of that proprietary database structure among a limited number of computer systems would be required. In some embodiments, the CRD will not distribute proprietary database structures to all users. Instead, it may be up to each computer system to make arrangement (exchange) to share proprietary database structures with other computer systems.

4. Unique Computer ID within a System

A GIMS system may be represented by a single computer or a PC network. As a client-server application, the system may include one database (logical) server and one or several client computers. The GIMS software may be installed on each client computer. During the software installation, the installation program may register each new client in the database and assign an ID to it in form of an incrementally growing integer. This computer ID, unique within a system, will be used for several purposes.

5. The Unique GIMS ID as Universal Data Type of Primary Keys in Database Tables

GIMS applications may store information of all kind and types in database tables. Although unstructured text, image, audio and other types of files are stored and managed by the GIMS software in file systems, all properties of those files may also stored in corresponding standardized database tables. Therefore, the ability to uniquely identify any kind of computer information may be achieved through uniquely identifying the value of a primary key of a database record.

The key to a global (i.e., network) unique identifier is based on the combination of standardizations previously discussed. According to an embodiment of the present invention, the GIMS ID may comprise (i) GIMS network-unique system ID, (ii) satellite system ID, (iii) computer ID, (iv) application ID, (v) table ID and (vi) identity number.

The syntax of a GIMS ID may be: System ID+Satellite System ID+Computer ID+Application ID+Table ID+Identity number. The single components of such global identifier may be separated by a separator, in our case an underscore symbol "_".

The Identity number may be an integer value, which is unique within a distinct table of a distinct database. This value can be generated by programming means or by using an identity column in each table to get an incrementally growing integer value (row number).

In one example, GMIS ID of 2849_0_4_D2_T220_95748 is generated according to the syntax above. The table below provides detail regarding the components of the GMIS ID.

| Component value | Comment |
|---|---|
| 2849 | System ID of system 2849 |
| 0 | Satellite system 0 of system 2849, meaning this ID has been generated in main system 2849, not in one of its satellite systems |
| 4 | ID has been generated at client computer 4 |
| D2 | This record is part of application D2 = contact management |
| T220 | This record is a record in table T220 = "tblAddress", which contains address information |
| 95748 | The exact record is row 95748 in table "tblAddress", located in application database of system "2849_0" |

Unlike a GUID, which is unique but meaningless, the GIMS ID may contain precise information about the system, the application and the table where the record was created.

What gives us the assurance that the ID "2849_0_4_D2_T220_95748" is globally unique? It is the fact that all single components of the identifier are absolutely unique.

The first component is the main (i.e., regular) system ID. This ID is created and assigned automatically by software modules active at the CRD system and is, like a domain name, absolutely unique. The ID may be protected against falsification through a complex encryption procedure, which will be described below. The Satellite System ID and the Computer IDs are created automatically by software modules at the system itself. They may be unique within a system and protected by encryption. The application ID and table ID are unambiguously defined across the entire GIMS network. The GIMS software ensures that these particular IDs are used only when inserting a new record in a particular table (e.g., table "tblAddress" (T220)). The row number is also unique and may be enforced by programming tools or the use of identifier columns in the table.

Accordingly, the GIMS ID is a new data type. The GIMS ID may be the data type of all primary and foreign keys throughout all tables in all databases of the GIMS network. The GIMS ID is programmatically generated during each insert of a new record in any table of a GIMS database.

In the example GIMS syntax shown above, the components "Application ID" and "Computer ID" are not necessary to achieve uniqueness. The GIMS standard unequivocally relates the Table ID to the Application ID, as shown in the tables above. So, the table ID alone is sufficient to guarantee uniqueness and at the same time provide information where (i.e., in which table and application) the record resides.

The computer ID also does not add to the uniqueness of the GIMS ID. Although it provides information which client computer has initiated the creation of a new record, all records are stored in the same table and therefore unique.

Accordingly, in some embodiments, the GIMS ID does not include the database ID and/or computer ID. In these embodiments of the present invention, the GIMS ID may comprise (i) GIMS network-unique system ID, (ii) satellite system ID, (iii) table ID and (iv) identity number.

The syntax of this GIMS ID may be: System ID+Satellite System ID+Table ID+Identity number. The single components of such global identifier may be separated by a separator, in our case an underscore symbol "_".

Applied to the example above, this results in a shorter version of the GMIS ID: 2849_0_T220_95748. Shorter primary keys may result in improved database performance.

In addition, the satellite system ID would not be necessary in a GIMS network where none of the computer systems included a satellite system. However, the satellite system ID is necessary for any GIMS network configured to have one or more computer systems including one or satellite systems.

It is noted that the example syntaxes above are provided solely for the purposes of illustration and are not intended to limit a GIMS ID in accordance with the present invention to a particular syntax. For instance, components of the GIMS ID may be arranged in any order. Also, other separators may be used, or the syntax may not use separators at all. For example, a numerical representation of the components of the GIMS ID may be used, without the use of a separator, turning the GIMS ID into a numerical value. Using a numerical value for the GIMS ID may be preferable from the standpoint of database performance.

When generating a network-unique GIMS ID, generation of the GIMS ID may be based on the existence of a standard, designed to globally and uniquely identify database objects. This standard may contain rules to globally identify databases and its objects (tables, columns).

The standard may use any syntax to identify database objects. The example "T220", used above, is just for demonstration purposes. These ID's may be set as a standard and used as reference to database objects. The Table ID may be a mandatory component of the GIMS ID. The Table ID can be any scheme designed to globally and uniquely identify database objects. The addition of other database object IDs may be optional.

In some embodiments of the present invention, there must be a central registration authority that assigns unique IDs to the participants of the network. In some embodiments, it is up to the central registration authority to determine the syntax of the system ID.

Embodiments of the invention may use unique global system identifiers of any kind. Embodiments are not limited to particular examples discussed above. The global (i.e., GIMS network-unique) system ID can be any scheme designed to globally and uniquely identify entities. For instance, a domain name like www.xyz.com could, in principle, also be used as unique system ID. However, since the GIMS ID is primarily used as primary key in database tables, for database performance considerations, there is a benefit if the syntax of the system ID should be as short as possible.

In some embodiments of the invention, a mandatory component of the GIMS ID is an integer value, which is unique within a distinct table of a distinct database. This value can be generated by programming means or by using an identity column in each table to get an incrementally growing integer value. In other words, the integer value can be the row number in a table.

According to embodiments of the present invention, the GIMS ID may enable the creation of a fully automated GIMS network. The GIMS ID may be a tool that, in combination with the centralized registration procedure, allows unambiguous reference to any digital information on global scale. In particular, the GIMS ID may allow unambiguous reference to any database record down to row and column level.

The GIMS ID is the universal format (data type) for all primary and foreign keys in standardized database tables of the GIMS network. As mentioned before, GUID can also be used as data type for primary and foreign keys. However, the GIMS ID has the following advantages in comparison to GUID. First, GUID values are meaningless. In contrast, GIMS IDs may provide useful information that can be utilized by software modules in many ways.

Second, a GUID is a random value, and, therefore, not sequential. In contrast, all components of the GIMS ID may either be sequential or constants, and, therefore, the GIMS ID itself may be practically sequential. This may have a huge impact on database performance.

Third, the idea behind the GIMS ID data type can also be applied to traditional database design without the goal of global scale. The GIMS ID may allow creating a distributed database solution for a limited number of databases. In such case, the role of the CRD must be solved by the proprietary software application on a local level.

Use of a GIMS ID in accordance with present invention may have the following consequences and advantages: (a) universal method to present many-to-many relationships in RDBMS, (b) universal method to present hierarchical relationships in relational database, (c) universal method to add properties of object-oriented databases to relational databases and (d)

5a. Universal Method to Present Many-to-Many Relationships in RDBMS

According to some embodiments of the present invention, the GIMS ID may provide properties that cannot be realized by using GUID.

In relational database design there are the following types of relationships:

| Type | Example | Number of tables involved |
|---|---|---|
| One-to-One | Person - social security number | 2 |

| Type | Example | Number of tables involved |
|---|---|---|
| One-to-Many | Mother - children | 2 |
| Many-to-Many | Address - Person | 3 |

In one-to-one and one-to-many relationships, there are only two tables involved. The many-to-many relationship requires the creation of a third reference table.

The GIMS ID allows extending the relational database model and adding a very useful method to it.

Figure 9:
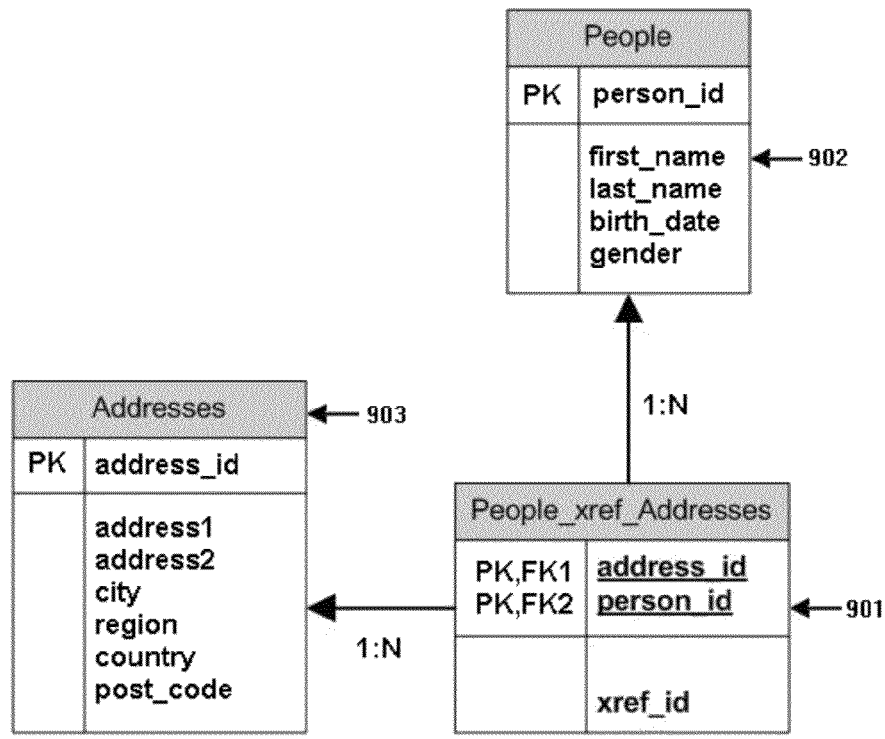
FIG. 9 depicts a schematic diagram illustrating a third reference table required represent many-to-many relationships in conventional database design.

Conventionally, for each many-to-many relationship in a database, a third reference table, often called the junction table, was needed. FIG. 9 illustrates the creation of a third reference table 901 to represent a many-to-many relationship between people in a people table 902 and addresses in an address table 903. The more many-to-many relationships exist, the more reference tables are required in traditional database design.

In addition, conventional database design requires setting relationships very strictly. Each one-to-one or one-to-many relationship has to be set by linking tables via primary and foreign keys during design time. There was no way to deal with ad-hoc relationships. Such an occurrence would require redesign of the database by adding new tables, columns and relationships.

In most cases this was sufficient, since database tables and their relationships reflect the situation in real life, where most relationships are strictly defined. For example, the mother-child relationship is a one-to-many relationship and the conventional relational model fully covers this case. However, there are always exceptional situations in real life, where two objects, which usually have nothing in common, suddenly enter into a relationship. To reflect such an unusual relationship in a conventional database design, it would be necessary to create additional database object and relationships.

In embodiments of the present invention, the GIMS ID provides the option to create a universal reference (i.e., junction) table, which opens the following new options. First, the universal reference table eliminates the need to create multiple reference tables for each many-to-many relationship. This universal reference table is sufficient to serve all many-to-many relationships. Second, it allows creating relationships between records in any table pair, even if such relationships were not anticipated or desired during design time.

Traditional database design does not permit the creation of such a universal reference table, since the primary keys in different tables are not unique. Even the use of GUID as primary key won't solve the problem, because GUID are meaningless and such reference table would not provide information as to which two tables are linked together. This is not the case with the GIMS ID, which may provide specific information to which table the record belongs.

The universal reference table could even be used to represent one-to-one or one-to-many relationships. Yet it is up to the application developer whether to use traditional methods to create relationships between tables or the universal reference table based on performance and other considerations.

Figure 10:
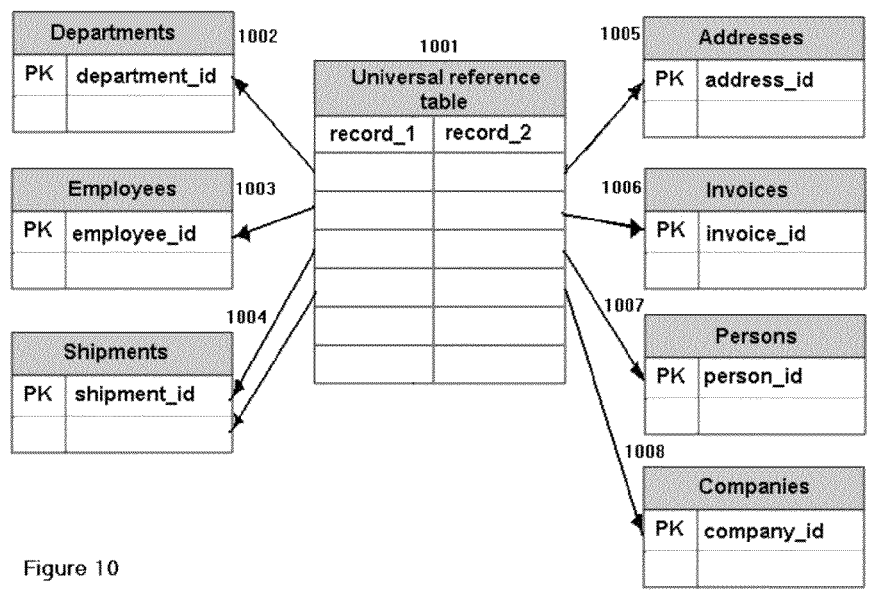
FIG. 10 depicts a schematic diagram illustrating how a universal reference table creates many-to-many links between all tables by using the GIMS ID according to an embodiment of the invention.

FIG. 10 shows how the universal reference table 1001 creates many-to-many links between all tables (e.g., departments table 1002, employees table 1003, shipments table 1004, addresses table 1005, invoices table 1006, persons table 1007 and/or companies table 1008) by using the GIMS ID. According to some embodiments of the invention, all tables use GIMS IDs as primary keys. Inserting these ID's into the columns record_1 and record_2 of the universal reference table 1001 will create a univocal relationship between two records in any table pair. In some embodiments, the universal reference table 1001 may have additional columns.

Figure 11:
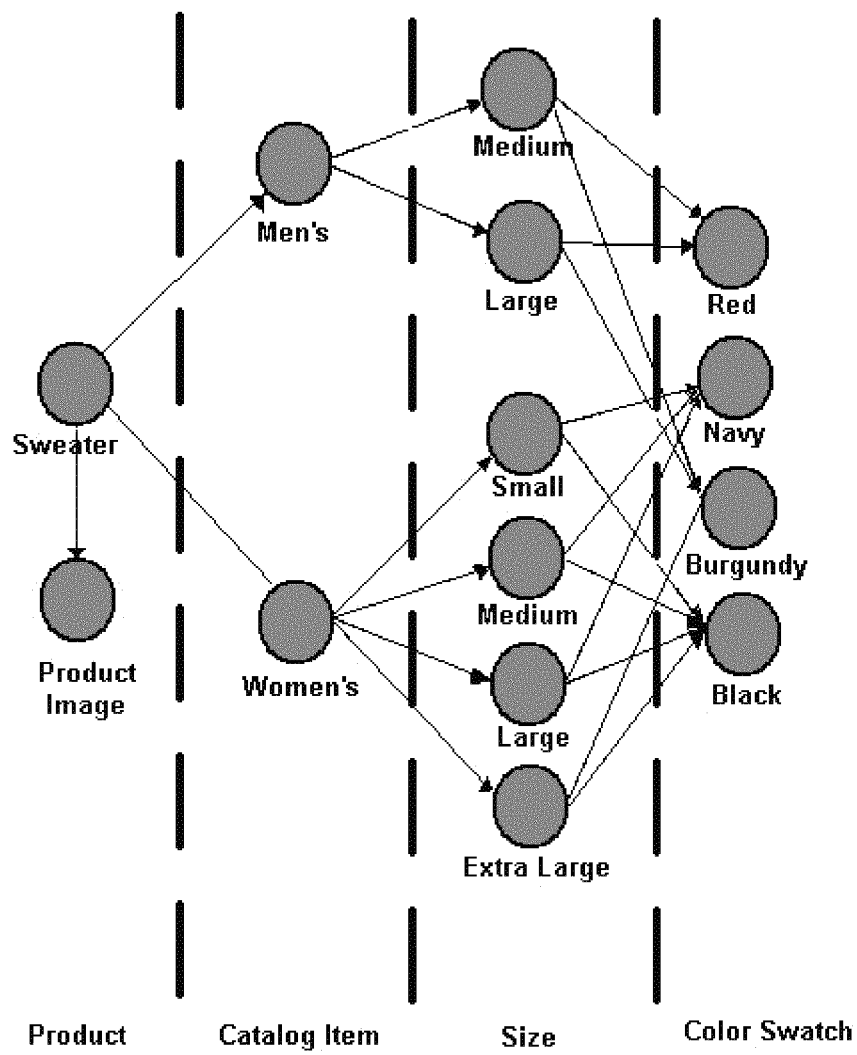
FIG. 11 depicts a schematic diagram illustrating how the universal reference table can be utilized to represent manyto-many relationships between a products, catalog items, size and color swatch according to an embodiment of the invention.

FIG. 11 depicts a schematic diagram illustrating how the universal reference table can be utilized to represent many-to-many relationships between products (e.g., sweater), catalog items (e.g., men's), size (e.g., medium) and color swatch (e.g., red). Each link (arrow) between two objects can be stored as a record in the universal reference table. Desired information may be retrieved and presented using, for example, standard query language (SQL) statements.

In summary, the use of GIMS IDs may eliminate the need to create multiple reference tables for each many-to-many relationship. Instead, a single universal reference table may be sufficient to serve all many-to-many relationships. The use of GIMS IDs may allow creating relationships between records in any table pair, even if such relationships were not anticipated or desired during design time.

5b. Universal Method to Present Hierarchical Relationships in Relational Database While relational databases are suitable for representing relationships like one-to-one, one-to-many or many-to-many, they are not well suited to representing hierarchical relationships. The GIMS ID may enable construction of a universal method to express hierarchical relationships between any collections of database records. Here again, there is no need to declare such relationships during database design time. The hierarchical relationships may be declared and assigned by the end user in accordance with the end user's requirements and business logic.

Some embodiments of the present invention may adopt a general format, referred to below as "hierarchy code," to apply applying hierarchical relationships to database records.

In computer technology, one example of a hierarchical structure is the way a path to a directory or file is described. For example, a path to a file may be described by "C:\Dir1\SubDir1\image1.jpg." Similarly, the format of web pages uses a hierarchical structure. For example, a web page may be identified by "http://www.xyz.com/index.html."

Figure 12:
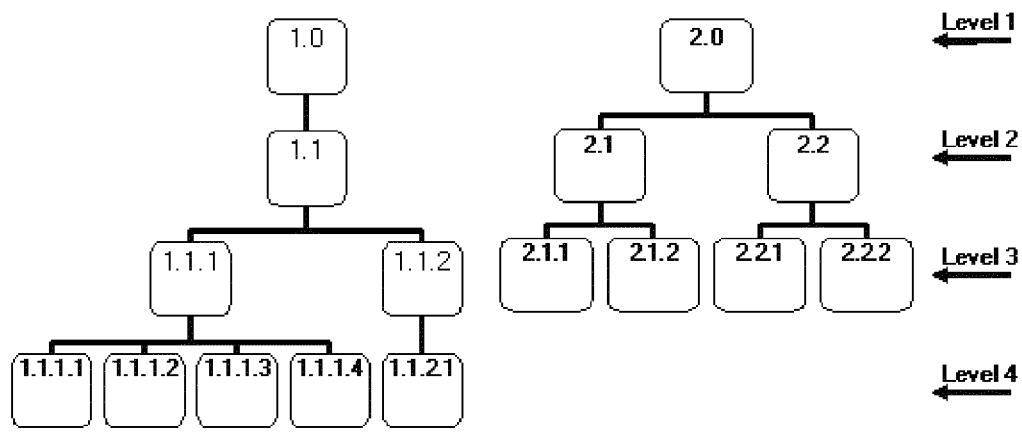
FIG. 12 depicts an illustration of two hierarchical structure examples and an example of a hierarchical code that may be used to describe the single nodes according to an embodiment of the invention.

FIG. 12 depicts an illustration of two hierarchical structure examples and an example of a hierarchical code that may be used to describe the single nodes. The first hierarchical structure example has four levels while the second hierarchical structure example has only three level. In the hierarchical code example shown in FIG. 12, the symbol "." is used as a level separator. However, any other separator could be chosen. In this example, the code of the root level (Level 1) always ends with ".0"; higher levels never end with ".0".

The following example shall demonstrate how hierarchical relationships in a relational database may be created according to an embodiment of the invention. In this example, the goal is to arrange computer users of system "255_0" into hierarchically organized user groups. The users are recorded in table "Users" with table ID "T77." Each user has a unique user ID (GIMS ID).

First, two standardized tables, Hierarchy and Hierarchy_Details, are created and assigned table IDs T500 and T501, respectively. These two tables may constitute the table group "Record Hierarchy." The tables may be in a 1:N relationship and have the following structure:

| Table "Hierarchy" | |
|---|---|
| Column Name | Description |
| HierarchyID | Primary key (GIMS ID) |
| Description | Description of the hierarchical structure, for example: "User groups in my system" |

| Table "Hierarchy_Details" | |
|---|---|
| Column Name | Description |
| Hierarchy_Details_ID | Primary key (GIMS ID format) |
| HierarchyID | Foreign key (GIMS ID format) |
| RecordID | Unique GIMS ID of record, in our example: the user ID |
| HierarchyCode | Hierarchy code describing hierarchical position |

Next, sample data is inserted into the tables:

| Table Hierarchy | |
|---|---|
| HierarchyID | Description |
| 255_0_T500_22 | User groups in system 255 |

1:N

| Table Hierarchy_Details | | | |
|---|---|---|---|
| Hierarchy_Details_ID | HierarchyID | RecordID | HierarchyCode |
| 255_0_T501_22 | 255_0_T500_22 | 255_0_T77_4 | 1.0 |
| 255_0_T501_23 | 255_0_T500_22 | 255_0_T77_45 | 1.1 |
| 255_0_T501_24 | 255_0_T500_22 | 255_0_T77_413 | 1.1 |
| 255_0_T501_25 | 255_0_T500_22 | 255_0_T77_24 | 1.1.1 |
| 255_0_T501_26 | 255_0_T500_22 | 255_0_T77_833 | 1.1.2 |
| 255_0_T501_27 | 255_0_T500_22 | 255_0_T77_39 | 1.1.2 |

Figure 13:
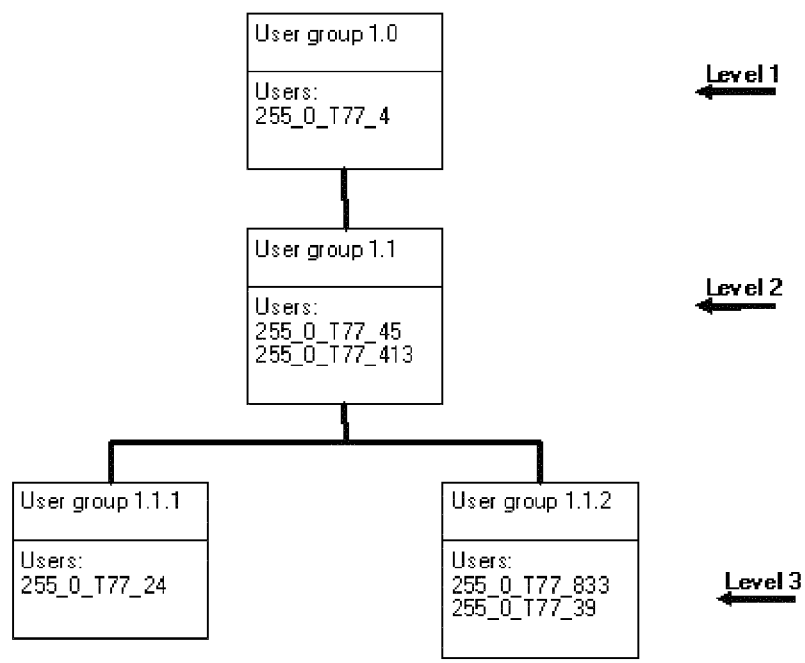
FIG. 13 depicts a graphical expression of data entered into the tables Record Hierarchy group that represents six users organized in four hierarchical user groups according to an embodiment of the invention.

FIG. 13 depicts a graphical expression of the data in the tables above. In particular, six users have been organized in four hierarchical user groups.

Organizing hierarchical data in a relational database is only the first part of the task. The second part is the retrieval of data based on hierarchical criteria. This can be achieved using the same SQL language as with relational data. For example, to retrieve all users who are subordinate to user "255_0_T77_45" the following SQL statement may be used: "SELECT UserID FROM Users INNER JOIN Hierarchy Details ON Users.UserID=Hierarchy Details.RecordID WHERE HierarchyID='255_0_T500_22' AND HierarchyCode LIKE '1.1.%'"

For the sake of simplicity, in the example above, only records from a single table "Users" have been used. However, there are no limitations to what table records can be organized hierarchically. The column "RecordID" may contain the primary key of any application table. Thus, the described method allows organization of any kind of relational information in a hierarchical manner and retrieval of information based on hierarchical search criteria.

In the embodiment described with reference to the example above, the table Hierarchy stores all kinds of hierarchical structures, whereas the table Hierarchy_Details stores the elements (members) of those hierarchical structures.

Although the has been described with reference to two standardized tables "Hierarchy" and "Hierarchy_Details," embodiments of the present invention that are capable of representing hierarchical relationships are not necessarily bound to the use of the those exact tables. To the contrary, hierarchical relationships may be represented using another table or table group.

In embodiments of the invention, the GIMS ID as a universal identifier of any kind of information enables representation of hierarchical relationships according to the method described above.

Furthermore, a single application record can be part of multiple hierarchical structures. For example, a person working in two jobs might be a supervisor in one place and a regular employee in another. This situation can easily be represented by the method described above. In addition, records from different application tables, representing different objects, can also be organized hierarchically.

The table group "Record Hierarchy" allows checking what hierarchical relationships exist for a particular application record by using the following SQL statement: "SELECT DISTINCT Hierarchy.HierarchyID FROM Hierarchy INNER JOIN Hierarchy Details ON Hierarchy.HierarchyID=Hierarchy Details.HierarchyID WHERE RecordID='255_0_T77_45.'"

Hierarchical structures might be private or public. An example for a private hierarchy is the way responsibilities are determined within a company. Public classification systems (e.g., the "Dewey Decimal Classification" for library classification or NAICS (The North American Industry Classification System) for collecting, analyzing, and publishing statistical data related to the U.S. business economy) are also organized hierarchically.

In embodiments of a GIMS database in accordance with the present invention, hierarchical data may be stored in relational databases using the method described above.

5c. Universal Method to Add Properties of Object Databases to Relational Databases One advantage of object databases over relational databases is the ability to define objects with a varying number of attributes. Relational databases are confined by the number of columns in a table. Adding attributes in a relational database table requires redesigning the tables.

In some embodiments of the invention, the GIMS may use the GMIS ID to provide methods to bridge the gap and emulate properties of object databases using relational databases. These methods may eliminate the need to declare objects at design time, and, accordingly, may not require changing the underlying database structure. The application developer can use these methods to provide the end user with a tool to declare objects at will.

One method for emulating the properties of object databases using relational databases according to an embodiment of the invention is the Object method. The Object method uses standardized tables Object (T600) and Object_Details (T601), which together constitute the table group "Objects." Examples of the tables are shown below:

| Table "Object" | |
|---|---|
| Column Name | Description |
| ObjectID | Primary key (GIMS ID) |
| Description | Description of the object, for example: "Christmas gift" |

| Table Object_Details | |
| --- | --- |
| Column Name | Description |
| Object_Details_ID | Primary key (GIMS ID format) |
| ObjectID | Foreign key (GIMS ID format) |
| RecordID | Unique GIMS ID of record in any application table |

Next, sample data is inserted into the tables:

| Table Object | |
| --- | --- |
| Object ID | Description |
| 255_0_T600_220 | Christmas gift |

1:N

| Table Object_Hierarchy_Details | | | |
| --- | --- | --- | --- |
| Object_Details_ID | ObjectID | RecordID | Origin of RecordID |
| 255_0_T601_22 | 255_0_T600_22 | 255_0_T771_4 | Table "Documents". In this case, the record represents an image of the gift. As explained in more detail below, embodiments of the invention may use a special method to manage unstructured files like images, video etc. |
| 255_0_T601_23 | 255_0_T600_22 | 255_0_T727_45 | Table "Orders" |
| 255_0_T601_24 | 255_0_T600_22 | 255_0_T777_413 | Table "Notes", |
| 255_0_T601_25 | 255_0_T600_22 | 255_0_T177_24 | Table "Person" |
| 255_0_T601_26 | 255_0_T600_22 | 255_0_T437_833 | Table "Calendar" |

The example above shows how an end user can declare an object "Christmas gift" and attach any object, related to the gift. In this case, the object "Christmas gift" includes objects like the invoice (order) for the gift, the person, who received the gift, notes made in regard to that gift and a record in the "Calendar" application (Christmas date).

These relationships to other table records do not have to be part of relationships declared in the relational database design. Since the values in column "RecordID" are expressed as meaningful GIMS IDs, the application "knows" exactly where these records are located and is able to display all records related to the object "Christmas gift".

Another method for emulating the properties of object databases using relational databases according to an embodiment of the invention is the Object attributes method. All objects in real life have attributes. Some attributes are quite universal; others can be applied only to a limited number of objects. For example, the attribute color is quite universal and can be applied to fruits, cars and furniture but cannot be applied to philosophy (at least not directly). The binding energy per nucleon, on the other hand, is a very specific attribute common only in nuclear physics.

Relational databases also represent objects, although this is not clear if only judged by the name. Objects are represented by tables and rows. The attributes of an object are represented by the column values. Unfortunately, the attributes, related to a particular object type, must be set during database design according to conventional methods. For example, "weight" or "colors" are attributes of an object of type furniture. Yet they are also attributes of objects types like cars or animals. Therefore, conventionally, these common attributes are repeated in separate tables like "Furniture", "Cars" or "Animals".

Embodiments of the present invention provide a method to express attributes of any objects through a single standardized table. In some embodiments, the method uses two additional standard tables for support. Both these tables may be maintained by the Registration Authority (RA) and distributed among all GIMS computer systems worldwide.

The first supporting table may be named "Attribute" and may have an ID, for example, equal to T800. The purpose of the Attribute table may be to store all possible types of attributes like weight, length, height, voltage, price, color and many others.

The second supporting table may be named "Unit" and have an ID, for example, equal to T801. The purpose of the Unit table is to store all units in which attributes are measured. For example, weight is measured in pounds, tons and kilograms. Length is measured in inches, centimeters and kilometers. Price is measured in U.S. dollars, Canadian dollars, British Pounds etc.

In some embodiments, the Registration Authority (RA) is responsible for gathering information of any imaginable attribute in all fields of human knowledge and the corresponding units used to measure or express those attributes.

By assigning GIMS IDs as primary keys of these two tables, the RA may establish a worldwide unique reference, which may be used by GIMS databases and applications. Thus, each attribute and its units have a worldwide unique ID. These IDs may be used to describe any possible object, which in our case is represented by a database record. For this purpose, a standard table "Object_Attribute" may be created (e.g., table ID=T802).

The tables below show example structures for the three standardized tables, which together form the "Attribute" table group according to one embodiment of the invention.

| Table "Attribute" | |
| --- | --- |
| Column Name | Comments |
| AttributeID | Primary key (GIMS ID) |
| Description | Description of the attribute, for example: "Weight", "Length", "Color" etc. |

| Table "Unit" | |
| --- | --- |
| Column Name | Comments |
| UnitID | Primary key (GIMS ID format) |
| AttributeID | Foreign key (GIMS ID format) |
| Accronym | Acronym, for example "kg", "m", "V", "A" etc. |
| Description | Unit description like "kilogram", "meter", "volt", "ampere" |

| Table "Object_Attribute" | |
|---|---|
| Column Name | Comments |
| Object_AttributeID | Primary key (GIMS ID format) |
| RecordID | Foreign key (GIMS ID format) of any application record |
| AttributeID | Foreign key (GIMS ID format) of attribute |
| UnitID | Foreign key (GIMS ID format) of unit |
| Quantity | Quantity value, for example 100 (pound) |

The tables below demonstrate how the attributes of a database object, in this case a car, may be represented by using the universal table "Object Attributes." To better visualize the example, the values in the columns "AttributeID" and "UnitID" are expressed as descriptions instead of IDs from table "Attribute" and "Unit." In one embodiment, the column AttributeID is mandatory, but the columns UnitID and Quantity are not. Instead, the columns UnitID and Quantity are used whenever it makes sense.

The universal table "Attribute" could be used to store the attributes of any record in any application table. However, it is up to the application developer whether to choose the method of including attribute columns in application table or using the universal "Attribute" table based on performance and other considerations.

Below, the tables have been filled with sample records to describe a car with the following characteristics:
Weight: 1,500 kg
Max. Speed: 200 km/h
Color: red
No. of cylinders: 6
Power: 300 hp
Price: $30,300.00

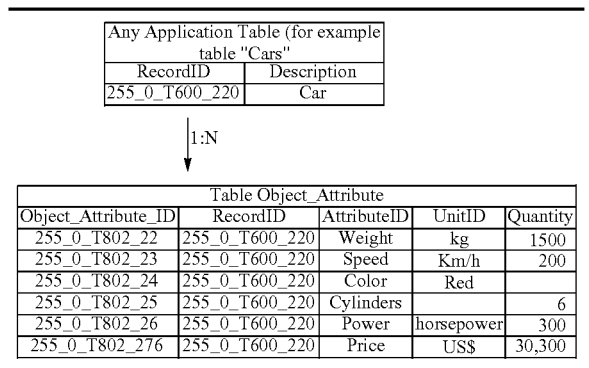

Figure 14:
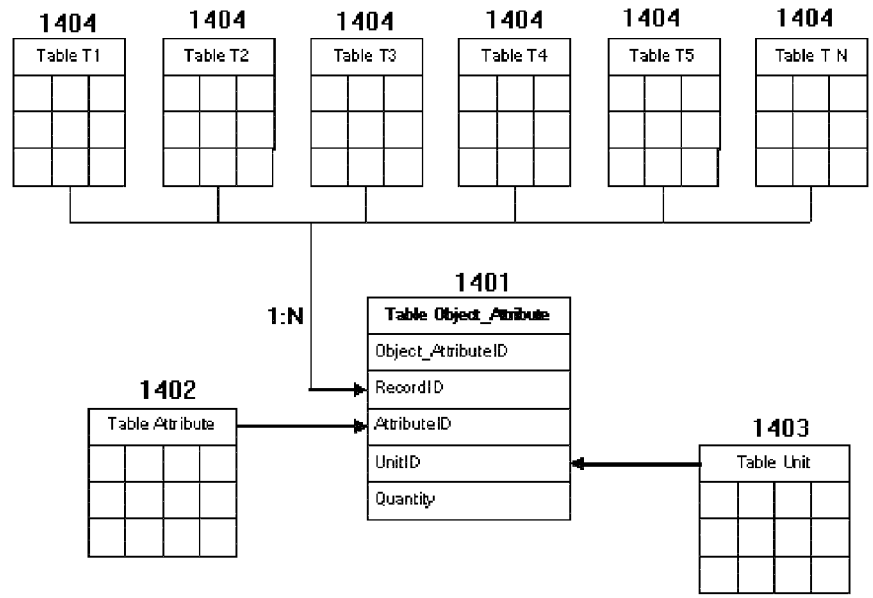
FIG. 14 depicts the universal use of the "Attribute" table group including the "Object_Attribute" table, the "Attribute" table and the "Unit" table according to an embodiment of the invention.

FIG. 14 depicts the universal use of the "Attribute" table group including the "Object_Attribute" table 1401, the "Attribute" table 1402 and the "Unit" table 1403. It can be used by any existing or future application table 1404 to define attributes of objects represented by records in the application tables 104.

5d. GIMS ID as Global ID for Replication Purposes

Most RDBMS have a build-in replication mechanism but require a special, additional column to be added to each table for the purpose of uniquely identifying table records during replication. The data type for such column is usually GUID.

According to some embodiments of the invention, the GIMS ID may eliminate the need for an additional ID column. The primary key of each table, represented by the GIMS ID format, is globally unique and therefore perfectly suited to serve as ID for replication purposes.

6. Data Exchange between GIMS Systems

In some embodiments of the present invention, (i) data exchange is always an exchange between databases, (ii) data exchange is always controlled by software modules without human intervention, (iii) data exchange between two systems never occurs directly (i.e., there are no online sessions), and (iv) data exchange between two systems always occurs as exchange of standardized files.

By performing data exchange according to these rules, the overall security level can be dramatically enhanced, and the entire process can be sped up. The replacement of humans by automatic software modules, and the establishment of standardized procedures, performed by the software modules, may result in to high security and performance.

Discussed below are (a) data exchange main transaction types, (b) indirect communication and (c) the EXPORT, IMPORT and QUERY modules.

6a. The Main Transaction Types

There are always two systems involved in data exchange: (i) the sending system and (ii) the target system. Data exchange can be divided into a limited number of basic transaction types: (i) sending records (SEND), (ii) deleting records (DEL), (iii) record replication (REPL) and (iv) database queries.

According to embodiments of the present invention, sending records (SEND) implies two sub-transactions: (a) updating records already existing in target system and (b) inserting new records into target system. Deleting records (DEL) deletes existing records at the target system. Record replication (REPL) is basically identical with sending records. The difference is that the main purpose of replications is a partial or full synchronization of databases. Replications are usually scheduled in advance. In contrast, the "SEND" transaction is not planned in advance but rather an ad-hoc transaction initiated by the user occasionally, when the need occurs. REPL transactions typically involve a large number of records while SEND transactions typically involve a single or few records. In regard to database queries, systems are capable of sending requests to other systems and get back a result set of records.

Similar to standardization of database objects, the basic transaction types are also standardized by using a set of common acronyms.

| Acronym | Transaction |
|---|---|
| SEND | Send transaction. It includes sending new records to as well as updating existing records in a target system |
| DEL | Delete existing records in target system |
| REPL | Replication: synchronizing databases with target system |
| QRY | Requesting information from a foreign database system |
| QRYRES | Sending query results back to requesting system |
| AUTH | Special transaction information, containing authentication and encryption information. |

6b. Indirect Communication

Figure 15:
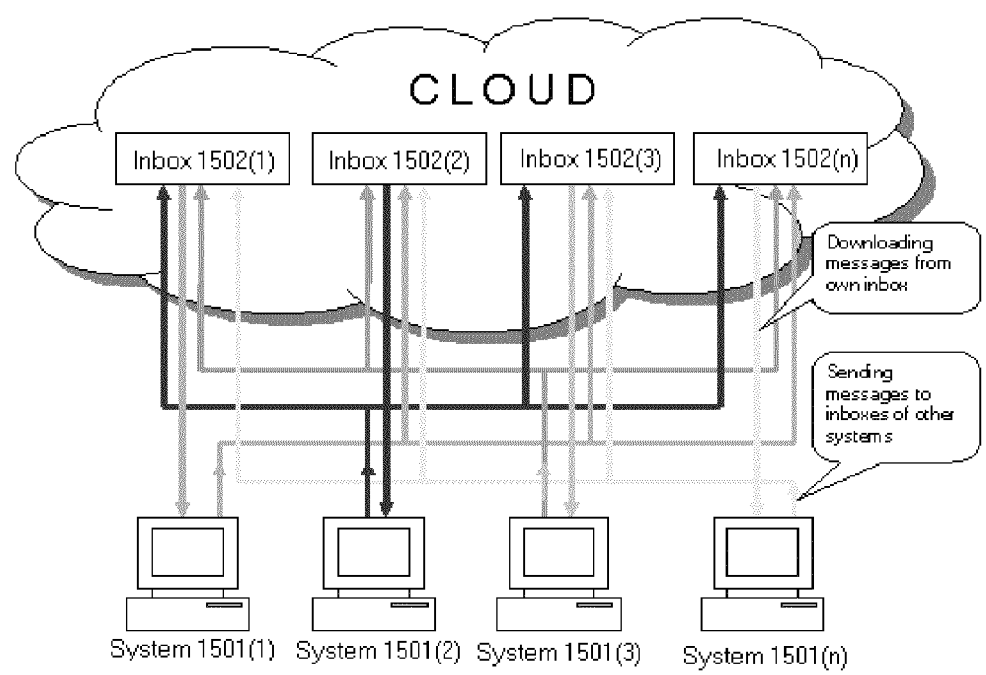
FIG. 15 depicts an illustration of publicly accessible Inbox established by each of the computer systems of a GIMS network according to an embodiment of the invention.

According to embodiments of the invention, the direct connection of two systems for the purpose of data exchange, as defined in the table above, is not permitted. Instead, some embodiments, as illustrated in FIG. 15, require every computer system 1501(1)-1501(n) to establish a publicly accessible Inbox 1502(1)-1502(n), so that other computer systems are able to deposit their messages. In all following examples, a file transfer protocol (FTP) directory is used as an Inbox, and FTP is used as the transfer protocol. However, other protocols may be used. The Inbox may be set up in such a way that other systems can only upload files to it, and the owner only download from it.

Indirect communication via the Inbox allows encapsulating each computer system and protecting it from direct attacks. In some embodiments, all connections to the Inbox are performed by software modules in automatic mode according to very strict standard procedures, which may include a number of authentication and encryption methods. Each system may publish information about its own Inbox in the CRD, so that it is publicly accessible for all other systems. Systems can establish FTP Inboxes by themselves or lease them from Internet Service Providers.

The five basic transactions (SEND, DEL, REPL, QRY and QRYRES) may be performed by sending corresponding types of standardized files between computer systems of the GIMS network. Any structured file format (e.g., CSV, XML or others) may be used for this purpose. The content of these files may represent information in standardized database tables. Each computer system may use automated software modules to generate or process these standardized files.

In some embodiments, inboxes for satellite systems are a special case. Satellite systems may only be allowed to communicate with their mother system and not to other systems. A reason for this rule may be the necessity to synchronize the satellite databases with the mother database.

Figure 16:
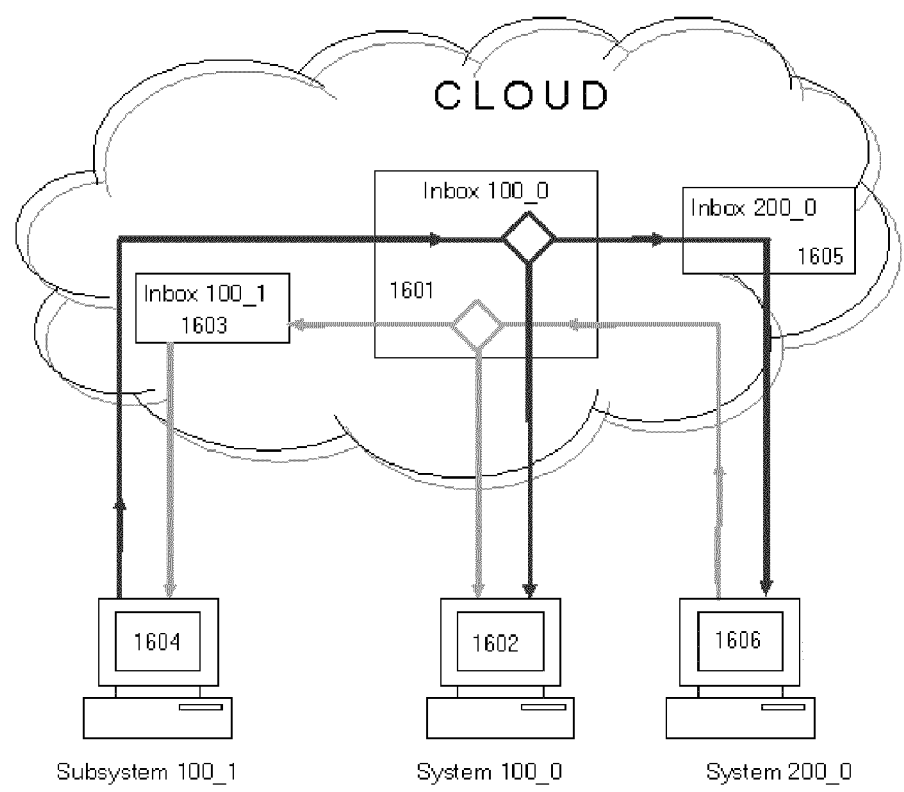
FIG. 16 depicts a schematic diagram illustrating automated software modules at the mother system transferring information between an Inboxes of its own satellite systems and Inboxes of other systems according to an embodiment of the invention.

As illustrated in FIG. 16, automated software modules 1601 at the mother system 1602 may transfer information between an Inboxes (e.g., Inbox 1603) of its own satellite systems (e.g., satellite system 1604) and Inboxes (e.g., Inbox 1605) of other systems (e.g., computer system 1606). As can be seen from the drawing, the main system 1602 will not just forward messages from and to its satellite systems 1603 but will also import those messages into its own database to keep the latter synchronized with the satellite databases.

6c. The EXPORT, IMPORT and QUERY Modules

According to some embodiments of the present invention, all transactions between computer systems of the GIMS network are performed by three standard software modules: EXPORT, IMPORT and QUERY.

The function of the EXPORT module may be to extract data from its own database, transform that data into a platform-independent file format (e.g., XML, CSV or others) and send these files to the Inbox of a target system. Before performing its function, the EXPORT module may check whether the computer system is authorized to send data to the target computer system.

The EXPORT module may generate five distinguished file types (SEND, DEL, REPL, QRY and QRYRES):

| Module | File type | Description |
| --- | --- | --- |
| EXPORT | SEND | Each SEND file may contain data from only one standard table. A "SEND" transaction usually includes of several types of SEND files, representing data from several tables. |
| | DEL | The DEL file may contain a list of GIMS IDs that need to be deleted at the target system. |
| | REPL | Each REPL file may contain data from only one standard table. A "REPL" transaction usually includes several types of REPL files, representing data from several tables. |

| Module | File type | Description |
| --- | --- | --- |
| | QRY | May contain platform and language-independent query information, sent to other systems. |
| | QRYRES | The EXPORT module may create QRYRES files as a response to a query by another system, sent in form of a QRY file. Each QRYRES file may contain data from only one standardized table. A "QRYRES" transaction usually includes several types of QRYRES files, representing data from several tables. |

The QUERY module may generate QRY files to request data from other systems. Before performing its function, the QUERY module may check whether the system is authorized to request data from the target system.

| Module | File type | Description |
| --- | --- | --- |
| QUERY | QRY | The QRY file contains query parameters. The syntax of a QRY file is platform-independent, i.e. it is not based on SQL. It is the function of the EXPORT module to transfer the query parameter into an appropriate query language, for example SQL. |

The IMPORT module may download standard files (SEND, DEL, REPL, QRY, QRYRES) from the system's Inbox and imports the data into the database. The IMPORT module may include an Access Right Management Module (ARM), which may be responsible for checking whether the sender of those files has the right to manipulate the database of the target system. The ARM module allows fine-grained assess management at database, record and column level.

| Module | File type | Description |
| --- | --- | --- |
| IMPORT | SEND | Imports content of SEND files into the database. |
| | DEL | Deletes database records listed in the DEL file. |
| | REPL | Imports content of REPL file into corresponding database tables. |
| | QRY | Imports query information into the "Query" table group. |
| | QRYRES | Imports content of QRYRES file into corresponding database tables. Each QRYRES file contains data from only one standardized table. A "QRYRES" transaction may include several types of QRYRES files, representing data from several tables |

Figure 17:
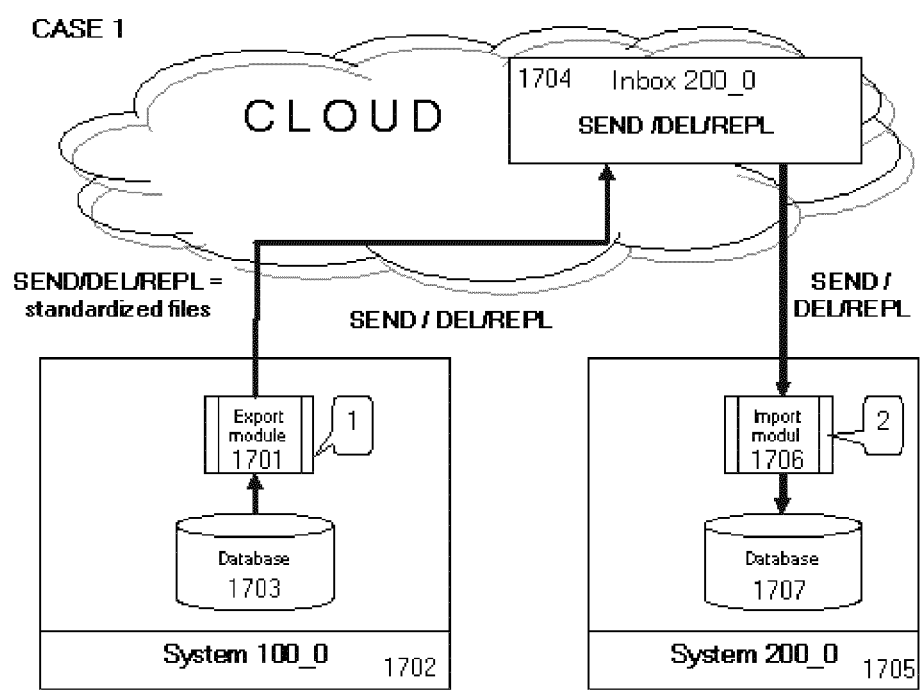
FIG. 17 depicts a schematic diagram illustrating the activation of automated IMPORT and EXPORT modules to send information from the database of a sending computer system to the database of another computer system without a request of the target system according to an embodiment of the invention.
Figure 18:
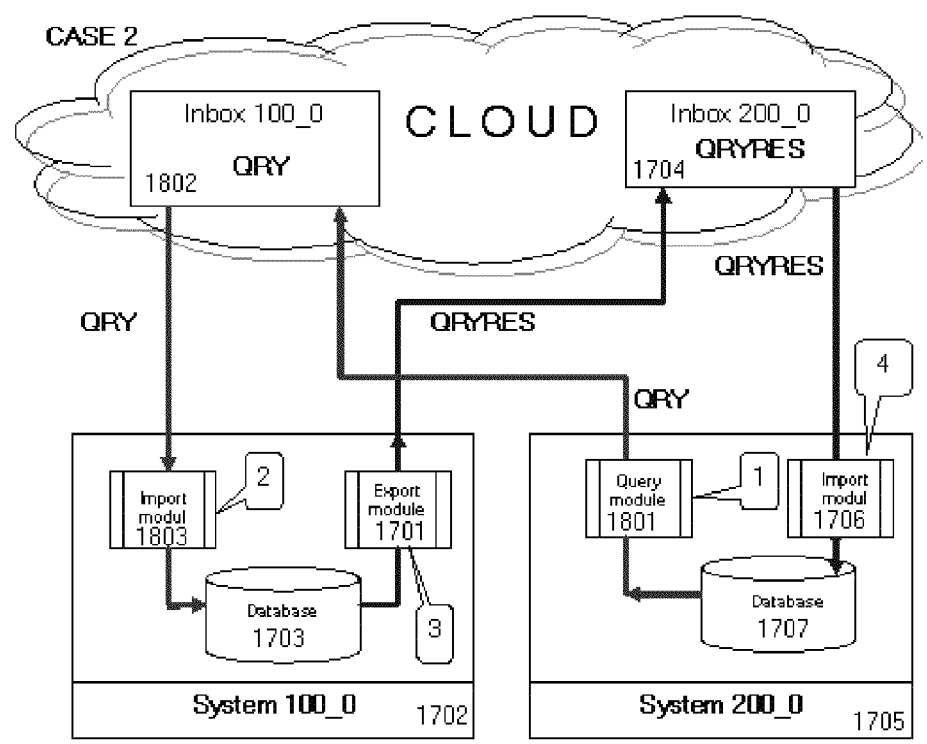
FIG. 18 depicts a schematic diagram illustrating the activation of automated IMPORT, EXPORT and QUERY modules to respond to a query request from another computer system according to an embodiment of the invention.

The automated modules IMPORT, EXPORT and QUERY may be activated in the following cases: (i) to send information from their own database to the database of another computer system without a request of the target system and (ii) to respond to a request from another computer system (QRY transactions). FIGS. 17 and 18 demonstrate these two cases.

As shown in FIG. 17, the EXPORT module 1701 of a sending computer system 1702 sends information in the form of one or more standardized files from its own database 1703 to the Inbox 1704 of a target computer system 1705. The IMPORT module 1706 of the target computer system 1705 then downloads the sent information from Inbox 1704 into database 1707 of the target computer system 1705.

As shown in FIG. 18, the QUERY module 1801 of computer system 1705 sends a QRY file containing query parameters to the Inbox 1802 of computer system 1702. The IMPORT module 1803 of the computer system 1702 then downloads the QRY file from Inbox 1802 into database 1703 of the computer system 1702. Export module 1701 of computer system 1702 then creates one or more QRYRES files as a response to the query from the other system 1705 and send the one or more QRYRES files to the Inbox 1704 of the computer system 1705. The IMPORT module 1706 of computer system 1705 then downloads the QRYRES files from Inbox 1704 into database 1707 of the target computer system 1705.

7. The System Application

Embodiments of the present invention rely on the setting and using of global standards in implementing the GIMS concept. This may be achieved by seeking globally common denominators and using them as the foundation for global standards. As described above, the GIMS concept may be based on the assumption that for each area of human knowledge or activity common business logic can be defined, which logically leads to the standardization of database structures. The next common denominator is the fact that certain basic functions are present in most software solutions. These functions include data processing, authentication, encryption, access management, record history and others. Consequently, the next level of standardization should lead to a common approach in regard to these functions and procedures. Thus, the GIMS concept is based on two main areas of standardization: (i) common data structure (business logic) and (ii) common functions and procedures.

The System Application may be the software solution that regulates all standards in the GIMS network in regard of data structure and common functions. It may be an obligatory part of any GIMS software and may contain of a number of automated software modules, which may perform background functions and may be invisible to the end user. The System Application may be the foundation on which all other applications, called User Applications, are built.

Figure 19:
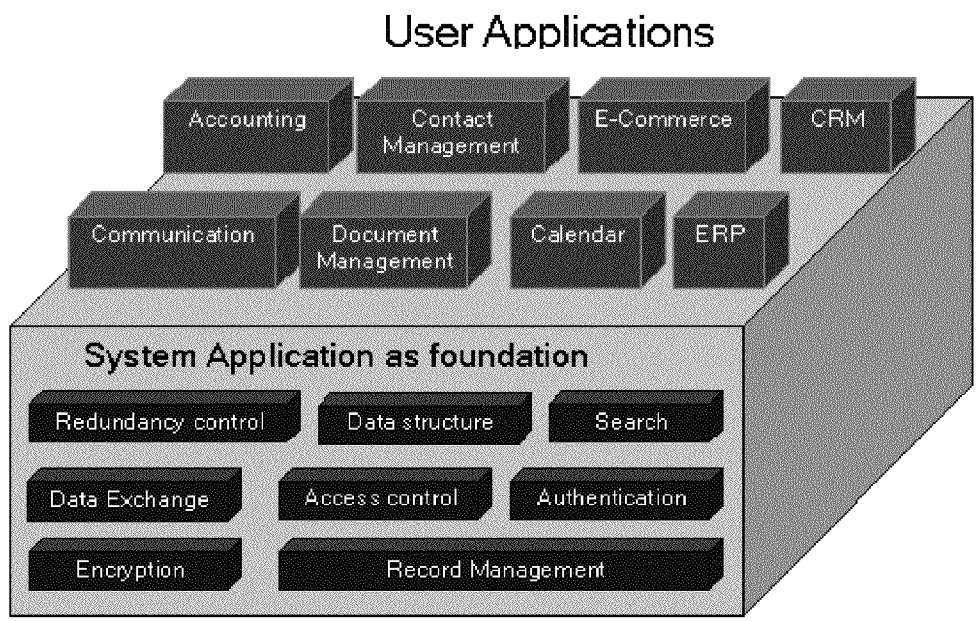
FIG. 19 depicts a schematic diagram illustrating the place of the System Application within the GIMS software concept.

Contrary to the System Application, the User Applications may be visible to the end user. The User Applications do not contain system functionalities but call the System Application each time those functions are required. FIG. 19 depicts a schematic diagram illustrating the place of the System Application within the GIMS software concept.

As a database-centered solution, all modules (i.e., functions) of the System Application may be realized as database applications. They all may include a set of standardized tables (i.e., table groups) that store data relevant to the respective function plus a set of standard procedures that determine the way that data has to be processed.

The System Application may include the following software modules:

| Module | Description |
| --- | --- |
| Data structure | May contain data about the database structure of all GIMS applications. |
| Authentication | May regulate the system and user authentication during data exchange between systems. |
| Record Management | May regulate the following functions: Creation of unique GIMS IDs Maintaining the user activity log (user activity) Maintaining the record log (record history). |
| Access management | May regulate: Access management for own users Access management for user of other systems Access management includes permissions to view, add, update, delete, send and administer database records. |
| Data exchange | May regulate rules for data exchange of standardized SEND, DEL, REPL, QRY and QRYRES files between systems. |
| Search | May regulate rules to query the database of another system. |
| Security/ Encryption | May ensure data integrity and security during data exchange between systems |
| Redundancy control | May prevent data redundancy. |

7a. Data Structure Module

The Data Structure module may include a table group and an automated software module. The table group may consist of three main standardized tables:

| Table name | Description |
| --- | --- |
| tblDB | May contain a list of all standardized application databases within the GIMS network, including standardized IDs. |
| tblDBTable | May contain a list of all standardized database tables within the GIMS network, including standardized IDs. |
| tblDBColumn | May contain a list of all table columns within the GIMS network, including unique GIMS IDs, column names, length, data types, index information etc. |

During the software installation, the data structure module may create a database with tables. The structure of the database tables may have a structure that exactly matches the structure given in the three tables above.

7b. Authentication Module

In some embodiments of the present invention, each new computer system in the GIMS network gets its network-unique system ID from the Central Registration Database (CRD) as part of the system registration process. During the registration process, the new system may create one or several private/public encryption key pairs. The public keys may be part of the information that the new computer system will send to the CRD during registration process. The public keys and additional verification information may be used for system authentication each time the computer system engages in data exchange with another computer system.

The CRD, like any other systems, may have its own set of private/public encryption key pairs. As a result of registration of new systems, the CRD may collect the public keys of all participants of the GIMS network, becoming the central and global depository of all public encryption keys. Each system, in order to communicate with another system, may be required to possess the public key of the target system. If the public key is not in its own database yet, then a query may have to be sent to the CRD to retrieve it. This process may be hidden from the end user because it is part of the functionality of the authentication module; it may be performed automatically as a background process.

The information relevant to system authentication may be stored in the "System" table group. This group may divided into public and private tables. The content of the public tables may be collected in the corresponding tables of the CRD database to be distributed among all other systems according to their needs.

The content of the private tables may be kept absolutely hidden from everyone (including the system administrator) except the authentication module of the system itself. In some embodiments, the content of these tables will never leave the system. Later, further methods to protect the private key will be described. Like all tables within GIMS databases, the public tables may use GIMS IDs as primary keys. This facilitates unambiguous references when using public keys.

Figure 20:
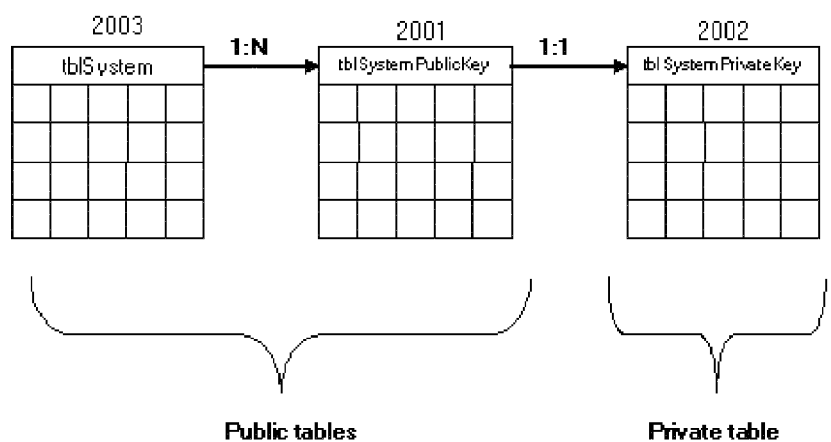
FIG. 20 depicts a schematic diagram illustrating, in principle, the structure of the "System" table group responsible for system authentication according to an embodiment of the invention.

FIG. 20 depicts a schematic diagram illustrating, in principle, the structure of the "System" table group responsible for system authentication according to an embodiment of the invention. Each computer system may create at least one pair of asymmetric encryption keys. The public key may stored in the public table "tblSystemPublicKey" 2001 and may also be sent to the CRD to be available for all other systems. The private key may be stored in the private table "tblSystemPrivateKey" 2002. Like in all other tables, the GIMS ID format (data type) may be used as a primary key in table "tblSystemPublicKey" and "tblSystemPrivateKey". FIG. 20 also shows the public table "tblSystem" 2003, which may reference the public key may stored in the public table "tblSystemPublicKey" 2001.

As described above, in some embodiments, data exchange between two computer systems always takes place as an indirect communication via public Inboxes. A receiving system may download standardized transaction files for further processing. Each such transaction file must contain the proper authentication information to be eligible for further processing.

The following are the main steps of an authentication process according to an embodiment of the present invention. First, the Authentication Module of the sending computer system generates a random string. Second, the Authentication Module of the sending system encrypts the random string by using its own private key. If there is more then one private key, the module may randomly selects one of them. The Authentication Module of the sending system then generates a standardized Authentication File (AUTH), which may contain the following information: (i) system ID of the sending system (not encrypted), (ii) random string (not encrypted), (iii) GIMS ID of public key that corresponds with the private key used and (iv) encrypted random string. The format of the Authentication File will be described below.

Next, to exchange data with a target system, the sending system may create a message package and upload it to the Inbox of the target computer system. The message package may be a ZIP file, which, besides transaction files (SEND, DEL, REPL, and QRY), also includes a standardized Authentication File (AUTH) described above. The target system will download the message files from its Inbox. As these message files originate from different systems, the processing of each of those files may be a separate process with separate identification procedures.

The identification procedure may be as follows. The Authentication Module of the target system may extract the information containing in the Authentication File of the sender system. The Authentication Module of the target system may query the database of the target system to retrieve the public key of sender system, using the provided GIMS ID for that record. If there is no such record, the module may automatically initiate a request to the CRD to obtain public information about the sender system.

Using the public key, the Authentication Module of the target system may decrypt the random string. If the result of the decryption matches the unencrypted string, then the authenticity of the sender system is confirmed and the transaction files may be handed over to the Import module for further processing. Otherwise, the entire message package may be deleted, and the incident of false identity may be recorded in a special database table.

7c. Record Management Module

Database records in various databases and tables may represent different types of information. For example, the table "Address" may contain address information, the table "Person" may contain information about individuals, and so on. Yet, all these different records have something in common because all have a record history, sending history, replication and access management. Record history is the time and user who created, updated or deleted the record. Sending history is the time and user who sent the record to another system. Replication identifies which records have to be replicated to what target systems. Access management identifies who is permitted to view, update, delete or administer a record.

Embodiments of the present invention may include an application-independent method to manage the requirements listed above. The GIMS IDS enables a universal solution. As stated above, all tables may use the GIMS ID format as the primary key. Here is where the GIMS ID, being a global identifier of any kind of information, will demonstrate its hidden power.

The GIMS ID may provide the possibility to create a universal, application-independent method to accomplish management of record access, record history and record distribution on global scale. This may be achieved by combination of the GIMS ID format with a table group, which may include a limited number of standard tables. This table group may include: (i) the record log table "tblRecordLog," (ii) the table group "Record history," (iii) the table group "Access Management," (iv) the table group "Record distribution" and (v) the table group "Record description."

The table "tblRecordLog" may be designed to store basic information about any record in any application table. This information may include (a) time and user who created the application record, (b) time and user of last record update as well as (c) basic assess right rules. The column "RecordID" in table "tblRecordLog" may be the foreign key, which links the record to all other GIMS application tables. The values stored in this column may be the primary keys of the corresponding tables, which may be expressed as GIMS IDs.

In some embodiments of the invention, each record in any application table has a 1:1 relationship with a record in "tblRecordLog." Each time a new application record is inserted into an application table, the Record Management module may perform two mandatory actions: (a) generating a unique GIMS ID to be inserted as primary key value of the new record and (b) creating a new record in table "tblRecordLog" by inserting the following information: (i) the newly generated GIMS ID of the application record in column "RecordID," (ii) the date/time when application record was created, (iii) the user ID who created application record (e.g., using the user's GIMS ID) and (iv) basic information about access right rules for the application record. These rules and their format will be discussed in detail below.

Although table "tblRecordLog" may provide basic information about the record's history, this may not always be sufficient on its own. A record can be updated multiple times by multiple users across multiple systems. Therefore, a group of additional tables may take over the task of creating a detailed history of each application record. It may allow not only documenting each record update but also the details of those updates by storing old and new values of each column during updates.

The table group "Access Management" may regulate which users have the privilege to view, update, send or delete application records. The table "tblRecordLog" may provides basic information in regard to access management rules. So, if a record is for public display, then the corresponding record in "tblRecordLog" may be sufficient. However, often there is the need to assign very specific assess rules to single users or user groups only. Access rules become even more complicated when they involve users across multiple systems or when privileges to certain users are combined with exclusion of another individual user or group of users. The system table group "Access Management" may be responsible for Access Management of all application record across all systems. This table group is part of the "Access Management Module," which is described below in section 4d.

Systems in the GIMS network in accordance with embodiments of the present invention may be constantly exchanging database records. This activity may be controlled by the system table group "Record Distribution," which is part of the "Data Exchange Module" described in below in section 4e. Basically, the system table group "Record Distribution" may manage the ad-hoc data exchange of selected records (transaction type SEND) as well as scheduled exchanges (partial or full replication REPL). It also may create an exchange history log.

The previous table groups may be used by software modules and may represent data mostly invisible to the end user. However, there are also attributes, common for many kinds of records, that are essential for the end user. These common attributes serve to better describe the records. The common attributes may be stored in the table group "Record Description," which may include the following three tables:

| Table name | Description |
|---|---|
| tblRecordNotes | This table may be used for storing notes related to a database record |
| tblRecordKeyword | This table may be used for storing keywords related to a database record |
| tblRecordClassification | The GIMS concept may make wide use of national and international, standardized and proprietary classification systems, which will be described in detail in section 8. This table may be used to store classification codes related to a database record |
| tblRecordHierarchy | Objects in real life, expressed by database objects, can be in hierarchical relationships. Table "tblRecordHierarchy" may store hierarchical relationships between database records. |

Figure 21:
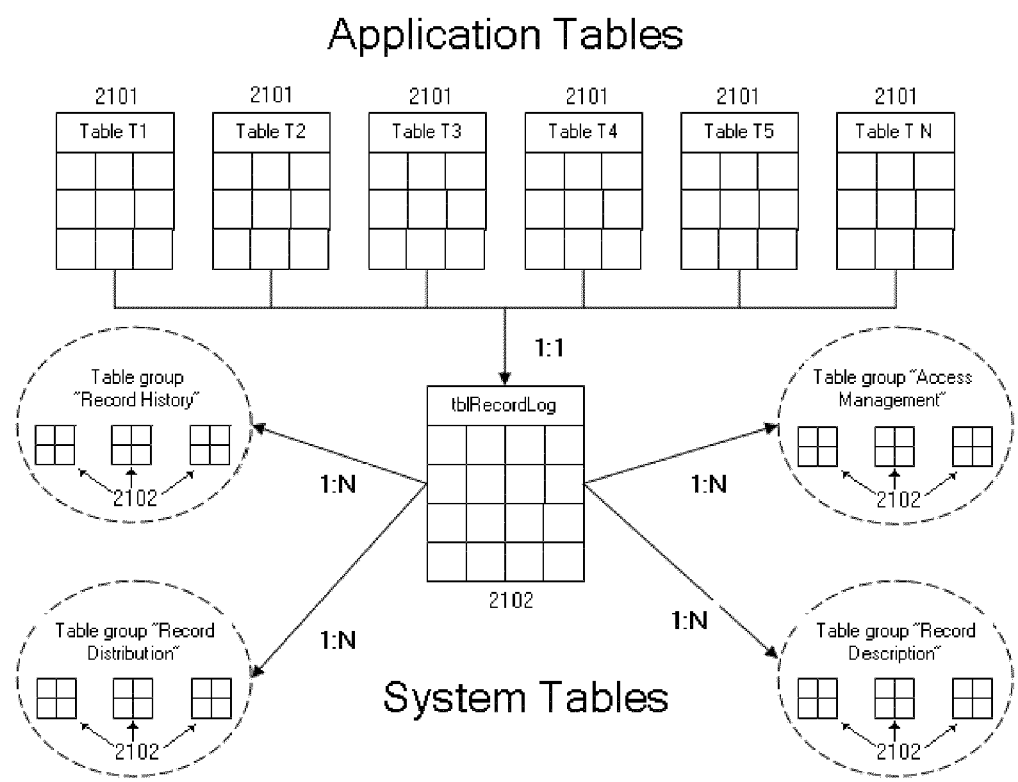
FIG. 21 depicts a diagram illustrating the basic relationships between application tables and system tables according to an embodiment of the invention.

The system tables listed above may have a common attribute: they each may include a column "RecordID" as a foreign key to be linked to the primary keys of all application tables that use the GIMS ID format. FIG. 21 depicts diagram illustrating the basic relationships between application tables 2101 and system tables 2102 according to an embodiment of the invention.

7d. Access Management Module

The purpose of the Access Management Module may be to regulate which user has the right to view, update, delete, send and/or administer database records. This functionality is not limited to a single system but may be applied to any database across the GIMS network.

Access Management may include two overlapping parts. The first may regulate data access within a system, and the second may regulate access by users from other systems. Both parts may be built on the same foundation.

Information, which determines the access privileges, may be stored in system tables belonging to table group "Access Management". The Access Management Module may include the "Access Management" table group and a number of software modules that process access rights related information in accordance with standard procedures.

Generally, access rights may be divided into three major categories: (i) open records, (ii) restricted records and (iii) private records. Open records are records open to everyone. Restricted records are records accessible to a limited number of users. Private records are records accessible only to its creator. These three categories may apply to all database transactions: view, update, delete, and send. They may be set whenever a new application record is inserted into a database table. The access rights may be changed at any time by an authorized user.

The categories "Open" and "Private" are clearly defined and easy to implement. This may be done by using the corresponding record in table "tblRecordLog," where the access category for each application record may be set. By setting the category as "Open" or "Private," there is no need to involve the remaining tables of the "Access management" table group. Yet in many, if not most, cases there is the need to restrict access privileges. This may also be done by using the corresponding record in table "tblRecordLog". In this case, the access category must be set as "Restricted." However, setting access privileges as restricted may additionally requires the involvement of the remaining tables of the "Access management" table group.

The table below shows the criteria according to which the access privileges may be set. These criteria can be assigned as (a) privilege given or (b) privilege denied.

| Criteria | Description |
|---|---|
| System level | Privileges assigned to selected systems |
| User- creator | Privileges assigned to the creator of record. This is the default setting; the creator of a record usually has full access to it. Yet there are cases when the privileges have to be taken away from the user who entered the record. For example, when the boss, after dictating a confidential memo to its secretary, wants to deny further access to the memo by the secretary. |
| Group member level | Privileges assigned to a user group. A user group may usually include users within a systems, yet it can also include a user from another system. |
| Hierarchy position | Users and user groups are part of organizational hierarchies, and have therefore more or less privileges, which must be considered by the Access management module. By default, a member of a higher ranking user group may have access to records created by members of lower ranking user groups. |
| Receiver | Privileges assigned to users who are receivers of messages (records) from another system. |
| Representative | During absence due to vacation, business trip etc. users can assign other users as their representatives. Such representation can be revoked at any time. That provides the representative with additional access privileges to data not accessible to him under normal circumstances. |
| Selected user | The combination of the criteria above allows setting access rules for a huge number of cases. Yet there are cases, which cannot be expressed by these criteria alone. For example: assign access to all users in group G1 in my system, yet deny access to user U1 in group G1, plus assign assess to user U55 in system 48388. |

The "Access Management" module may allow fine-grained access control in such exceptional cases. The age control feature may be used for parental control to limit children and juveniles access to violent and/or sexual content.

Figure 22:
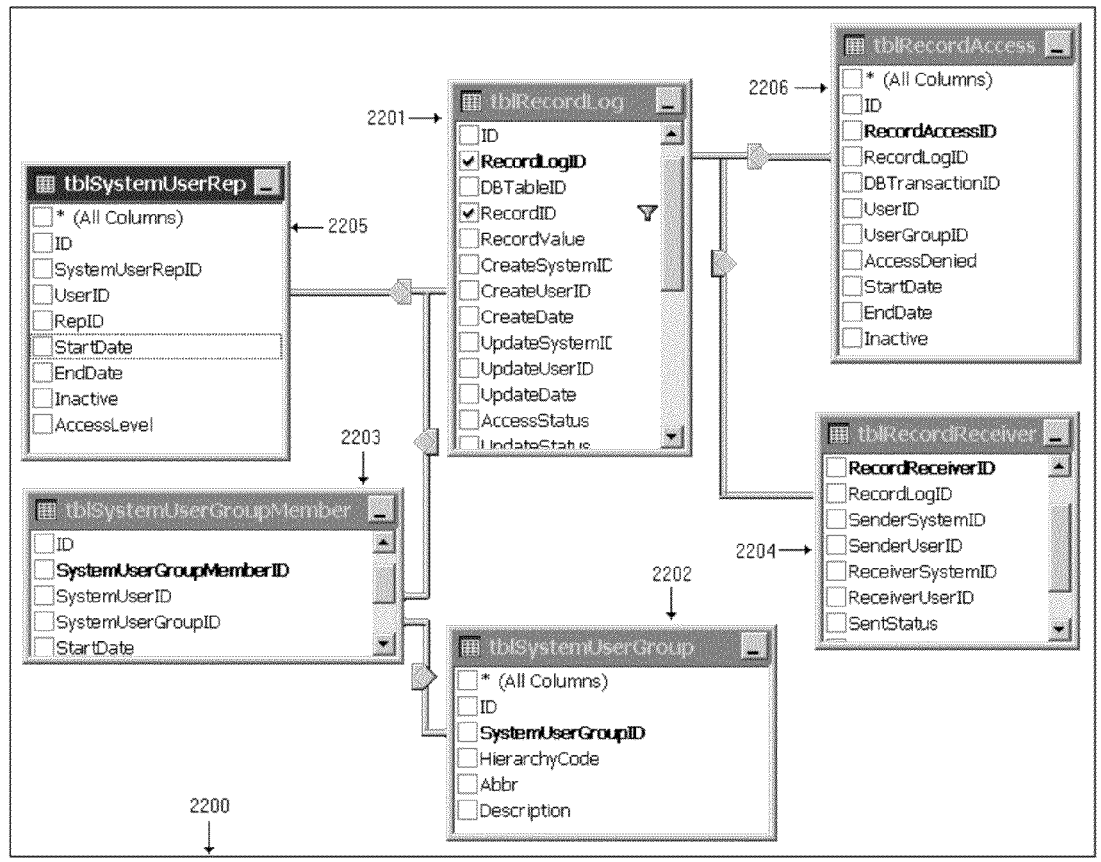
FIG. 22 depicts a diagram illustrating a configuration of the table Group "Access Management," in which information related to access management of database records may be stored, according to an embodiment of the invention.

Information related to access management of database records may be stored in the table Group "Access Management." FIG. 22 depicts one possible configuration of the tables of table Group "Access Management" 2200. Any application record may be represented in this table group by a single record in table "tblRecordLog" 2201. If the access status for a particular application record is "Open" or "Private," then there may only one corresponding record in table "tblRecordLog" 2201. Otherwise, additional access rules may be stored as follows. Table "tblSystemUserGroup" 2202 and "tblSystemUserGroupMember" 2203 may determine user group and hierarchical relationship between user and creator of record. Table "tblRecordReceiver" 2204 may determine whether user is receiver of particular record. Table "tblSystemUserRep" 2205 may determine which users are current representatives of record creator. Table "tblRecordAccess" 2206 may regulate fine-grained access control in exceptional cases.

The table group "Access Management" can be applied to any single application table or joined table group for the purpose of access control. Below, this will be demonstrated based on a simple example involving a single application table "Address."

The general syntax of a standard query language (SQL) query is: SELECT+Select-Statement+FROM+From-Statement+WHERE+Where-Statement, where SELECT, FROM and WHERE are standard SQL clauses. To illustrate the general syntax of an SQL query, the following statement may be made using the table "Address": "SELECT Street, City, Country FROM Address Where City='New York'". This statement can be divided into the following parts: (i) Select-Statement (e.g., Street, City, Country), (ii) From-Statement (e.g., Address) and (iii) Where-Statement (e.g., City='New York').

Figure 23:
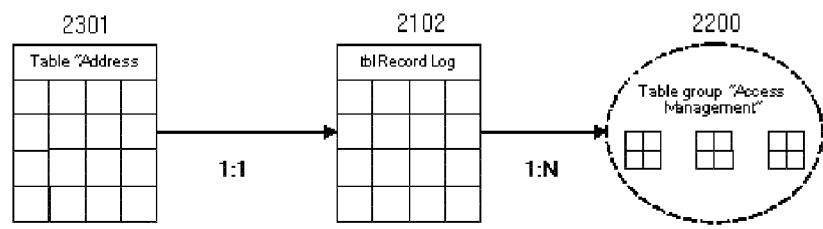
FIG. 23 depicts a diagram illustrating a join SQL statement joining the application table "Address" 2301 with the table group "Access Management" 2200 to add restrictions according to an embodiment of the invention.

In embodiments of the present invention, the SQL statement above does not need to contain any access control restrictions. Any user can get full access to all records, which match the search criteria "City='New York'". To add restrictions, a join SQL statement joining the application table "Address" 2301 with the table group "Access Management" 2200 may be created, as shown in the FIG. 23. The syntax of the join statement may be: SELECT+Select-Statement+ FROM+From-Statement)+From-Statement2+WHERE+ Where-Statement)+Where-Statement2.

In this new statement, the Select-Statement remains unchanged, yet the From-Statement and Where-Statements are divided into two parts each. From-Statement1 may represent the FROM clause of application tables only. In our example, it is a single table, yet it can be any join expression of multiple application tables. This part may be a variable and may change with any query depending of the application requirements.

From-Statement2 may represent the FROM clause of the "Access Management" table group 2200 only. The tables of this group, as shown in FIG. 22, are for the purpose of providing an example of the tables of the "Access Management" table group. Other embodiments of the present invention may use different configurations for the "Access Management" table group. Once a common standard for all GIMS databases worldwide is set, the From-Statement2 may be a constant and will never change. It may be a function of the "Access Management Module" to generate the correct SQL syntax to connect From-Statement) and From-Statement 2 into a single valid FROM clause.

Where-Statement1 may represent the WHERE clause of application tables only. This part is a variable and will change with any query depending of the application requirements. Where-Statement2 may represent the WHERE clause of the "Access Management" table group only. As noted above, the tables shown in FIG. 22 are for the purpose of providing an example of the tables of the "Access Management" table group. Other embodiments of the present invention may use different configurations for the "Access Management" table group. Once a common standard for all GIMS databases worldwide is set, the WHERE-Statement2 will be a constant and never change.

In some embodiments of the present invention, the query will only provide results if, besides matching the search criteria, the user fulfills at least one of the following conditions: (i) the record is accessible to all users (Access status="Open"), (ii) the user is the creator of the record, (iii) the user is member of the same user group as the user who created the record, (iv) the user is hierarchically positioned higher then the user who created the record, (v) the user is the receiver of a record sent by a user from another system, (vi) the user is an active representative of user who created the record, (vii) the user has been explicitly assigned access rights for this particular record or (viii) the user has not been explicitly denied access rights to this particular record.

The following is example of what a Where-Statement2 might look like using SQL pseudo-code: WHERE (AccessStatus='Open') OR (CreatorUserID='MyUserID') OR (SystemUserGroupID='MyUserGroupID') OR (CreatorHierarchyPosition<'MyHierarchyPosition') OR (ReceiverUserID='MyUserID') OR (RepresentativeID='MyUserID') OR (SpecialUserID='MyUserID' AND AccessStatus=true). Here, AccessStatus=True if access has been explicitly granted, and AccessStatus=False if access explicitly has been explicitly denied.

By adding the transaction type (View, Update, Send, Delete, Administer) into the WHERE statement, the "Access Management Module" may be capable of precisely determining the full scope of privileges of a particular user in regard to any record in any database table.

Accordingly, embodiments of the present invention may include an Access right management method based on: (a) a limited number of standardized tables to store access right properties for each record, (b) linking any application record to "Access management" table group by using the unique GIMS ID, and (c) determining access rights by query database using database statements that join application tables with "Access management" tables in a certain, strictly determined way.

7e. Data Exchange Module

The "Data Exchange" module may include two sub modules: "EXPORT" and "IMPORT". The function of the EXPORT module may be to extract data from its own database, transform that data into a platform-independent file format (XML, CSV or others) and send these files to the Inbox of the target system. Before performing its function, the EXPORT module may check whether the system is authorized to send data to the target system. The EXPORT module may generate five distinguished file types (SEND, DEL, REPL, QRY and QRYRES).

The IMPORT module may download standardized files (SEND, DEL, REPL, QRY and QRYRES) from the system's Inbox and may import the data into the database. The IMPORT module includes the Access Right Management Module (ARM), which may be responsible to check whether the sender of those files has the right to manipulate the database of the target system. The IMPORT module may ignore any proprietary file format unless the system has, prior to the IMPORT, been registered as member of a limited number of systems using that proprietary format. The IMPORT module may also, prior to the actual import transaction, check whether the column names and column properties (e.g., data type, size, etc.) match the standard.

Standard data exchange files like SEND, REPL, QRY or QRYRES may be created by the EXPORT module. In some embodiments, the standard data exchange files always contain data only from a single table. The structure of the standard data exchange files may fully reflect the database structure of that table. In some embodiments, storing data from multiple tables within a data exchange file is strictly forbidden.

The following example demonstrates the rule, in some embodiments, that storing data from multiple tables within a data exchange file is strictly forbidden. In the example, the EXPORT module is extracting data from the database using the following query: "SELECT_Person.*, Address.*_FROM_Person INNER JOIN Address ON Person.PersonID=Address.PersonID_WHERE_Person. LastName='Smith' AND Address.City='New York'".

In the example, each row of the dataset returned by the database will contain data from both tables "Person" (T219) and "Address" (T220). As mentioned before, the "EXPORT" module has to convert the dataset into platform-independent file formats like XLM or CSV. It is possible for the "EXPORT" module to do this by creating only a single file. However, the rule above requires that, in this case, two files be created where the first contains data from table "Person" only, and the second from table "Address". Accordingly, the more tables the query contains, the more separate files that may have to be created by the "EXPORT" module.

According to an embodiment of the present invention, throughout the GIMS network, standardized data exchange files must be named according to the following Syntax rules: File Type+Sender ID+Receiver ID+Table ID+Log ID+file extension.

Here, File Type is a standardized file type such as SEND, REPL or QRY. Sender ID is a system ID of sender computer system. Receiver ID is a System ID of receiver computer system. Table ID is a standardized table ID of table represented by this file (e.g., T220 for table "Address"). Log ID is a log ID recorded in a standard log table with each data exchange with another system. This table may be called "DataExchangeLog" and may be assigned a table ID=999. The data type of the primary key of that table is, like all other tables in some embodiments of GIMS databases, a GIMS ID. The Log ID is the value of the primary key of that log record. File extension—file extension like .xml for XML file or .txt/.cvs for CSV file. The parts of the file name may separated by a common separation symbol, for example an underscore.

Thus, if xml were chosen as file format for standard file names, the file names sent from system 13493 to system 5768 as result of the query above would look like: SEND_13493_0_5768_0_T220_13493_0_T999_839945993.xml for table "Address" and SEND_13493_0_5768_0_T219_13493_0_T999_839945993.xml for table "Person."

The creation of data exchange files SEND, REPL. QRY and QRYRES are triggered by different events, but the creation process itself is similar. The triggering and creation of the data exchange files according to an embodiment of the invention is set forth below.

SEND files may be created whenever a user has decided to send one or multiple records to another system. In such case, the System ID of the target system as well as the receiver's User ID is recorded in system table "tblRecordReceiver." In addition, the column 'SentStatus' may be set=True, meaning that this record is scheduled to be sent. A schedule module may check in set time intervals whether there are records to be sent. If yes, then schedule module will activate the EXPORT module. In this case, the EXPORT module will group the marked records by receiver system and database table and create proper SENT files.

In regard to REPL files, the system administrator can schedule full or partial database replications (synchronization) with other systems. In case of partial replication, the administrator may have multiple options to set fine-grained rules as to what particular information to replicate. The administrator may also schedule the replication time for each system. At replication time, the scheduling module may activate the EXPORT module, which will create REPL files accordingly.

QRYRES files may be created as response to a request from another system. The sending of requests will be discussed below in detail in 7f. Requests received from other systems may be stored in the "Query" table group. A scheduling module may check in set time intervals whether there are unanswered requests. If yes, then the scheduling module will activate the EXPORT module.

Figure 24:
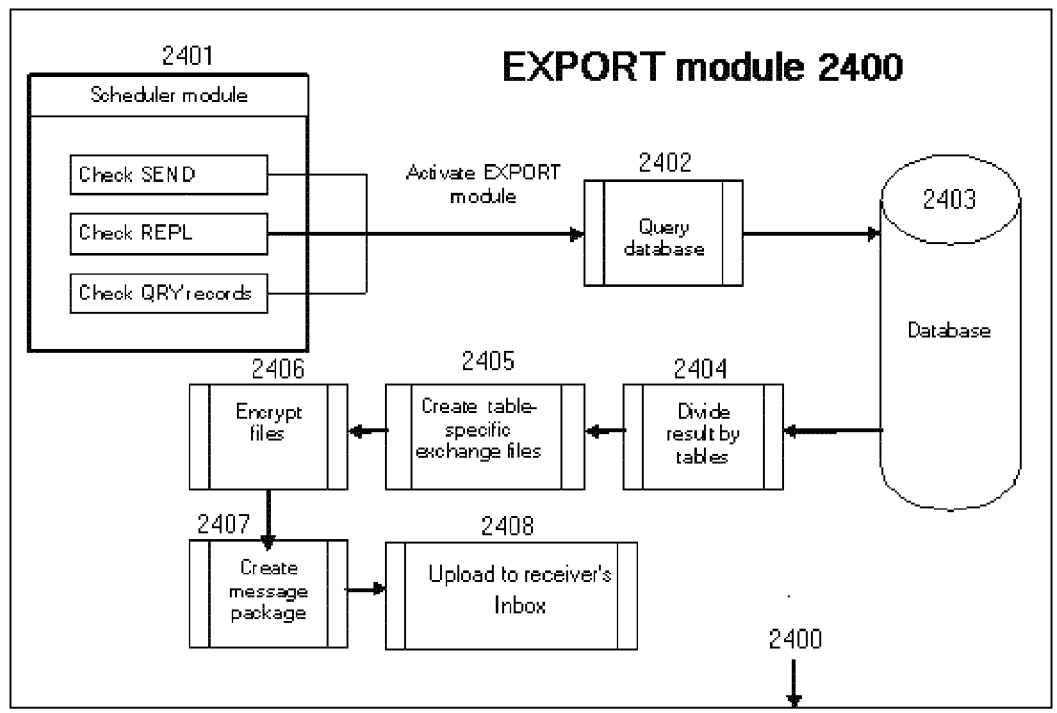
FIG. 24 depicts a schematic diagram illustrating the main functions of an EXPORT module after it is activated by the SCHEDULER module according to an embodiment of the invention.

FIG. 24 depicts a schematic diagram illustrating the main functions of an EXPORT module 2400 after it is activated by the SCHEDULER module 2401. The EXPORT module 2400 always starts with a database query 2402 to database 2403. The query 2402 itself depends on which event has triggered its activation. All following steps are similar, except, that the file names differ, starting with "SEND_", "REPL_" or "QRYRES_". At 2404, the EXPORT module 2400 divides the query results from database 2403 by tables. At 2405, the EXPORT module 2400 creates table specific exchange files. At 2406, the EXPORT module 2400 encrypts the table specific exchange files. At 2407, the EXPORT module 2400 creates a message package. At 2408, the EXPORT module 2400 uploads the message package to an Inbox of another computer system.

As stated before, in some embodiments of the present invention, data exchange between systems is always an exchange of standard files sent to the Inbox of the target system. Yet, this may not occur as exchange of single SEND, DEL, REPL, QRY or QRYRES files. Rather, the exchange of standard files may be an exchange of especially arranged zip files, which are referred to as "message packages."

These zip (i.e., Message Package) files may follow the following rules. The file naming rule may follow the following syntax: Sender ID+Receiver ID+Log ID+".zip". For example, a zip file may have the file name 13493_0_5768_0_13493_0_T999_839945993.zip. The message package may contain files destined for a single receiver system only. In some embodiments, the message package must contain authentication information according to the authentication procedure, described above in section 7b. In some embodiments, the message package must contain encryption information to allow the receiver to decrypt the received files. Further, the authentication and encryption information may be stored in a separate standard file AUTH.

Figure 25:
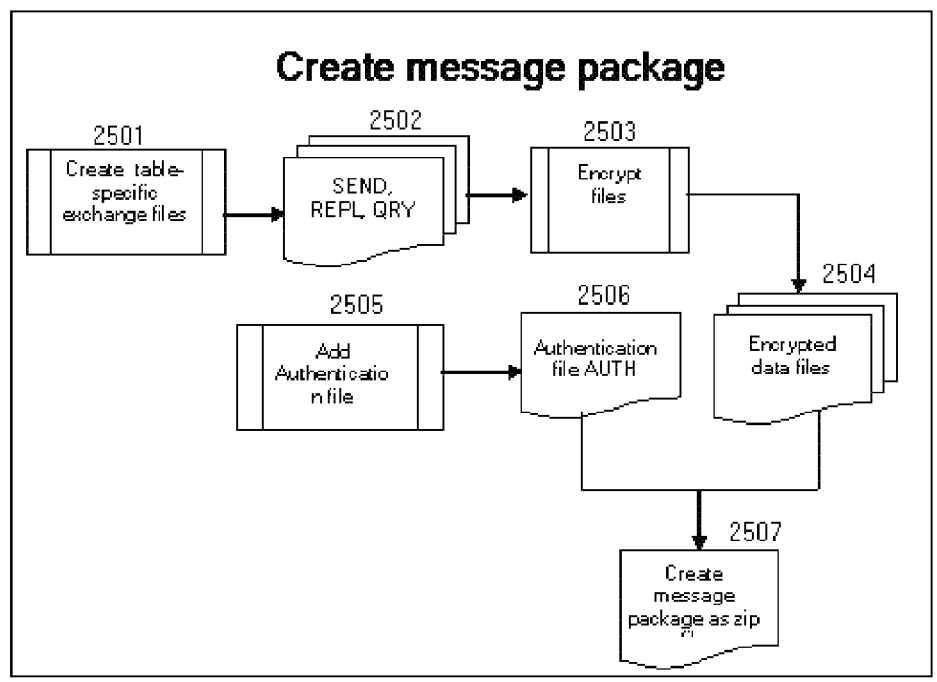
FIG. 25 depicts a flow chart illustrating the steps necessary to create a "Message package" according to an embodiment of the invention.

FIG. 25 depicts a flow chart illustrating the steps necessary to create a "Message package" according to an embodiment of the present invention. In step 2502, table specific exchange files are created, such as SEND, REPL or QRY files 2502. In step 2503, the table specific exchange files are encrypted to produce encrypted data files 2504. In step 2505, standard file AUTH 2506 storing authentication and encryption information is added. In step 2507, a message package is created from the encrypted data files 2504 and standard file AUTH 2506 as a zip file.

Below are the steps of the encryption process within the EXPORT module 2400 at 2406 of FIG. 24 and/or step 2503 of FIG. 25 according to an embodiment of the invention. To begin, the Encryption Module generates a random string. Then, it creates a one-time symmetric encryption key based on the generated random string. Next, the Encryption Module encrypts all data files (SEND, DEL, REPL, QRYRES) using the symmetric key. The Encryption Module also encrypts the symmetric key using the public key of the receiving system. If there is more then one public key, then the module randomly selects one of them. The Authentication Module of the sending system generates a standardized Authentication File AUTH, which contains the following information: (i) encrypted symmetric key, (ii) GIMS ID of public key of the receiver system, which is used to encrypt symmetric key, and (iii) authentication information as described above in section 7b.

After creating all data files and the authorization file AUTH, the EXPORT module may bundle them together by compressing them into a single zip file, which will be uploaded to the Inbox of the receiver system (see element 2408 of FIG. 24). Thus, according to an embodiment of the invention, each message package may contain multiple encrypted data files and one unencrypted authorization file. The unencrypted authorization file may contains a unique encryption key for system authentication and a separate unique encryption key for data encryption that is valid for this message package only.

7f. Global Search Module

Users of GIMS application may have the option to query their own database as well as databases of other systems. Search criteria may be entered into query forms that correspond with the structure of the database to be queried. Unlike index-based search technology used by conventional search engines, GIMS applications may be database-centric. Therefore, they, unlike conventional Internet search engines, may use multiple search fields in the query form. That allows bringing the search criteria into the right context.

For example, when entering "tree" in conventional Internet search engine, one gets hundred of millions links related to forest trees, Christmas trees, family trees, cable trees and many others. As the request is unstructured, so is the response. In contrast to that, each GIMS database may have its own query form, where multiple query fields allow query the database in the desired context. As soon as the user clicks on the search button, the application may send a query to the database. Yet this process may differs depending on whether the query targets the own or a foreign database.

Figure 26:
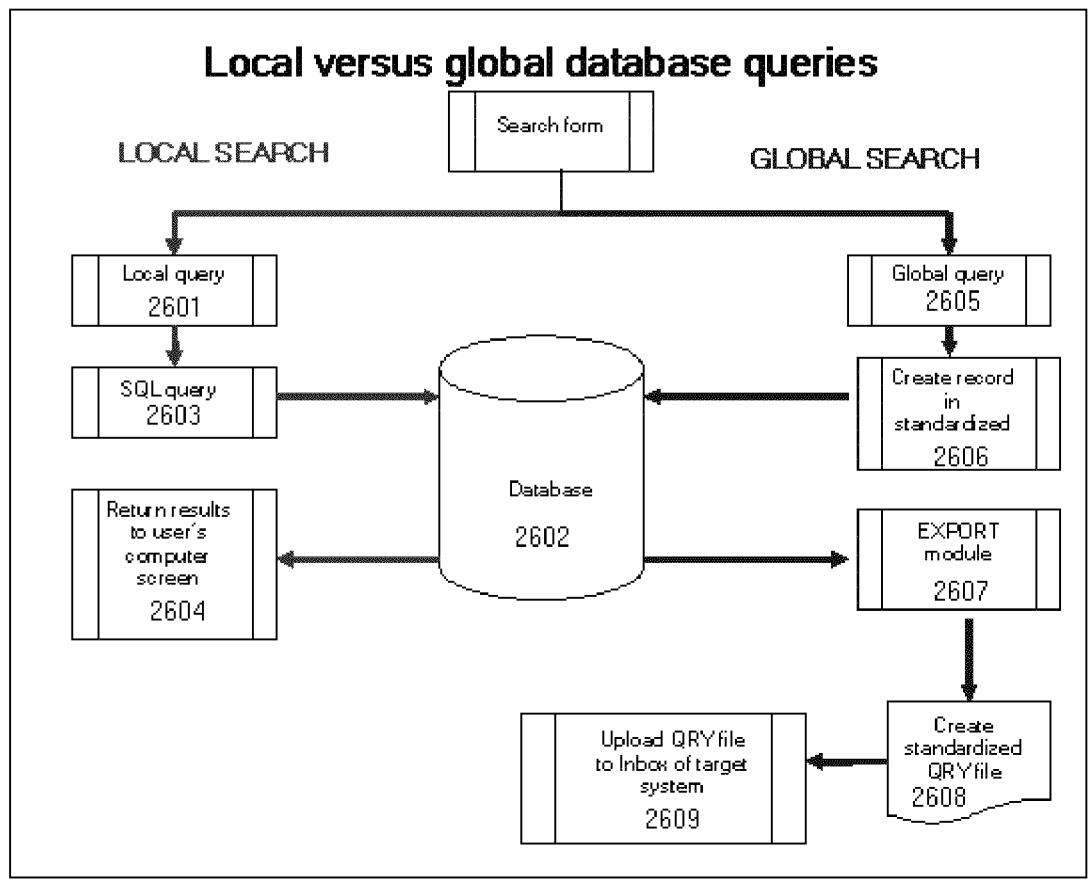
FIG. 26 is schematic diagram illustrating the difference between local and global search according to an embodiment of the invention.

FIG. 26 is schematic diagram illustrating the difference between local and global search according to an embodiment of the invention. If the user query is a local query 2601 to the local database 2602, then the query 2601 is performed as a direct SQL statement 2603 against the local database 2602, and the results are returned in 2604. In contrast, in the embodiment of the invention, a global query 2605 to a foreign database is never direct queries. In such a case, at 2606, the application may store the query information that the user entered into a query form as records in a group of standardized table, called "Query tables." Besides the search criteria, these records may also contain information as to which database system has been targeted. The EXPORT module 2607 may then extract the query records from the "Query" tables and create standardized "QRY" files 2608 to be sent to the Inbox of the target system in 2609.

In embodiments of the present invention, each computer system in the GIMS network can query another computer system if it has the appropriate access rights. However, the query is sent not directly but in form of a platform-independent standardized file. Only the software module of the target system is authorized to query the target database. It will translate the incoming search requests into query languages (SQL and others) and query the database. Thus, the target system is protected from SQL and similar hostile attacks.

The table below shows an example of a platform-independent query record:

| Table Query ||||
|---|---|---|---|
| QueryID | DBID | UserID | Date |
| 255_0_T600_254 | D3 | 255_0_T77_45 | April 12, 2010 |

1:N

| Table QueryDetails ||||||
|---|---|---|---|---|---|---|
| QueryDetailsID | QueryID | TableName | Column | Value | Symbol | Match if |
| 255_0_T601_1 | 255_0_T600_254 | Document | Title | 'War' | like | 1 |
| 255_0_T601_2 | 255_0_T600_254 | Document | Author | Tolstoy | = | |
| 255_0_T601_3 | 255_0_T600_254 | Classification | Classification ID | 1_0_T601_10 | = | |

The UserID '255_0_T77_45' in table Query indicates that the query comes from system '255' and end user '255_0_T77_45'. The DBID 'D3' indicates that the query is targeting the 'Document management' database.

The table QueryDetails may contain the search criteria of the query. The value of column "Symbol" could be: =, >, >=, <, <=, BETWEEN and/or LIKE. The column "Match if" is used only for string expressions when the value in column "Symbol"="LIKE". Its value is an integer=1, 2, 3 or 4 where 1="starts with," 2="contains," 3="exact" and 4="ends with."

In the example above the resulting query, generated by the Query Module of the target system, could look like: "SELECT*FROM Document WHERE Title LIKE 'War %' AND Author="Tolstoy" and ClassificationID='1_0_T601_10'". Yet this SQL expression does not include any access restrictions. Therefore, it is just part of the SQL statement, generated by the Query Module. The actual SQL statement would join this statement with tables of the "Access Management" table group, as described above in section 7d.

Instead of the local User ID used in local queries, it would insert the foreign User ID of the remote system: in our case the User '255_0_T77_45'. As a result the query would retrieve records that a) match the application-related criteria AND b) match the privilege level of the requesting user.

7g. Security/Encryption Module

Today's encryption methods are very safe. If a proper strong password is chosen, then 256-bit AES encryption provides such a level of security that a modern-day personal computer needs approximately 1062 years to crack the encryption using the brute-force method. Even when encryption is so powerful, hackers still have the chance to wreck havoc because of the human user. It is the human user who keeps passwords secret or shares it with colleagues, applies or skips encryption procedures, follows security rules or ignores them, is loyal to his employer and colleagues or dreams of his big moment of revenge.

The solution for a secure system can be achieved by removing the human factor altogether. Humans are the greatest threat to any system; therefore they must have only limited privileges. This rule may be applied to the system administrator as well. As noted above, GIMS software solutions eliminate the need for a system administrator in a traditional sense. The system administrator is the GIMS application itself. In embodiments of the invention, the human administrator is limited to making decisions only on a human level, not on system level.

In some embodiments of the invention, unlike traditional database solutions, the human administrator does not have direct access even to the human administrator's own database. In other words, the human administrator does not have a password to open, view, delete or edit database tables. If such transactions are necessary, then they are performed by the GIMS application according to strict procedures.

The password to access the database may be created during the system registration procedure and stored in encrypted form. In some embodiments, only the automatic software modules of a GIMS software application have the privilege to manipulate the database. For the purpose of possible system recovery in case of data loss (hardware failure, fire, water damage etc.), the encrypted set of passwords can be stored on an external storage media. This external storage media has to be stored at a safe location (bank safe etc.). The human administrator cannot use that information to have direct access to the database; this information is usable only by the software package to perform the necessary transactions.

Encryption is a mature technology. It is fast (a matter of a few milliseconds), error free and cheap. There is no reason not to use it all the time. Within the GIMS network according to embodiments of the present invention, all transactions, without exception, may be performed by automatic software modules with mandatory encryption and authentication for each single transaction. Within a system, user authentication occurs by using a username/password combination or, preferably, biometrics methods.

The combination of the following factors may ensure a secure environment within the GIMS network: (i) unique identification of all systems and users worldwide by using GIMS ID, (ii) global depository of public keys of all systems in the CRD (Central Registration Database), (iii) removal of human intervention (e.g., all transactions may be performed by automated software modules), (iv) indirect communication between systems through exchange of standardized data files, and the use of an Inboxes (e.g., FTP directories) to exchange files, (v) mandatory and automatic authentication during every transaction using a combination of one-time random encryption keys and public keys, (vi) mandatory and automatic encryption, using a combination of one-time random encryption keys and public keys, (vii) protection of databases from direct human intervention, (viii) mandatory and automatic virus scan of every unstructured file (text, audio, video, image etc.) sent to another system, (ix) elimination of direct access to own database by foreign system or its users, and (x) queries from other systems are sent in form of a platform and language-independent files. The GIMS software will check the privileges of the requesting system/user and, if privilege granted, translates the request into an appropriate query language (SQL or others). It will automatically check the resulting SQL statement for SQL attack safety. Thus, the threat of SQL injections and other hostile techniques is greatly reduced and/or eliminated.

7h. Redundancy Control Module

The Redundancy Control Module may use the GIMS ID to achieve effective redundancy control. Redundancy control has two aspects. First is the prevention of redundancy when receiving data from another system. Since data exchange between systems is always exchange of database records, the use of globally unique primary keys with GIMS ID as data type automatically prevents the repetition of a record. Accordingly, the only procedure that may be necessary, when importing data from another system, is to check the privileges of the sender system to insert a new or update an existing record. This may be the function of the access right management (ARM) module.

The second aspect of redundancy control is requiring redundancy prevention when requesting data from another system. While entering search criteria into the search form, the user may have the option to request redundancy prevention from the target system. This means that the target system should not send records that already exist in its own database. This process may work as follows: The Query Module queries the own system, using the search criteria entered by the user. From the result set the module creates a list of primary keys only. This list is converted into a separate standardized file and sent to the target system together with the standardized file, which contains the query itself.

After receiving the query, the EXPORT module of the target system will create a temporary table, which contains the primary keys of records, already existing in the database of the sender system. By creating a simple (LEFT OR RIGHT) JOIN expression with the temporary table, the target system can select records that do not match the content of the temporary table. Thus, the target system may fulfill the redundancy prevention request of the sending system.

8. Categorization/Classification

Categorization of information has been practiced by humankind long before the computer era. Libraries, starting with those in ancient Egypt, are all using either proprietary or generally-accepted categorization or classification systems. Today, there are many internationally accepted classification system for almost every industry or field of knowledge.

For some unclear reason, the use of classification systems in present-day Internet is rather an exception. A step to categorize web sites was the introduction of tags, yet there are millions of tags and their meaning is ambiguous.

For example, a search for "French essays" in any conventional search engine will result in millions of links to web sites, most of which have nothing to do with French essays. Why, instead of using the phrase "French essays", not use the code 844 of the Dewey Decimal Classification System, used in libraries, and find exactly the information needed.

According to embodiments of the present invention, within the GIMS database network classification systems are widely used to exactly categorize information. This may be achieved by using the standardized table groups "Record Classification". Since classification systems are always hierarchical data structures, the table group "Record Hierarchy" can also be used. Using the GIMS ID, each record can be categorized by entering the appropriate classification code into the mentioned table groups.

The value "844" has many meanings. It can be an area code, street number, weight in pounds or anything else. It describes the category "French essays" only if everybody involved knows that we are talking about the code, as used in the Dewey Decimal Classification System. Therefore, one function of the CRD may be to create a commonly valid reference to all publicly used classification systems. This may be achieved by importing all public classification systems into the standardized table group "Record Classification" and assigning a unique GIMS ID to the records.

The table below shows an example of such an assignment of a unique GIMS ID to the records:

| Table ClassificationSystem | |
|---|---|
| ClassificationSystemID | Description |
| 1_0_T600_1 | Library of Congress Classification System |
| 1_0_T600_2 | Dewey Decimal Classification System |

1:N

| Table Classification | | | |
|---|---|---|---|
| ClassificationID | ClassificationSystemID | Code | Description |
| 1_0_T601_1 | 1_0_T600_2 | 030 | Encyclopedias & books of facts |
| 1_0_T601_2 | 1_0_T600_2 | 030 | General encyclopedic works |
| 1_0_T601_3 | 1_0_T600_2 | 031 | Encyclopedias in American English |
| 1_0_T601_4 | 1_0_T600_2 | 032 | Encyclopedias in English |
| 1_0_T601_5 | 1_0_T600_2 | 033 | In other Germanic languages |
| 1_0_T601_6 | 1_0_T600_2 | 034 | Encyclopedias in French, Occitan & Catalan |
| 1_0_T601_7 | 1_0_T600_2 | 035 | In Italian, Romanian & related languages |
| 1_0_T601_8 | 1_0_T600_2 | 036 | Encyclopedias in Spanish & Portuguese |
| 1_0_T601_9 | 1_0_T600_2 | 037 | Encyclopedias in Slavic languages |
| 1_0_T601_10 | 1_0_T600_2 | 038 | Encyclopedias in Scandinavian languages |
| 1_0_T601_11 | 1_0_T600_2 | 039 | Encyclopedias in other languages |

Although the value "038" is ambiguous in general use, within the GIMS network, the value "1_0_T601_10" means "Encyclopedias in Scandinavian languages" and nothing else. Accordingly, the user does not need to memorize ID's like "1_0_T601_10". The user may search in human terms, while the software may provide and insert the appropriate codes.

The use of classification systems is not limited to public system only. Each system or organization can develop its own, hierarchically organized, classification systems. As a rule, these codes are used only to classify data within the own system. If there is the need to share such proprietary classification systems with other systems, then an exchange of classification codes among a limited number of systems may be required. The CRD will not distribute proprietary classification systems to all users. It is up to each system to make arrangement (exchange) to share proprietary classification systems with other systems. Only if a particular classification system gains such a popularity to be useful to all systems, then it is in the discretion of the CRD to declare such system as public and add to the list of public classification systems.

9. Document Management

The description above has been primarily directed to database records, which per definition are considered as structured information. Nonetheless, according to embodiments of the present invention, the GIMS system may be used to manage the huge amount of unstructured data in form of text, video, audio, image and other types of files and to deal with the billions of web sites all over the Internet.

Some conventional RDBMS allow storing unstructured files in database tables using a special data type called a Binary Large Object (BLOB) or using SecureFiles. Although GIMS systems may use modern database management systems as mandatory prerequisite, GIMS systems do not use SecureFiles or similar features provided by other database vendors.

Instead, some embodiments of GIMS systems may continue to store unstructured files in traditional file systems. However, in the embodiments, the storage of unstructured files in traditional file systems is not done by the user; it is done by the automated software module "Document Management." Improved performance, platform independency and realization the "Cloud" concept are benefits using the automated Document Management module to store unstructured files in traditional file systems.

9a. Replacement of File Manager Software by GIMS Software

File creating software applications (e.g, Microsoft Word or Excel) entrust the user to create file names and store the file in a directory or subdirectory of their choice. This is, in most cases, the only choice the user has to organize its files. Yet this kind of "freedom of choice" is in reality not very helpful. Even a single user has difficulties to organize files in a meaningful way. With rising number of files and users, file organization based convention document management quickly turns into a logistical and organizational nightmare.

Embodiments of the GIMS concept of the invention may be based on the assumption that it is not beneficial to the end user to know the precise location of a file or even its file name. It may be much safer to entrust such information to the software, which will never 'forget' a location or file name. It is may be much more important to provide the user with a means to assign vital properties to an unstructured file, which precisely describe its contents and, in addition, allow the creating of relationships between the content of a file with other files and/or database records.

Such functionality may be designed to organize the output of file-creating, third-party software solutions and integrate the resulting files into the structured world of the global GIMS network. It may relieve the end user from inefficient routine tasks by calling/initiating the proper third-party software, assigning file names and categorizing and storing the files. The user may be freed to fully concentrate on the content of the file the user is viewing or editing.

Within the GIMS software, there may be no place for the file-directory interface, which is the typical interface for almost any kind of software in the last 30 years.

9b. Representation of Unstructured Files by Structured Database Records

The most efficient way to store any information, including file information, is the use of databases. Therefore, all properties of a file, beginning with file name, size, file type, date of creation to information related to the file content, may easily be easily stored in database tables. In addition, within the GIMS network all unstructured files, including Internet web pages, are represented by a special standardized table group "Document". This group may consist of one or several tables.

Embodiments of the GIMS network may include a number of strict rules regarding unstructured files. In some embodiments, all third-party software (e.g., Microsoft Word, Excel, Photoshop and others) capable of creating unstructured files of any kind may be controlled by the GIMS software. In some embodiments, unstructured files may be created only through (not by) the GIMS software. In some embodiments, unstructured files must have a corresponding record(s) in the standardized table group. In some embodiments, this record(s) is generated automatically by the GIMS software as soon as the user initiates the creation of a new file. Thus, the GIMS software module may: (a) initiate the creation of a blank unstructured file of the format selected by the user and/or (b) creates a corresponding record(s) in the standardized table group "Document."

In some embodiments, the file name, generated by the GIMS software module, has the following syntax: Doc ID+file extension, where Doc ID is the value of the primary key (GIMS ID) of the corresponding record in the standardized table. Further, during data exchange with other systems, unstructured files may always be accompanied with the corresponding set of database records.

The standardized table "Document" may be an application table like any other application table within the GIMS system. Therefore, the functionality of all system tables, which regulate access right management, many-to-many and hierarchical relationships, classifications and others, may also apply to unstructured files, represented by structured records in the standardized table group "Documents".

In some embodiments, all unstructured documents, except those with "Open" access status, get automatically encrypted by the GIMS software module, using for each document a separate, randomly generated encryption key. The encryption key may be stored in the corresponding database record and may be used by the GIMS software, if the user has access rights to that document.

The use of the GIMS ID, combined with the representation of each unstructured file through a database record, opens totally new options as follows: (i) globally and uniquely identifying any unstructured file on global scale, (ii) treating unstructured files exactly the same way as structured database records by dealing with the database record, representing the file, instead of the file itself, and (iii) automatically managing unstructured files the same way that database records are managed.

Accordingly, embodiments of the present invention may include representing any file worldwide by combination of document-database record pair, and the file name syntax may be the GIMS ID and file extension.

9c. Description of the Content of Unstructured Files by Using a Limited Number of Criteria The Document Management application may be designed to manage any unstructured file on a global scale. This may include all text, image, video, audio and other file formats, located in local networks, as well as all web pages on the Internet.

The number of web pages today is estimated to be around 100 billion web pages and this number is growing fast. The number of files in local networks is even higher. A goal of the GIMS system may be to manage this enormous amount of information by using a limited number of tables and a limited number of search categories.

To help explain how it is possible to manage such huge numbers by limited means, the Library of Congress is taken as an example. The Library of Congress is the largest library in the world and has a collection of more than 130 million items includes more than 29 million cataloged books and other print materials in 460 languages, more than 58 million manuscripts, the largest rare book collection in North America and the world's largest collection of legal materials, films, maps, sheet music and sound recordings. The numbers for the Library of Congress are, although lower then the Internet numbers, still impressive.

The Library of Congress offers an Internet search page that enables a user to try to find a particular book. The table below shows what search criteria may be used to conduct searches. The number of search criteria is only 13. And most of them are not mandatory. The Quick Search allows searching just for author or title. However, by just entering a single search criterion, for example the author's name, the hundred millions of titles are immediately reduced to a dozen or less. By adding more criteria like title, the number can be narrowed even further.

| Search criteria used by the Library of Congress | |
| --- | --- |
| Keyword (match all words) | " " surround exact phrases: "war of the worlds" ? truncates: entrepr? --> finds entrepreneur, entrepreneurial, etc. Enter more words to increase relevance of search results ("match all words" means that the Boolean "AND" is automatic) |
| Title Keyword | Enter any word from the title in any order Subtitles, alternate titles, translated titles and the statement of responsibility are included in the search Enter more words to increase relevance of search results |
| Author/Creator Keyword Subject Keyword Name/Title Keyword Series Title Keyword | Headings Keyword Searches: Enter words from author/creator, subject, name/title or series title areas of the bibliographic record Enter more words to increase relevance of search results |
| Expert Search (use index codes and operators) | " " for exact phrases: "tax reform" Boolean AND, OR, NOT: (mars OR venus) AND mission Index codes refine searches: KSFG western --> finds western as subject form/genre term ? truncates: polic? --> finds police, policing, policy, etc. EXAMPLE: (wood? OR forest) AND "resource manage?" |
| Title Begins With (omit initial articles) | Enter all or initial part of title, starting with the first word: king and i Drop initial articles (a, das, the) and punctuation (",¿, !) in any language. |
| Author/Creator Browse (enter last name first) | For personal names, enter surname first: shakespeare william For group names, enter in direct order: army war college |
| Subject Browse | Enter standard subject heading, name, or genre term: solar energy Start with the left-most word: vietnamese conflict 1961 1975 Omit most punctuation: united states army history (especially double-hyphens in subject subdivisions) Truncation is automatic. |

-continued

| Search criteria used by the Library of Congress | |
|---|---|
| Call Number Browse (LC Classification No.) | Use this search for Library of Congress Classification Numbers Enter all or the initial part of a call number: f128.4 (include period) Enter spacing and punctuation accurately: p85.m23 r6 (include period/spaces) LC Classification Numbers do have a relationship to the subject of the work (view an outline of the LC Classification Scheme) Truncation is automatic. |
| Call Number Browse (Other Shelving Nos.) | Use this search for all other shelving call numbers Enter all or the initial part of a call number: microfilm (o) 83/400 (include all punctuation accurately -- slash, parentheses, words, hyphens, etc.) Enter spacing accurately: wmlc 0024/91 Other call numbers have no relationship to the subject of the work, but are often related to the format. Truncation is automatic. |
| Number Search (LCCN-ISSN-ISBN) | |

Even if the Library of Congress would increase the number of books to 10 or 100 billion items, there is no need to increase the number of search criteria. Therefore, in that respect, the GIMS system does not try to reinvent the wheel. It may use the time-honored practice, used and perfected by libraries over millennia, and just enhance that experience by adding the unique GIMS ID and/or other improvements described in this paper. Consequently, the standardized table group "Documents," representing unstructured files, contains only a limited number of columns, but they are sufficient to describe the properties and content of a virtually unlimited number of unstructured files.

10d. The Place of Web Sites in the GIMS Network

Web sites are the focal point of the present-day Internet. They do not only contain useful information but are equally important means to structure and navigate the Internet by using hyperlinks.

In some embodiments of the present invention, a web page is just another file format to the GIMS software. The content, categorization, authors, date created etc. of the web page may be stored in standardized tables in the same way as for other file formats. It may be the choice of the content creator which file format better suits him to display the intended content. If the html format, enhanced with all the multi-media options available today, is the choice—so be it.

In some embodiments, Web page files may differ from local files only by the format of their location. Special columns in the standardized GIMS database may be assigned to store the location of a file. For example, the location of a local file could be "C:\Documents\report.txt", whereas the location of a web page would be expressed as URL like "http://www.abc.com/index.html."

It may be the function of the GIMS software to retrieve the physical location of the file from the database record. Depending on whether the file is an Internet or local file, the GIMS software may display it to the user by activating either a browser or another appropriate application (for example, Excel, Photoshop, Adobe Acrobat etc.).

9e. A Novel Indexing Paradigm for Web Page Indexing

Conventionally, web designers have limited means to categorize the content of their web pages. Conventionally, the only available tool has been to add tags. However, conventional search engines index not just by tag but through fulltext indexing. As a result, those meaningful tags carefully assigned by the page creator, get lost among hundreds or thousands of indexed words.

What users expect and/or desire from a search engine is concentrated knowledge, matching their search criteria. However, conventional search engines dilute knowledge by inundating search results with millions of meaningless keywords, taken out of context.

Embodiments of the GIMS method in accordance with the present invention may provide the web designer with a set of tools to precisely categorize any document, including web pages. Index keywords may also be used, but they are used in a careful and appropriate way, in direct context with the content of the document.

As a result, the user of a GIMS may be able to find any unstructured file regardless of file format or physical location by using just a few meaningful search criteria.

9f. Additional Security Measures for Unstructured Files

In some embodiments of the invention, the GIMS software may be in full control of creating, editing, viewing and saving unstructured files. The user, on the other hand, may be prevented from performing these functions directly and only able to do so through the GIMS software interface. Accordingly, the user may not have direct access to the file; he may not even know where a particular file is stored. Thus, in respect to viewing and editing a file, the GIMS software may add an additional level of security to document management.

In regard to viewing, a user may be able to search for unstructured files a GIMS search form. The search results may be a number of database records that represent the corresponding files. These records may contain all necessary information regarding the files. Besides visible information related to the content of the document (e.g., category, author, language, document history etc.), they may also include hidden information regarding access rights, encryption information and physical location of the file.

When the user wants to view the document, the GIMS software may not open the original file indicated in the record. Instead, it may copy the file from the original location to a temporary folder on the users PC or into the memory of its PC to be viewed. Thus, the user may have no direct contact to the original file. All changes or deletions in the temporary file may not have any impact on the original file. The temporary file may be automatically deleted as soon as the viewing is completed.

In regard to editing, similar to viewing, in some embodiments of the invention, the user does not edit the original file directly. When switching to editing mode, the GIMS software may copy the file from the original location to a temporary folder on the user's PC to be edited. It may also change the edit status in the corresponding database record, so other authorized users are blocked from editing the document at the same time. Other authorized users may be able to view the last version of the document while the file is being edited. Only after the user finishes editing and tells the GIMS software to save the changes, the GIMS software may replace the original file with the copy of the edited file, delete the temporary edit file and change the edit status of the corresponding database record.

In regard to document transaction log and version control, the GIMS software may create log records for any document activity like viewing, editing and saving. It also may control version management.

9g. Realization of the "Cloud" Concept for Unstructured Files

The term "cloud" computing, though a hot subject today, is nevertheless not clearly defined and means different things to different people. The term "cloud" is often used as a metaphor for the Internet, based on the cloud drawing used to represent the telephone network.

One of such meanings is related to storage of information. It allows outsourcing of the local storage infrastructure by storing files not locally but in the "cloud" (i.e., on the Internet).

As indicated above, a goal of the GIMS architecture may be to overcome the divide between local and Internet application. The presentation of unstructured files as a combination (i.e., pair) of database record and the file itself may be enable the goal to be achieved.

As stated before, according to embodiments of the invention, the user does not need to know the physical location of a file. This may be the prerogative of the GIMS software. Yet the user, represented by the system administrator, may need to allocate storage "real estate" and tell the program, where the latter should store unstructured files. Knowing the location, the program may create directories and subdirectories according to a certain plan. The user does not need to know the structure of such directory trees.

There are two types of storage areas that the administrator has to allocate. The first is related to the local storage area, and the second is related to the "cloud" or Internet. In regard to local storage, unstructured file may be stored on a shared server as opposed to on a user's local PC. The system administrator may have to enter, in a special form, a location at which content may be stored in a database table. For example, if an administrator assigned a document folder at a file server as "//myDocumentServer/MyDocuments," the GIMS software may first protect that main directory from human intervention by protecting it with passwords. That may prevent users from manually managing those files (i.e., copy, move, delete). The GIMS software may then create subdirectories to store files according to an internal logic. The administrator can also allocate additional file servers and storage space at any time.

In regard to cloud storage, the "Cloud" storage space can be rented from any ISP. For example, an FTP account with user ID and password may be all that is needed. As soon as the FTP information is entered into the GIMS software, the GIMS software may be ready to upload unstructured files into the "cloud." The GIMS software may create FTP subdirectories in accordance with its own logic. The administrator may allocate additional FTP accounts at any time.

In regard to managing the cloud, the database records, associated with each unstructured file, may contain several columns to store information about the physical location of that file. There may be a column to store the local location and another to store the "cloud" location.

When a new unstructured file is created, the GIMS software may provide the user with an option to store that file locally, in the cloud or in both locations. If the cloud option is chosen, then the software may automatically upload any change to that file to the cloud. It may also determine an appropriate FTP location. Accordingly, the user may be released from any responsibility to create file names, allocate destinations or upload the file. All this may occur automatically as background process.

Thus, by uploading all files automatically to the "cloud," the GIMS software may also be performing a fine-grained backup of the entire file system. There is no need to backup huge numbers of files at once; the process is continuous and follows the changes in any single file.

In some embodiments of the present invention, if a system is querying another system for information stored in unstructured files, then, as a rule, there may be no need to get the file itself. The database records, representing the file, may be sufficient, since they contain also the public location (URL) of that file. They may also contain, if necessary, the attached encryption/decryption information. Consequently, they are able to view the files without storing them in their system.

However, in some cases, a user might chose to store the files in the user's system to be able to possess the file in event that the file's owner decides to delete the file in its own system or the "cloud". The automatic uploading of all file changes to the cloud enables authorized users of foreign systems, who already have received the associated record of an unstructured file, to immediately view the last version of a file without re-querying that information again.

Thus, in some embodiments, the rule may be: (i) when querying another system for documents, the QRYRES files may contain only database information related to matching documents, (ii) the documents themselves may be placed into the cloud and may be accessible through the information contained in the database records, (iii) the user may have the option to download a foreign file form a foreign "cloud" to its local system, and/or (iv) all document/cloud related transactions may be performed automatically by software modules.

10. Prevention of the Disappearance of Public Internet Information

Despite the fast growth of the Internet, there is an opposite tendency out there, which is rarely discussed or mentioned in public: the disappearance of web pages and web sites. Web sites are managed by independent entities. The update of web sites is a permanent process, which includes the deletion of certain information and replacement with new ones. As a result of that process, there are not much information or many web sites on the Internet last edited in the year 2000 or before. The old, deleted information might still be available for a while to the web site owner but, after several years, after coming and going of web designers and IT staff, most of that information will be lost forever.

This trend entirely contradicts human tradition. Libraries, for example, do not throw books away even though libraries certainly contain many useless, second-rated books. In this way, libraries do not reflect achievements and the bright side of human activities alone; they also store the history of human ignorance and stupidity. Knowing that side of our legacy is a value in itself.

By its very nature, the GIMS network has a built-in mechanism to prevent the sad tendency of the disappearance of public Internet information in the future. GIMS databases may contain not only their own records but also records from other systems as well. For instance, an average GIMS database may likely contain more records from other systems then records from its own system. In the course of constant data exchanges between systems, the amount of information in each system will automatically grow in a structured way. The loss of certain records, caused by deletion of authorized record owners, may not delete the same information in other systems. Therefore, the GIMS network as a whole may continue to accumulate the knowledge of humankind.

11. Multitasking

As stated above, the process of data exchange between GIMS systems may be an exchange of standardized files, which may be either exported from or imported into a database. The entire data exchange process can be divided into two groups: (a) database processes and (b) non-database processes.

In a GIMS Database, processes may handled the same way as in conventional client-server solutions by establishing a dedicated database server. Non-database processes may include processes like encryption, manipulation of database information in disconnected mode, uploading, downloading and compressing files and others. The amount of processor power, necessary to perform these tasks in large systems is significant. Distributing those tasks among the client PCs in order to utilize their unused processor resources is desirable. Therefore, the GIMS software, installed on all client computers, may include a "Load Distribution" module responsible to evenly distribute such tasks.

11a. Distribution of IMPORT Transactions

The number of IMPORT transactions may be determined by the number of standardized files uploaded by other systems to the Inbox of a particular system. The "Load Distribution" module may count the number of such files and create log records for each file in a special standardized table group "Import Processes." It then, at a certain moment, may divide that number of files by the number of active client computer and assign each file to be processed to a certain client computer.

When a certain client computer is scheduled to fulfill IMPORT transactions, it may process only the assigned files. After import of each file, the status of the corresponding record in the database may be set to "completed". The client computer may also logs problems with the import (e.g., failed authorization etc.).

11b. Distribution of EXPORT Transactions

EXPORT modules may triggered to: (a) conduct scheduled replications to other systems, (b) send selected records to other systems, and/or (c) respond to queries from other systems. In each case, there is the need to distribute a total number of tasks among the active client systems, although the number of anticipated task differs significantly.

In regard to scheduled replications, most systems do not conduct schedules replications at all. There are seldom more then a handful systems that are in the replication list. In regard to ad-hoc sending transactions, there is a fairly frequently need to send selected records to another system. This is especially the case as result of the "Communication" application. Most frequent is the need to respond to numerous queries of other systems when acting as a search engine. "Busy" systems may need to respond to millions of queries per day. This is the case where the load distribution functionality will be most efficient.

Regardless which case, the "Load distribution" module may divide the number of task evenly among active client systems. When the EXPORT module of a certain client computer is activated, it may deal only with the assigned receiver systems of queries. The EXPORT module may log all its activities in a special standardized table group "Export Processes."

12. Network Off-Switch as Additional Security Measure

The insecurity of a computer, connected to a network (local as well as Internet), is rooted in the simple fact that remote computers have access to it. The security level can be lifted to a totally other level if that particular computer gets disconnected from the network, turning it in a stand-alone computer. Yet in today's online world, this would be equal to disabling a computer, and that would defy the fact of gained security.

As stated above, data exchange between GIMS systems is always conducted indirectly, providing a much higher level of security. Nevertheless, there are moments when GIMS computers may have to open up as follows: (a) to upload standardized files to the Inbox of a target system (Internet/FTP), (b) to download standardized files from the Inbox of the GIMS computer's own system, (c) to download unstructured file from other system's cloud (Internet), (d) to connect to the own database (local network), and/or (e) to copy unstructured file from file server to own client computer (local network).

The connection time in all these cases may be a matter of milliseconds, maximum seconds. Otherwise, a client computer within a GIMS system does not have to be connected to the local network or to the Internet. That is more than 99% of the time.

Based on that, it makes sense to create a network device, controlled by the GIMS software, whose function is to connect the client computer to the network to perform a task listed above and disconnect from the LAN and Internet as soon as each task has been completed. Thus, the client computer is in stand-alone mode most of the time, and that makes hostile attacks almost impossible.

In addition, such a device could be programmed in a way to allow network connection only as intended by the GIMS software. Any network packet contradicting the current command of the GIMS software would be blocked. The disconnection from the network could be realized in form of a mechanical switch, a software switch or a combination of both.

While preferred embodiments of the invention have been disclosed in detail above, the invention is not intended to be limited to the invention as disclosed. It is evident that those skilled in the art may now make numerous uses and modifications of and departures from the specific embodiments described herein without departing from the inventive concepts. For example, the systems, methods, databases and/or software of the invention described herein may be as being embodied as computer-executable instructions recorded on a non-transitory computer readable medium. Further, unless stated, none of the above embodiments are mutually exclusive. Thus, the present invention may include any combinations and/or integrations of the features of the various embodiments.

What is claimed is:

1. A method for normalization of multiple standard contact information databases in a networked computer system, the method comprising:
　(a) automatically using a registration computer including a processor and a memory to access a plurality of information sources, each information source containing contact information for one or more objects;
　(b) automatically using the registration computer to add the contact information for one or more of the one or more objects contained in the plurality of information sources to a contact information database, wherein adding the contact information to the contact information database comprises:
　　preventing duplication of contact information of a particular object, and
　　marking the added contact information from one or more of the information sources as from an information source that is not a member of the networked computer system;
　(c) automatically using the registration computer to assign a unique contact identification to the contact information for each of the one or more objects added to the contact information database;
　(d) automatically using the registration computer to receive a registration request via a computer network from a requesting computer system on the computer network, the registration request including contact information of the requesting computer system;

(e) in response to receiving the registration request, automatically using the registration computer to assign a network-unique system identification to the requesting computer system;

(f) automatically using the registration computer to transmit the assigned network-unique system identification to the requesting computer system;

(g) automatically using the registration computer to determine whether the contact information included in the received registration request matches contact information previously added to the contact information database;

(h) if the registration computer determines in step (g) that the contact information included in the received registration request matches contact information previously added to the contact information database, automatically using the registration computer to transmit the network-unique contact identification assigned to the matching contact information previously added to the contact information database; and (i) if the registration computer determines in step (g) that the contact information included in the received registration request does not match contact information previously added to the contact information database, automatically using the registration computer to:

(1) add the contact information included in the received registration request to the contact information database, (2) assign a network-unique contact identification to the contact information included in the received registration request, and (3) transmit the network-unique contact identification assigned to the contact information included in the received registration request to the requesting computer system.

2. The method of claim 1, wherein the contact information added to the contact information database comprises: (1) contact information of entities gathered from public sources that are not members of the networked computer system and (2) contact information of entities that are members of the networked computer system.

3. The method of claim 1, wherein the contact information stored in the plurality of information sources includes contact information in various formats, and the method further comprises using the registration computer to transform the contact information in the various formats into a standard format before adding the contact information to the contact information database.

4. The method of claim 1, wherein the contact information included in the received registration request comprises information about an owner of the requesting computer system.

5. The method of claim 4, wherein the contact information included in the received registration request comprises the name of the owner of the requesting computer system.

6. The method of claim 5, wherein the contact information included in the received registration request additionally comprises one or more of an address, a phone number, an email address and a company profile for the owner of the requesting computer system.

7. The method of claim 1, wherein the network-unique system identification is different from each network-unique contact identification.

8. The method of claim 1, wherein the network-unique system identification assigned to the requesting computer system and the network-unique contact identification assigned to the contact information in the received registration request are transmitted to the requesting computer system as part of a registration confirmation package.

9. The method of claim 8, wherein the registration confirmation package additionally comprises a set of standard system information.

10. The method of claim 8, wherein the registration confirmation package additionally comprises encryption keys.

11. The method of claim 1, further comprising:

(j) automatically using the registration computer to receive updated contact information from the requesting computer system; and (k) automatically using the registration computer to replace the contact information added to the contact information database for the requesting computer system with the received updated contact information.

* * * * *